(12) United States Patent
Toma et al.

(10) Patent No.: US 8,885,709 B2
(45) Date of Patent: Nov. 11, 2014

(54) IMAGE DECODING DEVICE, IMAGE CODING DEVICE, IMAGE DECODING METHOD, IMAGE CODING METHOD, AND PROGRAM

(75) Inventors: Tadamasa Toma, Osaka (JP); Takahiro Nishi, Nara (JP); Taiji Sasaki, Osaka (JP); Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 679 days.

(21) Appl. No.: 12/743,424

(22) PCT Filed: Sep. 14, 2009

(86) PCT No.: PCT/JP2009/004566
§ 371 (c)(1),
(2), (4) Date: May 18, 2010

(87) PCT Pub. No.: WO2010/032419
PCT Pub. Date: Mar. 25, 2010

(65) Prior Publication Data
US 2010/0272174 A1    Oct. 28, 2010

Related U.S. Application Data

(60) Provisional application No. 61/097,940, filed on Sep. 18, 2008.

(30) Foreign Application Priority Data

Mar. 26, 2009  (JP) .................................. 2009-077415

(51) Int. Cl.
| | |
|---|---|
| H04N 11/02 | (2006.01) |
| H04N 11/04 | (2006.01) |
| H04J 3/24 | (2006.01) |
| H04N 19/105 | (2014.01) |
| H04N 19/423 | (2014.01) |
| H04N 19/44 | (2014.01) |
| H04N 19/172 | (2014.01) |
| H04N 19/597 | (2014.01) |

(52) U.S. Cl.
CPC ... *H04N 19/00266* (2013.01); *H04N 19/00024* (2013.01); *H04N 19/00484* (2013.01); *H04N 19/00533* (2013.01); *H04N 19/00769* (2013.01)
USPC ............ 375/240.12; 375/240.26; 375/240.27; 370/474

(58) Field of Classification Search
None
See application file for complete search history.

(56) References Cited

U.S. PATENT DOCUMENTS 6,028,632 A * 2/2000 Siong et al. .............. 375/240.01
7,680,182 B2   3/2010 Toma et al.
(Continued)

FOREIGN PATENT DOCUMENTS

EP    2 285 127    2/2011
EP    2 403 259    1/2012
(Continued)

OTHER PUBLICATIONS

International Search Report issued Oct. 27, 2009 in International (PCT) Application No. PCT/JP2009/004566.
T. Schierl et al., "Text of ISO/IEC 13818-1:2007/FPDAM 4-Transport of Multiview Video over ITU-T Rec H.222.0, ISO/IEC 13818-1".
Extended European Search Report issued Oct. 23, 2012 in European Application No. EP 09 81 4264.

*Primary Examiner* — Joseph Ustaris
*Assistant Examiner* — Frederick Bailey
(74) *Attorney, Agent, or Firm* — Wenderoth, Lind & Ponack, L.L.P.

(57) ABSTRACT

An image decoding device decodes views coded using interview prediction even when decoding is not instantly completed. The image decoding device includes a decoding processing unit which decodes a second view coded with reference to a first view; and a buffer memory provided upstream of the decoding processing unit. When the first view and the second view are assigned with an identical decoding point in time, the decoding processing unit decodes a picture of the second view at a point in time determined by adding a delay time which has a length required to complete decoding of a picture of the first view, to the decoding point in time assigned to the picture of the second view.

13 Claims, 41 Drawing Sheets

(56) References Cited

U.S. PATENT DOCUMENTS

| | | |
|---|---|---|
| 8,275,048 B2 | 9/2012 | Kitahara et al. |
| 8,526,491 B2 | 9/2013 | Toma et al. |
| 2002/0080875 A1* | 6/2002 | Tahara et al. ............ 375/240.02 |
| 2004/0028142 A1* | 2/2004 | Kim ........................ 375/240.25 |
| 2004/0184546 A1* | 9/2004 | Haskell et al. .......... 375/240.27 |
| 2005/0152400 A1* | 7/2005 | Suzuki ......................... 370/474 |
| 2008/0089428 A1 | 4/2008 | Nakamura et al. |
| 2008/0101457 A1 | 5/2008 | Toma et al. |
| 2008/0117985 A1* | 5/2008 | Chen et al. ............... 375/240.26 |
| 2008/0292287 A1 | 11/2008 | Oshima et al. |
| 2008/0317115 A1 | 12/2008 | Kitahara et al. |
| 2010/0046610 A1 | 2/2010 | Toma et al. |
| 2010/0046611 A1 | 2/2010 | Toma et al. |

FOREIGN PATENT DOCUMENTS

| | | |
|---|---|---|
| JP | 08-191461 | 7/1996 |
| JP | 11-262000 | 9/1999 |
| JP | 2007-180982 | 7/2007 |
| JP | 2008-034892 | 2/2008 |
| JP | 2008-34893 | 2/2008 |
| JP | 2008-182669 | 8/2008 |
| WO | 97/32437 | 9/1997 |
| WO | 2006/019014 | 2/2006 |
| WO | 2006/038568 | 4/2006 |
| WO | 2008/047300 | 4/2008 |

* cited by examiner

IMAGE DECODING DEVICE, IMAGE CODING DEVICE, IMAGE DECODING METHOD, IMAGE CODING METHOD, AND PROGRAM

This application claims the benefit of prior-filed provisional application No. 61/097,940 filed Sep. 18, 2008 and Japanese Application No. 2009-077415 filed Mar. 26, 2009.

BACKGROUND OF THE INVENTION

1. Technical Field

The present invention relates to an image decoding device which decodes a video coded using inter-view prediction and to an image coding device which codes a video using inter-view prediction.

2. Background Art

Optical disks such as DVDs and Blu-ray discs are widely used to distribute moving picture contents including movies. Particularly, as compared to the conventional DVDs accepting standard definition (SD) videos, the Blu-ray discs are capable of accepting high definition (HD) videos with a maximum 1920×1080 resolution and thus storing videos of higher quality. The optical disks have so far stored ordinary two-dimensional (2D) videos, but in recent years, there has been an increasing demand for an optical disk in which three-dimensional (3D) videos are stored without degradation of their high image quality, along with an increase in the number of movie theaters which offer stereoscopic or 3D video display.

The optical disks storing 3D videos are required to have reproduction compatibility with playback devices capable of reproducing only optical disks storing 2D videos (which devices are hereinafter referred to as "2D playback devices"). If the optical disks storing 3D videos are unable to be reproduced in 2D with the 2D playback devices, two kinds of disks, i.e., "the optical disk for 3D video" and "the optical disk for 2D video", need to be produced for the same contents, which causes an increase in cost. Thus, the optical disks storing 3D videos are required to be reproducible in 2D with the 2D playback devices and reproducible in 2D or 3D with playback devices capable of reproducing 2D videos and 3D videos (which devices are hereinafter referred to as "2D/3D playback devices").

A method as shown in FIG. 39 is one of the known conventional examples of the playback device and the optical disk storing 3D videos, which are configured for ensuring reproduction compatibility.

An optical disk 1801 stores multiplexed video streams composed of left-eye video streams storing pictures for left eye and right-eye video streams storing pictures for right eye. The left-eye video streams and the right-eye video streams have the same frame rate, and displayed at alternate times. For example, in the case where the frame rate of the respective video streams is 24 frames per second, the left-eye video streams and the right-eye video streams are alternately displayed at ¼s second intervals. The respective video streams are multiplexed and interleaved, that is, alternately arranged, in the optical disk 1801, in recording units of image information which are one or more GOPs.

In FIG. 39, the left-eye video streams are interleaved as a stream 1802A, a stream 1802B, and a stream 1802C, and the right-eye video streams are interleaved as a stream 1803A, a stream 1803B, and a stream 1803C, in the optical disk 1801. The stream 1802A, the stream 1802B, and the stream 1802C, where the left-eye video streams are arranged, are arranged based on the seek function, the loading rate, or the like of the optical disk 1801 so that when these streams are sequentially reproduced, the reproduction will not be interrupted.

When the optical disk 1801 is put in a 2D playback device 1804, the left-eye video streams, i.e., the stream 1802A, the stream 1802B, and the stream 1802C are reproduced and thus, 2D video is outputted.

On the other hand, when the optical disk 1801 is put in a 3D playback device 1805 capable of reproducing 3D video, or when the optical disk 1801 is put in a 2D/3D playback device and the 3D playback is selected by a user, the left-eye video streams and the right-eye video streams are alternately loaded in units of interleaved blocks. To be specific, the stream 1802A, the stream 1803A, the stream 1802B, the stream 1803B, the stream 1802C, and the stream 1803C are sequentially loaded in this order in a manner that no seek operations are carried out in the drive.

Of the loaded video streams, the left-eye video streams and the right-eye video streams are provided to the left-eye video decoder and the right-eye video decoder, respectively, in each of which the streams provided are then decoded so that pictures for left eye and pictures for right eye are alternately outputted to a television. It may also be possible that the left-eye streams and the right-eye streams are decoded in the same decoder. These outputted images are viewed as stereoscopic videos through 3D glasses 1806 which switch between the right eye shutter and the left eye shutter per ¼s second.

Such a configuration enables the 2D playback device to reproduce 2D videos and the 3D playback device or the 2D/3D playback device to reproduce 3D videos, from the disk storing 3D videos. The following patent literature 1 discloses a related art of the technique for ensuring the reproduction compatibility of the optical disk storing 3D videos.

The Joint Video Team (JVT) created as a corporative project of ISO/IEC MPEG and ITU-T VCEG completed a revised standard of MPEG-4 AVC/H.264, which is referred to as the Multiview Video Coding (MVC), in July 2008. The MVC is a standard for collectively coding videos from plural views, which performs prediction coding using not only a similarity from one picture to another in a temporal direction but also an inter-view similarity, thereby providing enhanced compression efficiency as compared to independent coding of videos from plural views.

FIG. 40 is a view showing an example of prediction reference with two views. A view referred to as a base view (which may hereinafter be referred to as the first view) is prohibited from referring to another view, being independently decodable and thus highly compatible with the 2D playback device. In addition, the multiplexing scheme of the MVC is now in a process to standardize the supplemental of the MPEG-2 system standard, and its draft has already been issued as seen in the following non-patent literature 1.

The non-patent literature 1 defines a method of MVC packet-multiplexing video streams, a system target decoder which performs a series of operations including loading of packet-multiplexed MVC data, demultiplexing of the data to take out MVC bitstreams, and inputting them to a decoder, and others.

A playback device according to this scheme includes a buffer of a defined size in the system target decoder. As disclosed in the non-patent literature 1, the buffer includes an elementary stream buffer (EB), a multiplexing buffer (MB), and a transport buffer (TB), which are provided in this order from the closest to the farthest from the decoder. In the following description, these buffers will be collectively referred to as a system target decoder (STD) buffer. It is envisaged that the playback device according to the scheme will be able to decode each frame at a predetermined decoding point in time without overflow or underflow of the STD buffer as long as the reproduction device operates at defined data-load timing and data loading rate.

CITATION LIST

Patent Literature

[PTL1]
International Publication WO97/032437
[Non Patent Literature]
[NPL 1]
Text of ISO/IEC 13818-1:2007/FPDAM 4-Transport of Multiview Video over ITU-T Rec H.222.0|ISO/IEC 13818-1

SUMMARY OF INVENTION

The conventional examples have the following problems.

In the conventional playback device shown in FIG. 39, when an image coding method using inter-view prediction such as MVC is used to increase coding efficiency of two-view images, a frame of the first view which is used for inter-view prediction needs to have been decoded before referred to from another view (hereinafter referred to as the second view). This is the case also when the first view and the second view are decoded by the same decoder.

Furthermore, in the conventional multiplexed stream stored in the optical disk 1801, the first view and the second view are assigned with an identical decoding point in time (decoding time stamp, hereinafter referred to as DTS), which means that decoding of the first view is assumed to be instantly completed. It is to be noted that the DTS and a display time (presentation time stamp, hereinafter referred to as PTS) can be obtained from a header of MPEG-2 packetized elementary stream (PES) packet, a parameter in the MVC bitstream, or database information which is referred to in the Blu-ray disc or the like application standard upon reproduction.

However, it is impossible to instantly complete the decoding of the first view in an actual playback device, and thus the following problems are found.

The conventional playback device which determines a decoding point in time for each view based on the DTS is actually not capable of determining a decoding point in time for the second view because decoding of the second view cannot start at the start time of decoding of the first view. In other words, the first problem, which is essential, is that plural views coded by a method including inter-view prediction cannot be decoded at the decoding point in time based on the DTS assigned thereto.

Furthermore, because the conventional system target decoder defines the size of the STD buffer on the assumption that the decoding of the first view is instantly completed, there is the second problem that if the decoding of the first view is not instantly completed, the STD buffer will overflow and no more data can thus be loaded into the STD buffer in the meantime, with the result that data of a succeeding frame is not available at DTS.

The following shall describe the second problem with reference to FIGS. 41 and 42. FIG. 41 shows a case where the decoding is instantly completed, while FIG. 42 shows an amount of the elementary stream buffer in use in the case where it takes a time T_dec to decode the first view.

In FIG. 41, at each of DTS1, DTS2, and DTS3, the stream data of the first view and the second view of corresponding one of a frame 1, a frame 2, and a frame 3 are extracted at the same time and instantly decoded.

On the other hand, in FIG. 42, the stream data of the first view of the frame 1 is extracted at DTS1, and the stream data of the second view of the frame 1 is extracted at a point in time which is after DTS1 by T_dec. The frame 2 and the following frames will be processed likewise. In this case, the elementary stream buffer overflows at a point in time Tfull and is unable to load data any more from the point in time Tfull to the decoding point in time for the second view (DTS1+T_dec). This results in a failure to make the data of the first view of the frame 3 available at DTS3, causing an underflow of the elementary stream buffer.

The present invention has been devised to solve the above problems, and an object of the present invention is to provide an image decoding device which is capable of decoding views coded using inter-view prediction even when decoding is not instantly completed, or to provide an image coding device which codes views using inter-view prediction so that the views can be decoded.

Solution to Problem

In order to solve the above existing problems, the image decoding device according to an aspect of the present invention is an image decoding device for decoding a bitstream having views each of which includes a picture and has been coded in a method including inter-view prediction, the image decoding device including: a decoding processing unit configured to decode a bitstream of a first view coded and a bitstream of a second view coded with reference to the first view; and a buffer memory provided upstream of the decoding processing unit to hold the bitstream which is to be provided to the decoding processing unit, wherein, in the case where the first view and the second view are assigned with an identical decoding point in time, the decoding processing unit is configured to decode a picture of the second view at a point in time determined by adding a delay time to the decoding point in time assigned to the picture of the second view, the delay time having a length required to complete decoding of a picture of the first view.

The picture of the second view is thus decoded with reference to the picture of the first view after the picture of the first view is decoded. It is therefore possible to decode plural views coded using the inter-view prediction.

Furthermore, the bitstream may be loaded into the buffer memory at a corresponding data loading rate assigned to the bitstream, and in decoding the bitstream of each view included in the views, the decoding processing unit may be configured to extract from the buffer memory the bitstream of the each view to be decoded, and the buffer memory may be of a size that is equal to or larger than a smallest size that does not cause the buffer memory to underflow when the decoding processing unit extracts the bitstream of the each view in the case where the decoding processing unit extracts the bitstream of the second view at the point in time determined by adding the delay time.

This enables the coded data to be loaded without the underflow which is attributed to a decoding delay. The image decoding device is therefore capable of decoding data more reliably.

Furthermore, the buffer memory may be of a size that is equal to or larger than a size obtained by adding a size of the bitstream loaded at the data loading rate in the delay time to a specified size of the buffer memory, the specified size being determined assuming that the bitstream of the each view is extracted at a corresponding decoding point in time assigned to each of the views.

The size of the buffer memory can be thus determined.

Furthermore, the decoding processing unit may be configured to decode the bitstreams of the views sequentially, and the buffer memory may be of a size that is equal to or larger than D+R×T×(n−1) where n represents the number of views included in the bitstreams of the views, T represents the maximum length of time necessary for decoding each picture included in the views, R represents the data loading rate, and D represents the specified size.

Thus, in the case where the bitstreams of the views are decoded sequentially, the size of the buffer memory is determined more specifically.

Furthermore, the decoding processing unit may be configured to decode the bitstreams of the views in parallel, and the buffer memory may be of a size that is equal to or larger than D+R×T×(m−1) where m represents the maximum number of layers of the views which are referred to in the inter-view prediction, T represents the maximum length of time necessary for decoding each picture included in the views, R represents the data loading rate, and D represents the specified size.

Thus, in the case where the bitstreams of the views are decoded in parallel, the size of the buffer memory is determined more specifically.

Furthermore, the decoding processing unit may further include: an external memory in which the pictures included in the views are stored; a first decoder which decodes the bitstream of the first view and stores in the external memory the picture to be used in the inter-view prediction; and a second decoder configured to decode the bitstream of the second view by retrieving from the external memory the picture to be used in the inter-view prediction, with reference to management information indicating a position of the picture in the external memory.

Thus, in even an image decoding device with two decoders, these decoders share reference pictures that are used in the inter-view prediction.

Furthermore, the bitstream which has not been loaded because of the delay time may be loaded into the buffer memory faster than a data loading rate assigned to the bitstream.

This enables loading of the data which has not been loaded for a period in which decoding is delayed. The image decoding device is therefore capable of decoding data more reliably.

Furthermore, the decoding processing unit may further include: an external memory in which the pictures included in the views are stored; a first decoder which decodes the bitstream of the first view and stores in the external memory the picture to be used in the inter-view prediction; a second decoder configured to decode the bitstream of the second view by retrieving from the external memory the picture to be used in the inter-view prediction, with reference to management information indicating a position of the picture in the external memory.

Thus, in even an image decoding device with two decoders, these decoders share reference pictures that are used in the inter-view prediction. In addition, such sharing can be applied also when the bitstreams are loaded at high speed.

Furthermore, the image coding device according to an aspect of the present invention may be an image coding device for coding views each of which includes a picture, in a method including inter-view prediction, the image coding device including: a coding processing unit configured to code the views and assign the views with an identical decoding point in time; and a rate control unit configured to cause the coding processing unit to perform coding assuming that a buffer memory of an image decoding device, into which the coded views are loaded, is of a size that is equal to or smaller than a size obtained by subtracting a size of data of the coded views which is loaded in a delay time having a length required to complete decoding of the view which is referred to in the inter-view prediction, from a specified size of the buffer memory determined assuming that decoding is instantly completed.

The views are thus coded so that no underflow occurs in the image decoding device.

Furthermore, the rate control unit may be configured to cause the coding processing unit to perform coding assuming that the buffer memory of the image decoding device is of a size that is equal to or smaller than D−R×T×(n−1) where n represents the number of the coded views, T represents the maximum length of time necessary for decoding each picture included in the views, R represents a data loading rate at which the coded views are loaded, and D represents the specified size.

This makes it possible to set a more specific limit for coding.

Furthermore, the coding processing unit may further include: an external memory in which the pictures included in the views are stored; a first encoder which codes a first view included in the views and stores in the externally memory the picture to be used in the inter-view prediction; and a second encoder which codes a second view by retrieving from the external memory the picture of the first view to be used in the inter-view prediction, with reference to management information indicating a position of the picture in the external memory.

Thus, in even an image coding device with two encoders, these encoders share reference pictures that are used in the inter-view prediction.

Furthermore, the image decoding method according to an aspect of the present invention may be an image decoding method of decoding a bitstream having views each of which includes a picture and has been coded in a method including inter-view prediction, the image decoding method including: decoding a coded bitstream of a first view and a bitstream of a second view coded with reference to the first view; and holding, before the decoding, the bitstream which is to be decoded in the decoding, wherein, in the decoding, in the case where the first view and the second view are assigned with an identical decoding point in time, a picture of the second view is decoded at a point in time determined by adding a delay time to the decoding point in time assigned to the picture of the second view, the delay time having a length required to complete decoding of a picture of the first view.

The picture of the second view is thus decoded with reference to the picture of the first view after the picture of the first view is decoded. It is therefore possible to decode plural views coded using the inter-view prediction.

Furthermore, the image coding method according to an aspect of the present invention may be an image coding method of coding views each of which includes a picture, in a method including inter-view prediction, the image coding method including: coding the views and assigning the views with an identical decoding point in time; and controlling a rate at which the coding is performed, assuming that a buffer memory of an image decoding device, into which the coded views are loaded, is of a size that is equal to or smaller than a size obtained by subtracting a size of data of the coded views which is loaded in a delay time having a length required to complete decoding of the view which is referred to in the inter-view prediction, from a specified size of the buffer memory determined assuming that decoding is instantly completed.

The views are thus coded so that no underflow occurs in the image decoding device.

Furthermore, the present invention may be implemented as a program which causes a computer to execute the steps included in the image decoding method.

The image decoding method can thus be implemented as a program.

Furthermore, the present invention may be implemented as a program which causes a computer to execute the steps included in the image coding method.

The image coding method can thus be implemented as a program.

Advantageous Effects of Invention

The present invention enables decoding of the bitstream coded in a method including inter-view prediction, even when decoding is not instantly completed.

DETAILED DESCRIPTION OF THE INVENTION

The following shall explain embodiments of the present invention with reference to the drawings.

First Embodiment

The first embodiment according to the present invention will first be explained with reference to the drawings.

Figure 1:
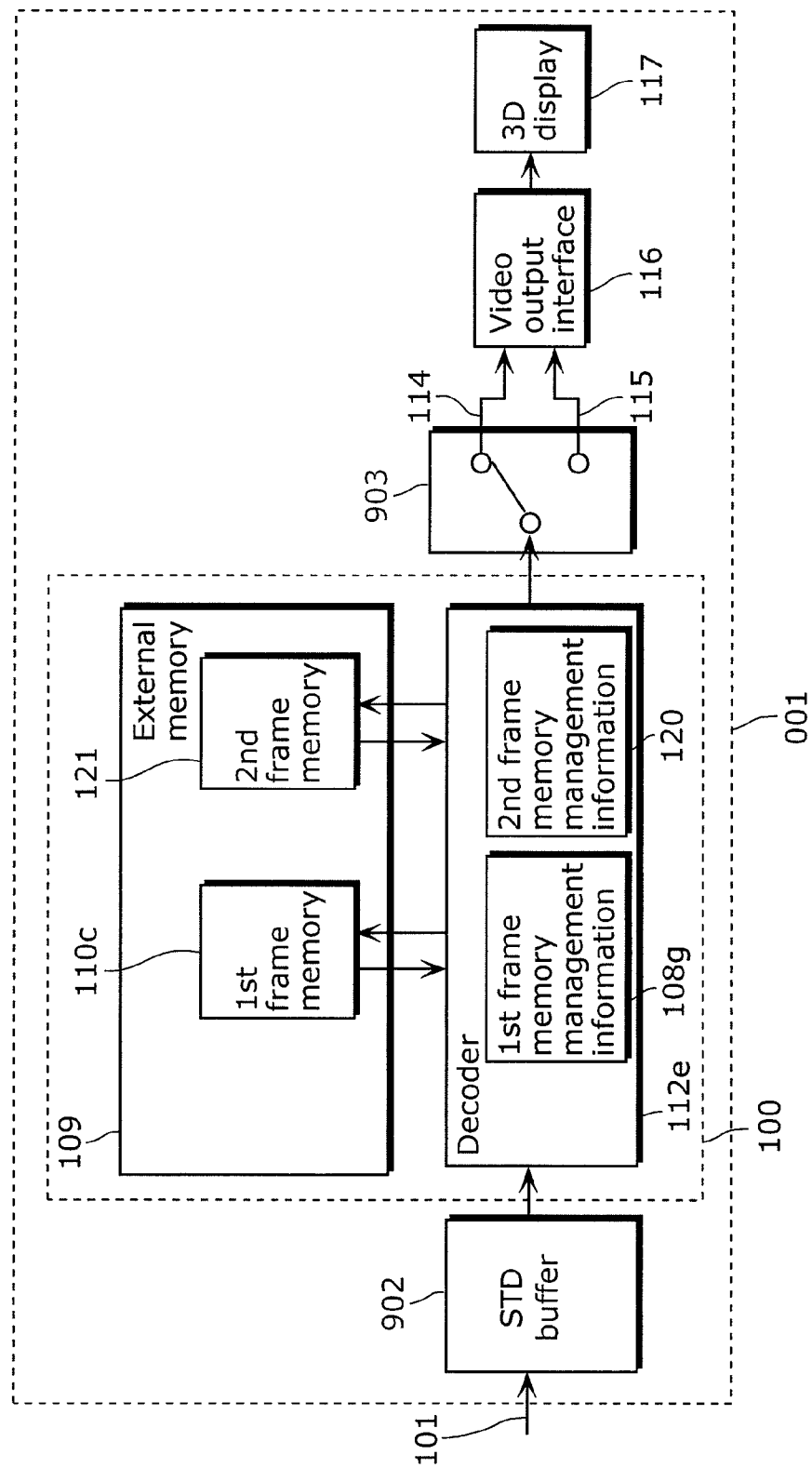
FIG. 1 is a block diagram of a 3D image decoding device according to the first embodiment of the present invention.

FIG. 1 is a block diagram of a 3D image decoding device 001 according to the first embodiment. The 3D image decoding device 001 in FIG. 1 includes a decoder 112e capable of decoding a video of one of the views of a 3D video at a speed that is double the frame rate for the 3D video. The decoder 112e decodes both of the first view and the second view. Because the second view has been coded with reference to the first view, the 3D image decoding device 001 is configured so that a decoded image of the first view can be referred to during decoding of the second view.

The 3D image decoding device 001 is different from the conventional playback device in that even when the decoding of the first view is not instantly completed, the stream data of each view can be decoded at a point in time when each view is actually decoded.

The operation of the 3D image decoding device 001 will be explained. A multiplexed bitstream 101 received is provided to a STD buffer 902. The bitstream is then demultiplexed and thus separated. Afterwards, the bitstream of the first view is provided to the decoder 112e at a corresponding DTS, and the bitstream of the second view is provided to the decoder 112e at a decoding point in time (which is hereinafter referred to as DTS_MOD) set in consideration of the time necessary for decoding the first view.

The multiplexing scheme taken herein uses a transport stream specified by the MPEG 2 systems standard. Upon demultiplexing, a PES packet is separated from a transport packet sequence by means of a demultiplexing unit (not shown), and a bitstream stored in a payload of the PES packet is retrieved.

It is to be noted that the multiplexing scheme is not limited to the transport stream specified by the MPEG 2 systems standard. For example, the multiplexing scheme may be a scheme which is adopted in streaming distribution via a network, including a transport stream of which functionality is expanded by the application standard, an MP4 file format specified by MPEG, and a real-time streaming protocol (RTP) specified by the Internet Engineering Task Force (IETF).

The decoder 112e decodes the multiplexed bitstream 101 provided thereto, and outputs a decoded image at a corresponding PTS. The outputted image is separated through a switch 903 into a decoded image 114 of the first view and a decoded image 115 of the second view. The separated images are then transferred to a 3D display 117 via a video output interface 116 and displayed as a 3D image.

The decoder 112e copies decoded frames which are referred to in coding using inter prediction, onto a first frame memory 110c and a second frame memory 121 in an external memory 109, and holds the decoded frames in the first frame memory 110c and the second frame memory 121 until they are no longer referred to. The first frame memory 110c stores frames of the first view while the second frame memory 121 stores frames of the second view.

Each of the frame memories holds multiple frames. Accordingly, the decoder 112e holds first frame memory management information 108g and second frame memory management information 120 to manage where a frame for each point in time is held in the first frame memory 110c or the second frame memory 121.

To code the second view, inter-view prediction coding is used in which a frame of the first view is referred to. The decoder 112e therefore needs to refer to a decoded image of the first view to perform decoding on the second view. Thus, the decoder 112e updates the first frame memory management information 108g every time decoding of a frame of the first view is completed. Moreover, the decoder 112e holds the first frame memory management information 108g even during decoding of the second view. On the basis of the first frame memory management information 108g, the decoder 112e refers to a decoded image of a desired frame of the first view held by the first frame memory 110c. The decoder 112e then decodes the bitstream of the second view coded in a coding method including the inter-view prediction coding.

It is to be noted that a bitstream of the first view, which has been coded without referring to another view, can be decoded independently. This means that the 3D image decoding device 001 can be used as a 2D image decoding device when the decoder 112e skips bitstream of the second view.

Furthermore, in the case where any anomaly such as a syntax error of a bitstream is detected in a decoding process of the second view in the decoder 112e, the 3D image decoding device 001 may display only decoded images of the first view until normal decoding can resume, for example, from a random access point (that is a point at which independent reproduction can be started) of the bitstream. Moreover, in the above case where such anomaly is detected, the 3D image decoding device 001 may alternatively display a decoded image of the first view as a decoded image of the second view. With such a display, etc., the 3D image decoding device 001 can reduce viewer's discomfort.

Furthermore, in the case where any anomaly such as a syntax error of a bitstream is detected in a decoding process of the first view in the decoder 112e, the second view, which is to be decoded with reference to the first view, will not be normally decoded either. The 3D image decoding device 001 therefore notifies an upper system of the anomaly of the decoder 112e and may continue to output the last normally-decoded frame of each of the first view and the second view until normal decoding can resume, for example, from a random access point (that is a point at which independent reproduction can be started) of the bitstream. With such an output, etc., the 3D image decoding device 001 can reduce viewer's discomfort.

Figure 2:
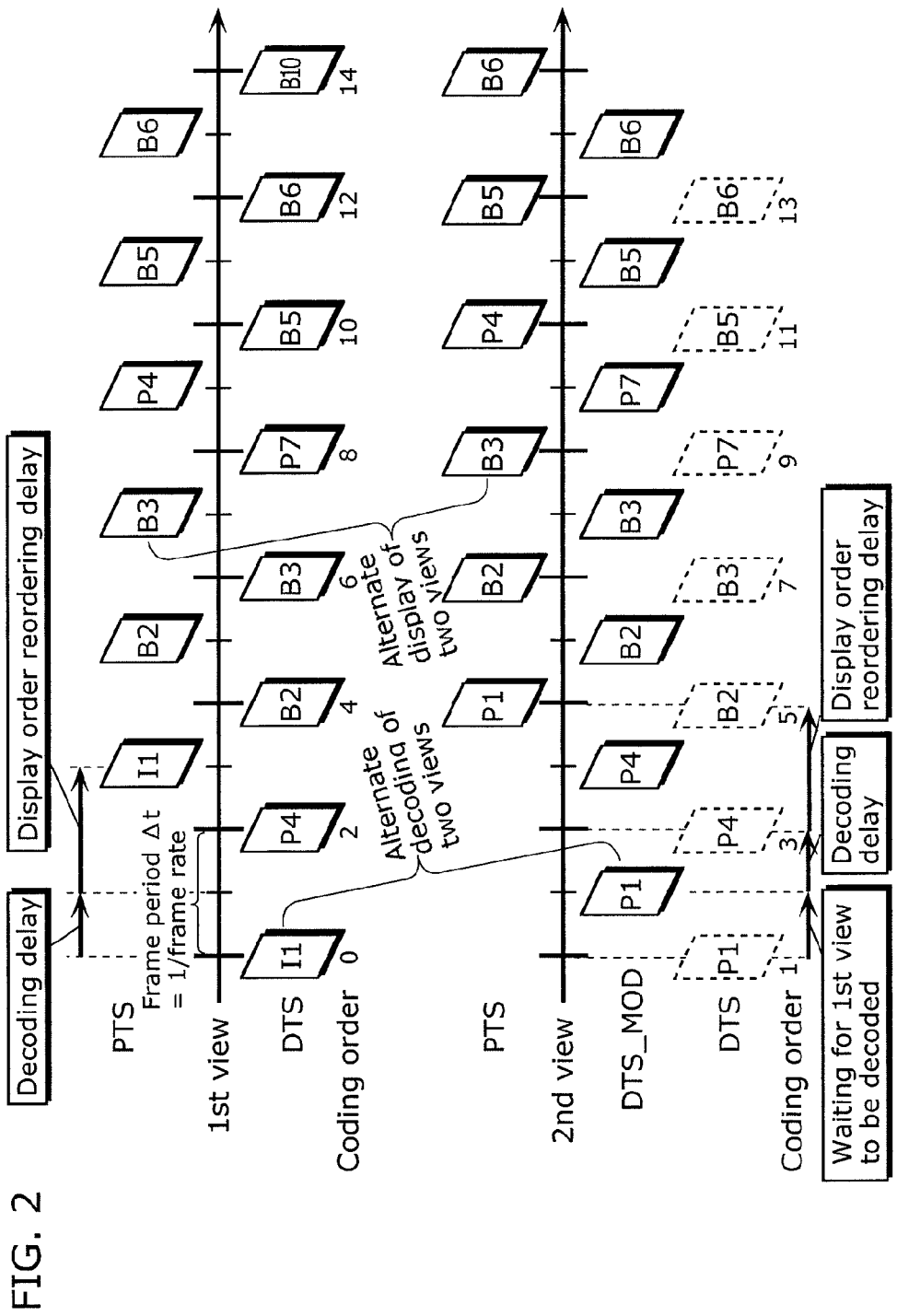
FIG. 2 is a view showing an example of actual decoding points in time and displaying points in time for each view in the first embodiment of the present invention.

FIG. 2 is a view showing one example of a relation between PTS and DTS for each view, in the decoding process by the 3D image decoding device 001. In the example of FIG. 2, frames of each view have been coded so that the display order of frame types is I, B, B, and P and that the coding order of frame types is I, P, B, and B, where P frame is uni-predictive only while B frame may be bi-predictive. Upon referring to the first view for the second view in the inter-view prediction, only a frame of the first view displayed immediately before is referred to. The first view and the second view are displayed alternately.

In the present example, first, a starting frame I1 of the first view is decoded. A starting frame P1 of the second view will then be decoded with reference to the starting frame I1 of the first view. Decoding of the starting frame P1 of the second view therefore cannot start until decoding of the starting frame I1 of the first view is completed. In the 3D image decoding device 001 using the decoder 112e that operates at a speed that is double a display frame rate, it takes a frame period $\Delta/2$ ($\Delta t=1$/frame rate) to decode the starting frame I1 of the first view.

It is to be noted that the first view and the second view have an identical DTS value, which can be obtained from a header of a PES packet, a hypothetical reference decoder (HRD)-related parameter included in an MVC stream, and the like.

Thus, the actual decoding point in time DTS_MOD at which the starting frame P1 of the second view is decoded is determined to be Δt/2 behind the DTS for the starting frame I1 of the first view.

Furthermore, the frame I1 of the first view is used to predict a frame P4 of the first view, which should mean that after completion of decoding the frame I1 of the first view, the frame P4 of the first view can start to be decoded. However, the 3D image decoding device 001, which decodes the first view and the second view with the single decoder, is not capable of decoding the frame P4 of the first view and the frame P1 of the second view at the same time. The DTS for the frame P4 of the first view is therefore Δt/2 behind the DTS_MOD for the frame P1 of the second view. Afterwards, decoding of the frames of the first view and decoding of the frames of the second view alternately start at Δt/2 intervals.

Next, the PTS will be explained. In contrast to the display order, the last frame in decoding order is a B frame of the second view. Accordingly, the PTS for each frame of the first view and the second view is determined according to a point in time when the B frame of the second view can be displayed. To be specific, for the frame B2 of the second view, PTS is Δt/2 behind DTS_MOD because it takes Δt/2 for the decoder 112e to decode one frame. With this point in time as a reference, PTS is 3Δt/2 behind DTS_MOD for the starting frame I1 of the first view, and PTS is 3Δt/2 behind DTS_MOD for the starting frame P1 of the second view.

It is to be noted that a method of displaying a 3D image includes a method of displaying the first view and the second view at the same time and a method of displaying the first view and the second view alternately as in the 3D image decoding device 001.

In the case where the former method is applied, the first view and the second view may have an identical PTS in the multiplexed bitstream 101. If such a multiplexed bitstream is provided to the 3D image decoding device 001, that is, if PTS which can be obtained from a header of a PES packet and a hypothetical reference decoder (HRD)-related parameter included in an MVC stream is common to the first view and the second view, the actual PTS for the second view may be determined so that the first view and the second view can be displayed alternately as in the example of FIG. 2.

Furthermore, another conceivable example is that only the PTS for the first view can be obtained from the header of the PES packet, and the PTS for the second view is determined based on the PTS for the first view and therefore not stored in the header of the PES packet. Alternatively, it is also conceivable that the PTS for the second view stored in the header of the PES packet is fixed at a predetermined value. For example, it is conceivably that PTS stored is constantly fixed at zero while actual PTS is determined based on PTS for the first view. Even in such a case, actual PTS for the second view may be determined so that the first view and the second view can be displayed alternately as shown in FIG. 2.

Figure 3:
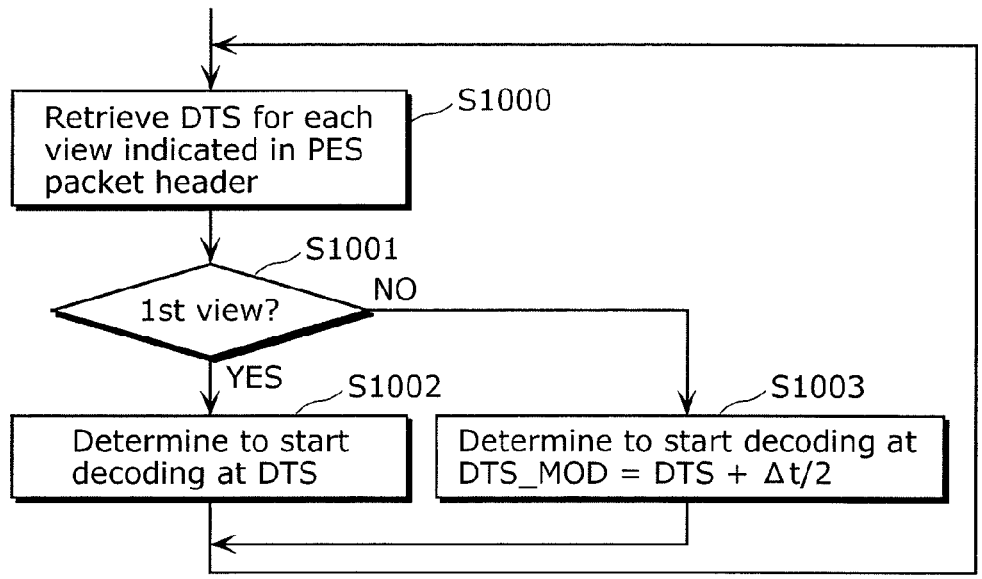
FIG. 3 is a flowchart showing a method of determining actual decoding points in time for each view in the first embodiment of the present invention.

FIG. 3 is a flowchart showing an operation of the 3D image decoding device 001 in which points in time for decoding the first view and the second view are determined.

First of all, the decoder 112e retrieves DTS for each view indicated in the PES packet header (S1000). It is, however, not necessarily the case that the PES packet header stores DTSs for views of all the frames. Accordingly, in the case where DTS is not found in the PES packet header, the decoder 112e may determine DTS based on separately retrieved frame rate information or the like. Alternatively, HRD-related information of MVC stream stored in the PES packet may also be used to determine DTS.

Next, the decoder 112e determines whether or not a subject to be processed is the first view (S1001). When the subject to be processed is the first view (YES in S1001), the decoder 112e determines to start decoding at the retrieved DTS (S1002). On the other hand, when the subject to be processed is not the first view (No in S1001), the decoder 112e determines a decoding point in time for the second view DTS_MOD by adding ½ the frame period Δt/2 to DTS in consideration of the time necessary for decoding the first view (S1003).

Figure 4:
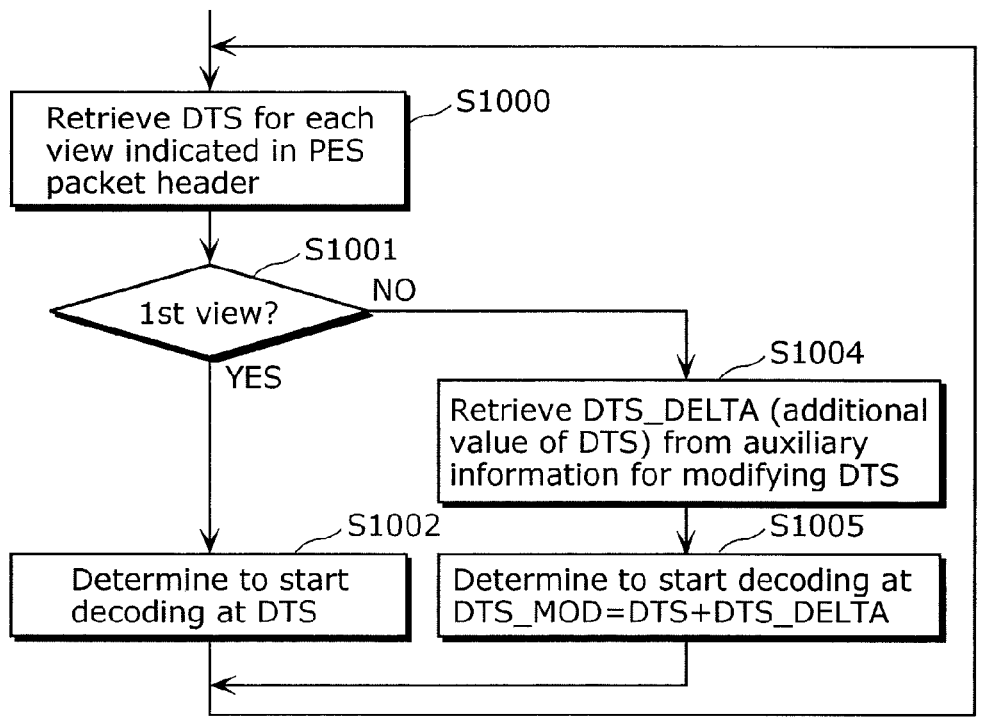
FIG. 4 is a flowchart showing a variation of the method of determining actual decoding points in time for each view shown in FIG. 3.

FIG. 4 is a flowchart showing a variation of the operation shown in FIG. 3.

In this example, the decoder 112e determines whether or not a subject to be processed is the first view (S1001). When the subject to be processed is not the first view (No in S1001), the decoder 112e obtains an additional value DTS_DELTA of DTS by referring to auxiliary information for modifying DTS (S1004). Next, the decoder 112e determines a decoding point in time for the second view DTS_MOD by adding DTS_DELTA to DTS (S1005).

DTS_DELTA can be transmitted using a data storage unit for storing auxiliary information within an MVC stream; for example, it is included at a predetermined position such as every starting position of a random access unit. In the case where one access unit is defined by combination of the first view and the second view, the arrangement order of these views within the access unit may be limited depending on a type of a storage unit for storing auxiliary information and a storage unit for storing pixel data.

In this case, the storage units for storing auxiliary information may be arranged so that the storage units will not be reordered in creating an access unit. For example, there is a case where the storage unit for auxiliary information needs to be placed before the storage unit for pixel data. In this case, if the auxiliary information is stored as data of the second view, combining the first view and the second view results in the auxiliary information being located after the pixel data of the first view and therefore causes the storage units to be reordered. The auxiliary information may therefore be placed before the pixel data of the first view in advance as data of the first view.

Furthermore, the auxiliary information indicating DTS_DELTA may be stored in a MPEG-2 transport stream or in database information which is referred to in the Blu-ray disc or the like application standard upon reproduction. Moreover, the auxiliary information may indicate an absolute value of DTS_DELTA or may indirectly indicate a value of DTS_DELTA using an integral multiple, a fraction of an integer, or the like, of a frame interval or other reference time intervals. What is more, DTS_MOD may be transmitted as the auxiliary information. Likewise, the auxiliary information for determining actual PTS for the second view can also be transmitted.

While it is assumed in the above that the stream having two views is displayed in 3D, a stream having three or more views may also be decoded and displayed by selecting two views at an additional step of selecting two views from plural views.

Furthermore, instead of 3D display, another conceivable application is to display images one by one by switching among plural views or to display images at the same time by dividing a screen. Also in these cases, the first view, which is independently decodable, is referred to when DTS_MOD for a succeeding view is determined. For example, in the case of displaying three views, assuming that each view can be decoded for a frame period Δt/3, DTS_MOD for the second view and DTS_MOD for the third view can be determined as DTS+(⅓)×Δt and DTS+(⅔)×Δt, respectively.

It is to be noted that the frame explained herein includes a field which is included in the frame. The present invention is applicable to both progressive video and interlace video.

Next, the STD buffer 902 included in the 3D image decoding device 001 will be explained. In the conventional playback device, as stated in the above as the second problem, in the case where the 3D image decoding device 001 determines the decoding point in time for the second view in consideration of the time necessary for decoding the first view, the decoder 112e cannot read the bitstream data of the second view during the decoding period for the first view. The STD buffer 902 will therefore overflow. This results in a problem that data of a succeeding frame is not available at DTS.

Accordingly, in order to avoid the overflow of the STD buffer due to stopping of loading the bitstream data of the second view during the decoding period for the first view, the 3D image decoding device 001 has a compensation buffer in addition to the STD buffer which is defined in the conventional system target decoder.

Figure 5:
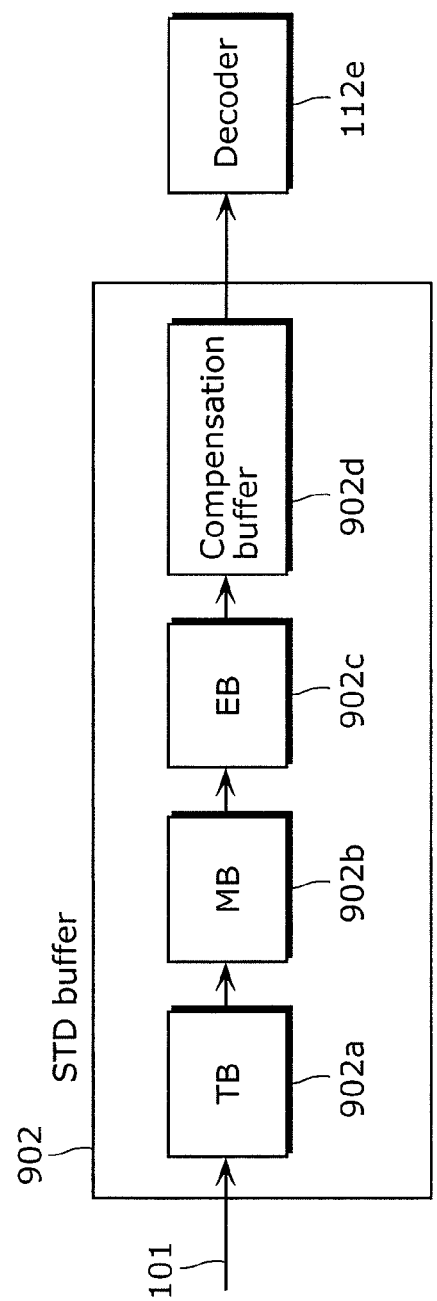
FIG. 5 is an illustration of a compensation buffer in the 3D image decoding device according to the first embodiment of the present invention.

FIG. 5 is a diagram showing a configuration of the STD buffer 902 of the 3D image decoding device 001. A multiplexed bitstream 101 provided by a control unit (not shown) is first provided to a transport buffer 902a, where a PES packet is separated from a transport packet, and then provided to a multiplexing buffer 902b. Subsequently, the bitstream data obtained from a payload of the PES packet is provided to an elementary stream buffer 902a. The STD buffer 902 has a compensation buffer 902d in addition to the elementary stream buffer 902c, as a buffer for storing the bitstream data.

While the elementary stream buffer 902c and the compensation buffer 902d are separately shown in the example of FIG. 5, they have the same role in storing the bitstream data separated from the payload of the PES packet. Hence, the STD buffer 902 may alternatively have a single buffer of a size equal to a sum of sizes of these two buffers, as a buffer for storing the bitstream data.

Figure 6:
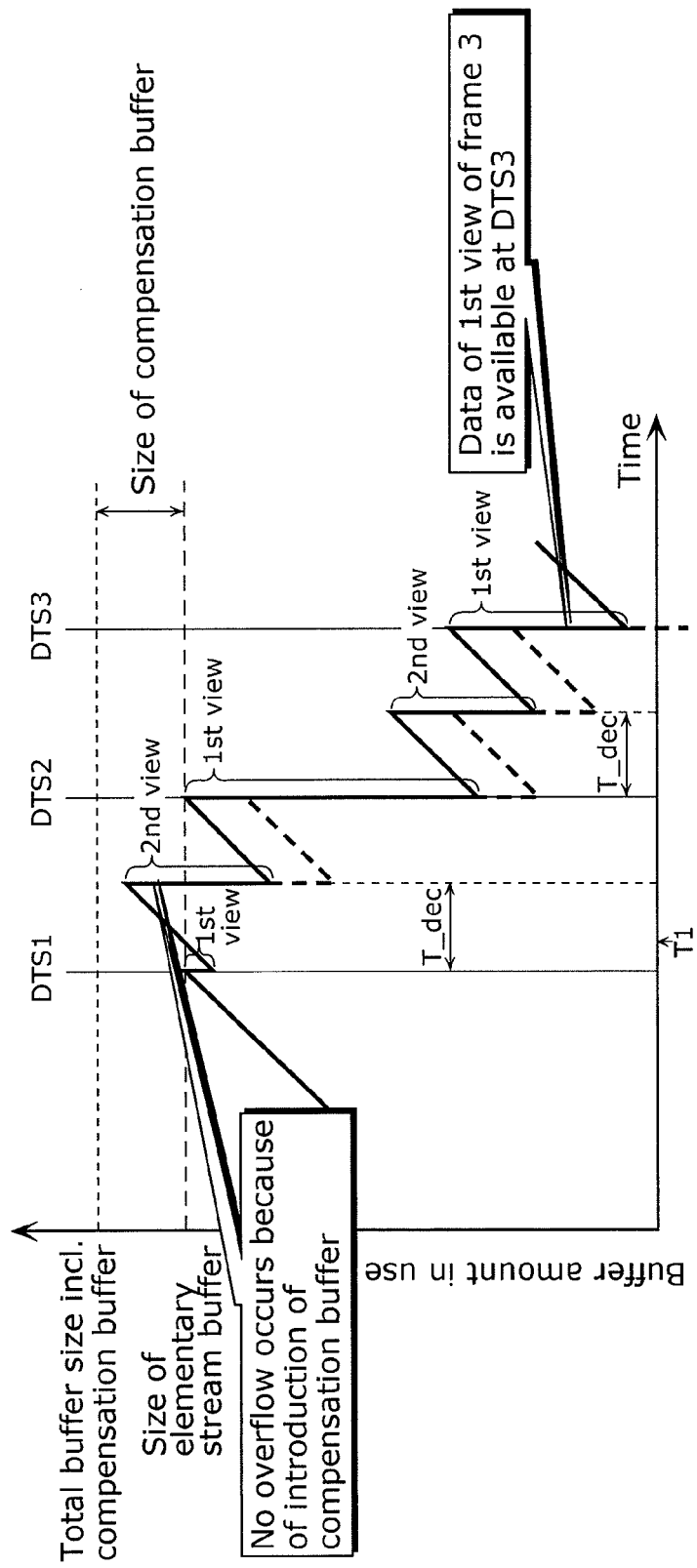
FIG. 6 is a view showing an effect of a compensation buffer according to the first embodiment of the present invention.
Figure 42:
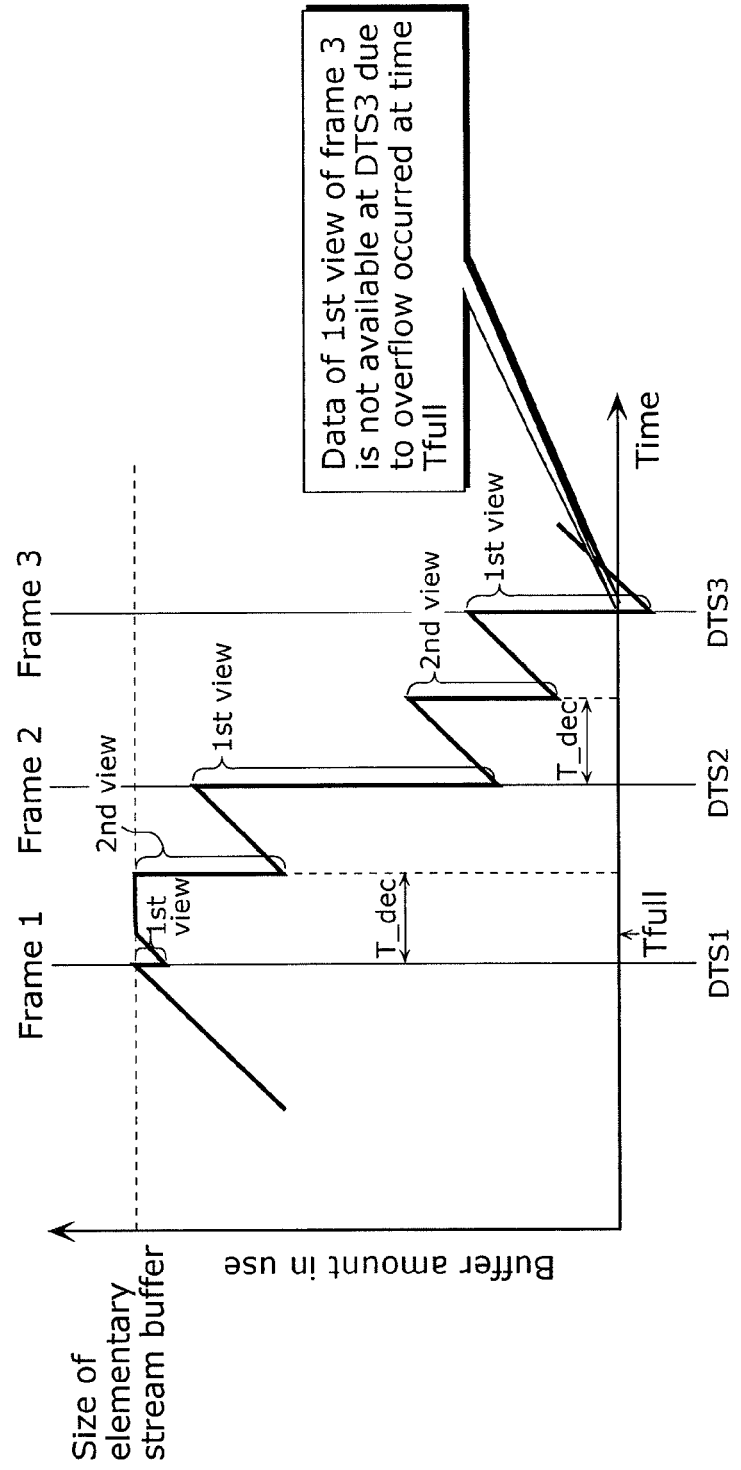
FIG. 42 is a view showing a problem of buffer management for reproducing 3D images.

Afterwards, the bitstream data of the respective views are outputted from the elementary stream buffer 902c or the compensation buffer 902d and provided to the decoder 112e at corresponding decoding points in time for the first view and for the second view FIG. 6 is a view showing that the 3D image decoding device 001 can decode, without causing the overflow and underflow of the STD buffer 902, the bitstream data which causes the problem in the conventional playback device as illustrated in FIG. 42. In the graph of FIG. 6, solid lines represent a buffer amount in use in the 3D image decoding device 001, and dotted lines represent a buffer amount in use in the conventional playback device. At a point in time T1, the overflow occurs in the conventional playback device, but the STD buffer 902 can continue to read the bitstream data without causing an overflow, thanks to the compensation buffer 902. As a result, the data of the first view of the frame 3 is available at DTS3, and the 3D image decoding device 001 is thus able to achieve continuous decoding without interruption.

Figure 7:
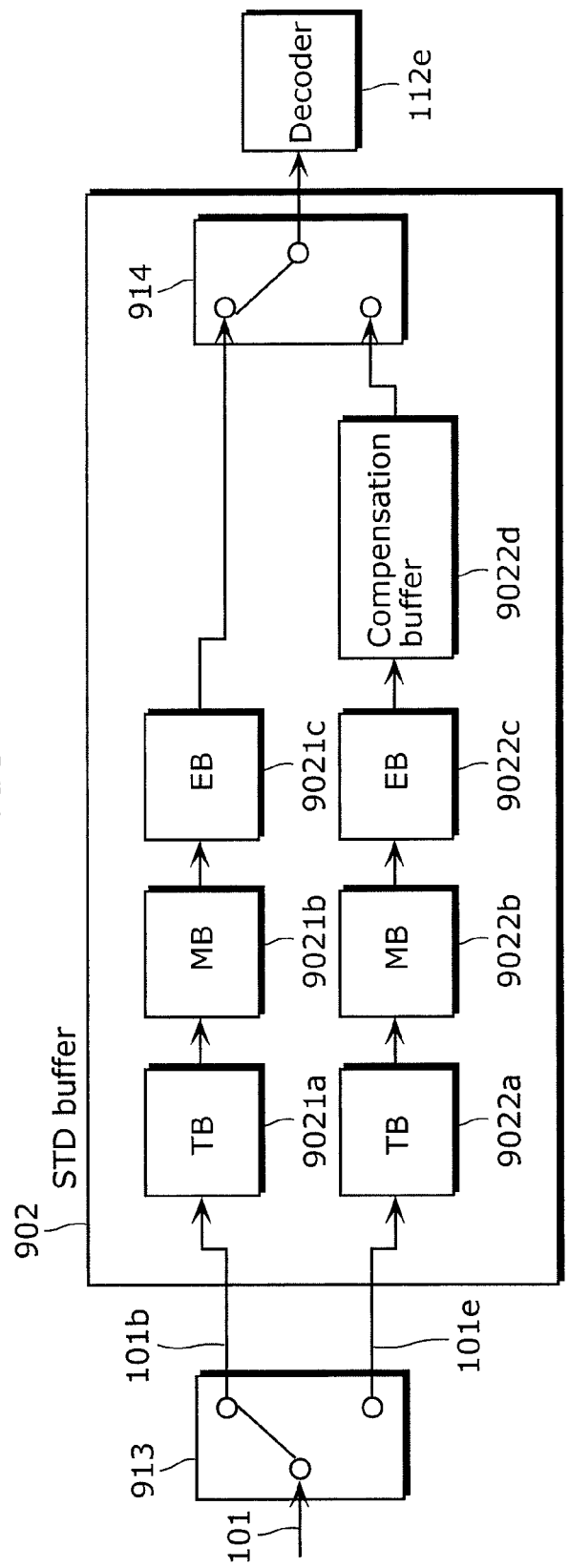
FIG. 7 is a view showing a variation of the layout of the compensation buffer shown in FIG. 5.
Figure 8:
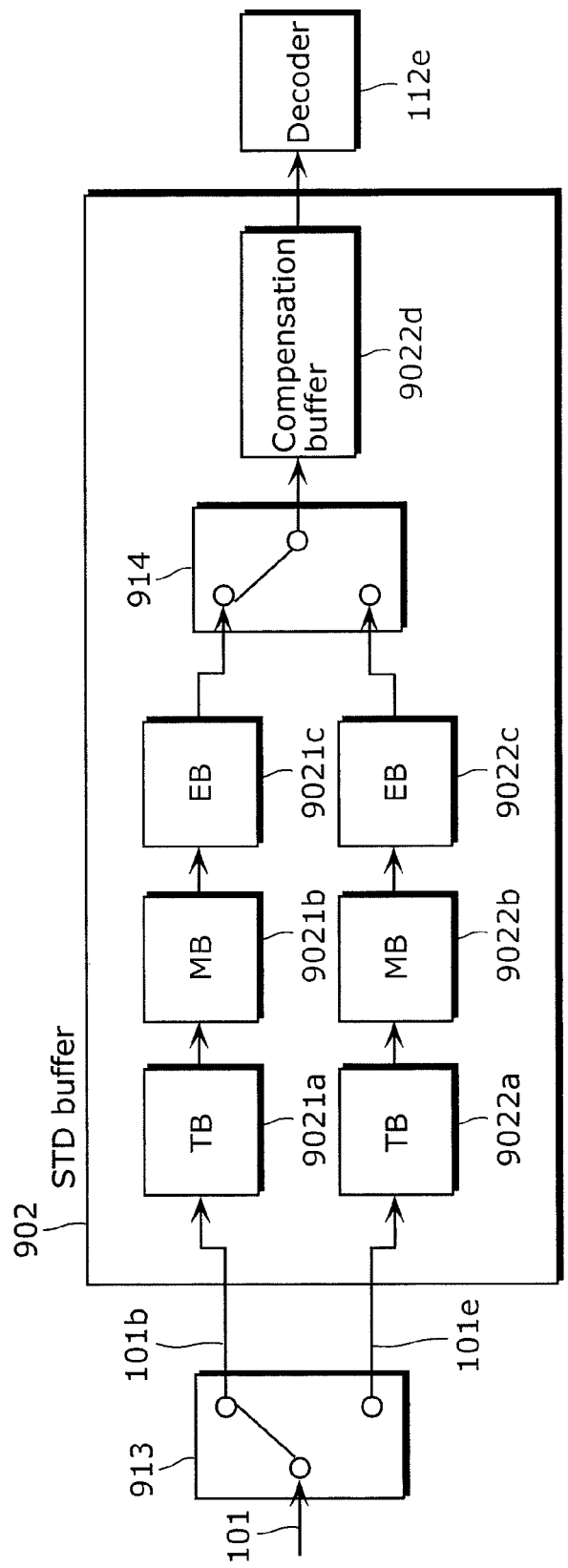
FIG. 8 is a view showing a variation of the layout of the compensation buffer shown in FIG. 5.

FIG. 7 and FIG. 8 are diagrams showing variations of the STD buffer 902 where the data of the first view and the data of the second view are processed in different channels.

First, FIG. 7 will be explained. A multiplexed bitstream 101 is divided by a switch 913 into a packet 101b of the first view and a packet 101e of the second view based on identification information in a transport stream packet, such as a packet indicator (PID). To reproduce only the first view, only the transport packet of the first view is selected by the switch 913, and the transport packet of the second view is discarded.

The packet of the first view is transmitted through a transport buffer 9021a, a multiplexing buffer 9021b, and an elementary stream buffer 9021c. The packet of the second view is transmitted through a transport buffer 9022a, a multiplexing buffer 9022b, an elementary stream buffer 9022c, and a compensation buffer 9022d. The bitstream data of the first view and of the second view are provided to the decoder 112e via the switch 914 at corresponding decoding points in time.

The STD buffer 902 shown in FIG. 7 has a configuration which is compatible, for the first view, with the conventional STD buffer, and further has the compensation buffer 9022d for the second view. Such a configuration solves the problem of the STD buffer attributed to the decoding of two views.

In the STD buffer 902 shown in FIG. 8, the compensation buffer 9022d is provided downstream of the switch 914. It is to be noted that even when the number of views is three or more, the STD buffer 902 can deal with the respective views in different channels by selecting a view in the switch 913 and in the switch 914 as in the case of the variations shown in FIGS. 7 and 8. Furthermore, in the same configuration as shown in FIG. 7, the second view and the third and following views may both be dealt with by the same compensation buffer.

Next, the size of the compensation buffer 022d will be explained.

First, a data amount DATA_IN flows into the elementary stream buffer 902c within the decoding period for the first view. The data amount DATA_IN is obtained by multiplying a maximum influx rate Rin by the decoding time for the first view (which is equal to the frame period $\Delta t/2$), where Rin represents the maximum rate of data influx from the multiplexing buffer to the elementary stream buffer. The calculation formula is as follows:

$$\text{DATA\_IN} = (\tfrac{1}{2}) \times \Delta t \times R\text{in} \quad \text{(Equation 1)}$$

The maximum influx rate Rin is determined based on the maximum bit rate of the MVC stream in the multiplexed bitstream 101 or based on the maximum rate defined at a level at which the MVC stream is, as disclosed by the non-patent literature 1. This level indicates information which defines upper limits of parameters such as a bit rate, a buffer size, an image size, and a frame rate. The parameters have different upper limits for different levels. Furthermore, the information such as the level and the bit rate of the MVC stream can be coded within the bitstream of the MVC so that the 3D image decoding device 001 can retrieve the information to determine the maximum influx rate Rin. However, the upper limit of DATA_IN is limited by the size EB_SIZE of the elementary stream buffer.

Furthermore, the overflow of the elementary stream buffer shown in the example of FIG. 42 or the like is attributed to the fact that the data of the second view cannot be extracted at the decoding point in time for the first view. The size of the compensation buffer therefore only needs to be equal to or greater than the upper limit of the data size of the second view (which is hereinafter referred to as View2_MAX). The value of View2_MAX is defined by a coding standard such as MVC. For example, a ratio in the number of bits between an original image and a coded image is defined by a parameter called a minimum compression ratio (MinCR). When MinCR is 2, the size of the coded image is limited to no more than half the number of bits of the original image. The data size of the original image can be determined based on its image size, a method of sampling chrominance information, or the like. In addition, View2_MAX may be determined based on the upper limit of the total data size of all views.

It is also possible that the compensation buffer is of a size which is the smallest value (which is hereinafter referred to as COMP_BUF_SIZE) of three parameters; DATA_IN, EB_SIZE, and View2_MAX. Alternatively, a value may simply be selected, as the size of the compensation buffer, from the values of the three parameters. The size of the compensation buffer thus set is determined assuming the worst case. The size of the compensation buffer necessary for an actual bitstream is COMP_BUF_SIZE or less and varies depending coding requirements.

Accordingly, it is also possible that in decoding a bitstream, the 3D image coding device sets a time necessary for decoding for each view, determines, based on the set time, a size of the compensation buffer that is actually needed, and codes, as parameter information within the bitstream, information indicating the determined size. Retrieving this parameter information, the 3D image decoding device can determine and secure the size of the compensation buffer.

It is to be noted that the value set as a time for decoding for each view can be included in the parameter information. Furthermore, in the 3D image coding device, plural values may be provided as candidates for the time necessary for decoding for each view so that the parameter information includes sizes of the compensation buffer which correspond to the respective candidates. In this case, the 3D image decoding device determines a size of the compensation buffer by selecting one of the candidates which corresponds to its own process speed.

The compensation buffer 902d shown in FIG. 5 is a buffer for storing a bitstream. This allows for further reduction in the size of a buffer, rather than placing the compensation buffer at a stage of the multiplexing buffer including an overhead of a PES packet or at a stage of the transport buffer including not only the overhead of the PES packet but also an overhead of a transport packet.

On the other hand, there is a case where the compensation buffer cannot be placed at a stage of the elementary stream buffer, for example, when an elementary stream buffer-embedded decoder is incorporated into the playback device. In such a case, the compensation buffer may be placed at the same stage as the multiplexing buffer. Because the bitstream stored in the multiplexing buffer has a PES packet, the size of the compensation buffer is set by adding overhead for the header of the PES packet and for other multiplexing to COMP_BUF_SIZE. The size of the overhead can be determined based on a specified proportion of the overhead in the data held by the multiplexing buffer.

The size of the compensation buffer may be set at any value which is no less than COMP_BUF_SIZE. Providing the STD buffer with the compensation buffer thus set will solve the problems.

Figure 9:
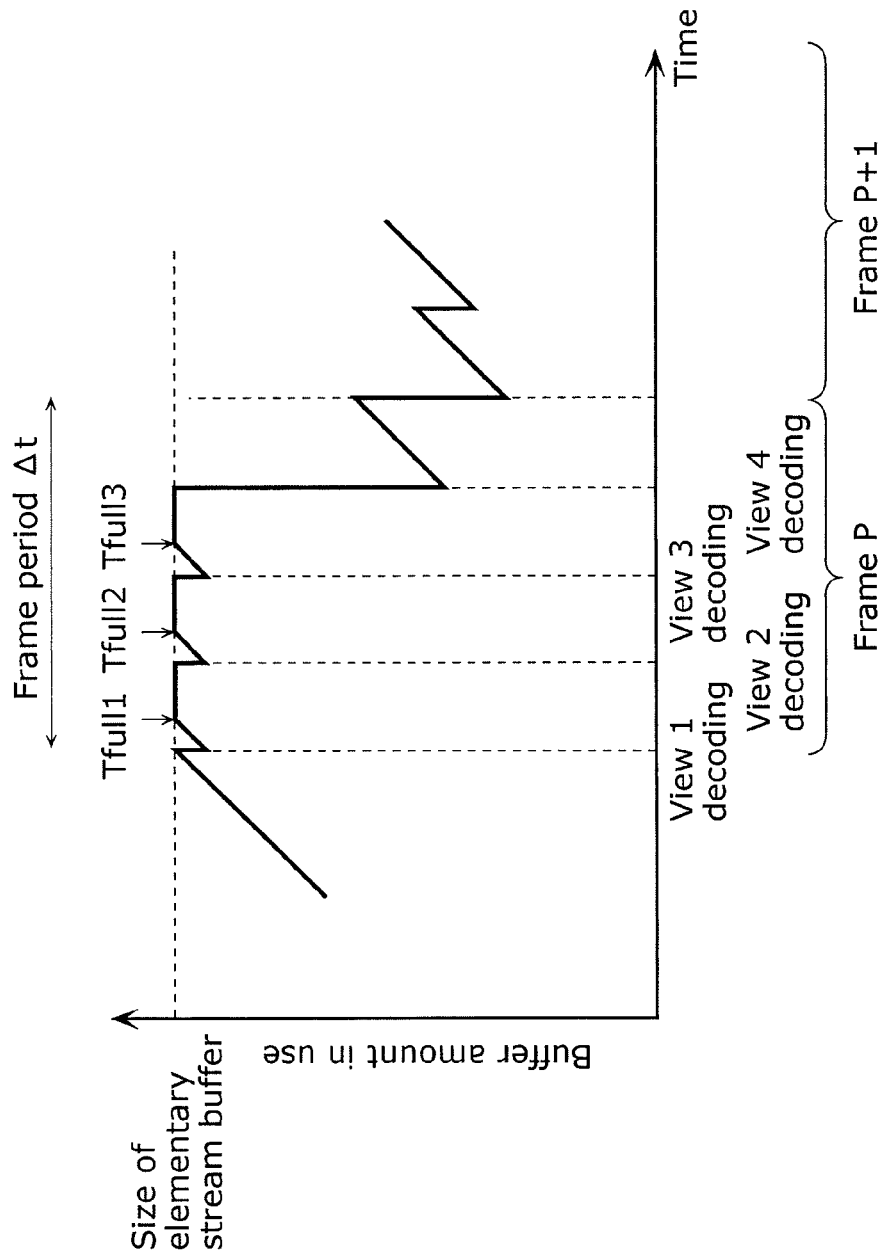
FIG. 9 is an illustration of an operation with two or more views.

FIG. 9 is an illustration of a method of determining COMP_BUF_SIZE in decoding two or more views. Decoding two or more views includes not only a situation where decoded views are all to be displayed but also a situation where, for example, among ten views, two views are selected for display and these selected two views refer to other two views, resulting in that decoding the four views is necessary.

FIG. 9 shows a transition of the amount of the elementary stream buffer in use in decoding four views. Because the first view View1 to the third view View3 which have been coded are small in amount, the buffer overflows, during decoding of each view, at corresponding points in time Tfull1, Tfull2, and Tfull3. The bitstream data is therefore not provided.

Assuming that it takes a frame period $\Delta t/4$ to decode each view, then the maximum data size that decoding the first to third views impedes the data input to the buffer will be $(3/4) \times$ Rin. This value is equivalent to DATA_IN.

Likewise, DATA_IN is determined by the following equation 2 where n represents the number of views and Tmax represents the maximum length of time necessary for decoding each frame included in each view.

$$\text{DATA\_IN} = Rin \times Tmax \times (n-1) \quad \text{(Equation 1)}$$

Secondly, View2_MAX is determined by summing upper limits of data sizes of three views from View2 to View4. Lastly, three types of values including EB_SIZE are compared to each other to determine COMP_BUF_SIZE. Alternatively, from the values of the three parameters, a value may be selected as the size of the compensation buffer. Providing the STD buffer with the compensation buffer thus set will solve the problems.

However, in this method, the size of the compensation buffer may possibly increase along with an increase in the number of views to be decoded. Therefore, the size of the compensation buffer may be limited to, for example, double the upper limit of the data size of the view, and in coding, it may be designed such that the 3D image coding device performs coding within this limit.

In addition, it is also possible to eliminate the need for the compensation buffer by raising the maximum flux rate. It is only necessary that data of a size equal to COMP_BUF_SIZE is additionally loaded into the elementary stream buffer during the decoding period for the second view. For example, within the decoding period for the second view, the data is read at a data loading rate determined by Rin+COMP_BUF_SIZE/($\Delta t/2$). Alternatively, more simply, the data may be read at a rate double Rin.

Figure 10:
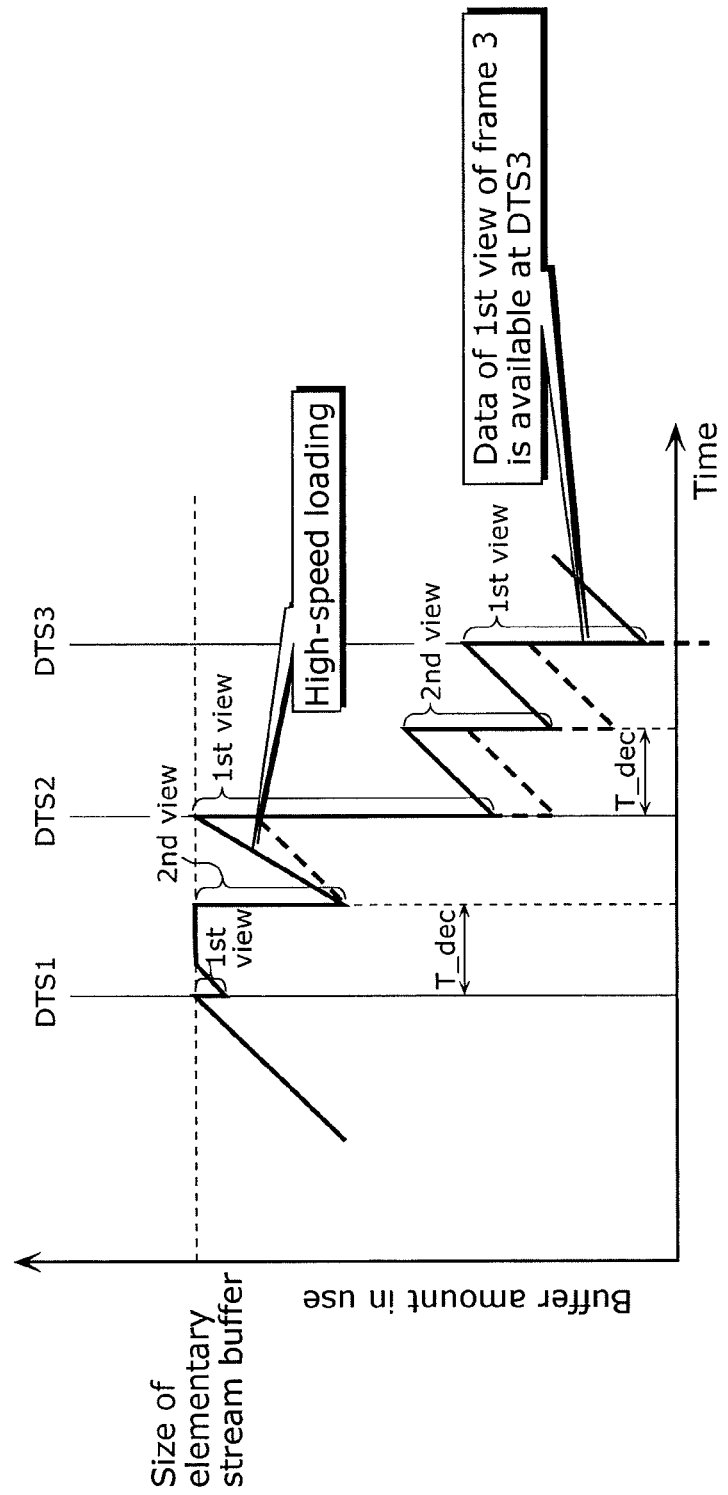
FIG. 10 is an illustration of an operation in high-speed loading.

FIG. 10 is a view showing an operation example in which a bitstream which is the same as that in FIG. 42 is decoded. In the graph, solid lines represent an operation of the present method while dotted lines represent an operation of the conventional playback device. During the decoding period for the second view of the frame 1, data is loaded at a higher rate than Rin, so that the data of the first view of the frame 3 is available at DTS3. It may also be designed such that data is loaded at high speed only when the elementary stream buffer overflows during the decoding period for the first view as in the operation shown in FIG. 10.

Figure 11:
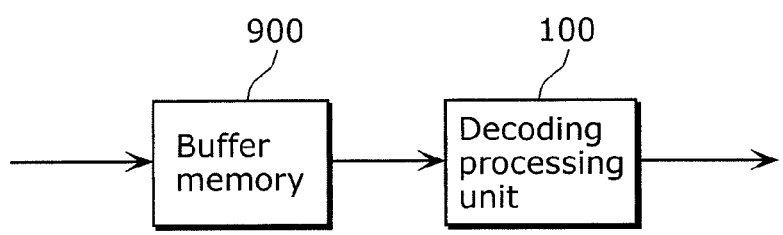
FIG. 11 is a view showing components according to the first embodiment of the present invention.

FIG. 11 is a view showing characteristic components of the 3D image decoding device according to the first embodiment. The 3D image decoding device according to the first embodiment includes a buffer memory 900 which is implemented by the STD buffer 902 or the like, and a decoding processing unit 100 which is implemented by the decoder 112e or the like.

The buffer memory 900 holds a bitstream which is to be provided to the decoding processing unit 100. The decoding processing unit 100 then decodes the bitstream of the first view and the bitstream of the second view. Here, the decoding processing unit 100 first decodes a frame of the first view and then decodes a frame of the second view with reference to the decoded frame. Thus, plural views coded using inter-view prediction are decoded.

Furthermore, increasing the size of the buffer memory 900 or loading data into the buffer memory 900 at high speed enables more reliable decoding of plural views coded using inter-view prediction.

Figure 12:
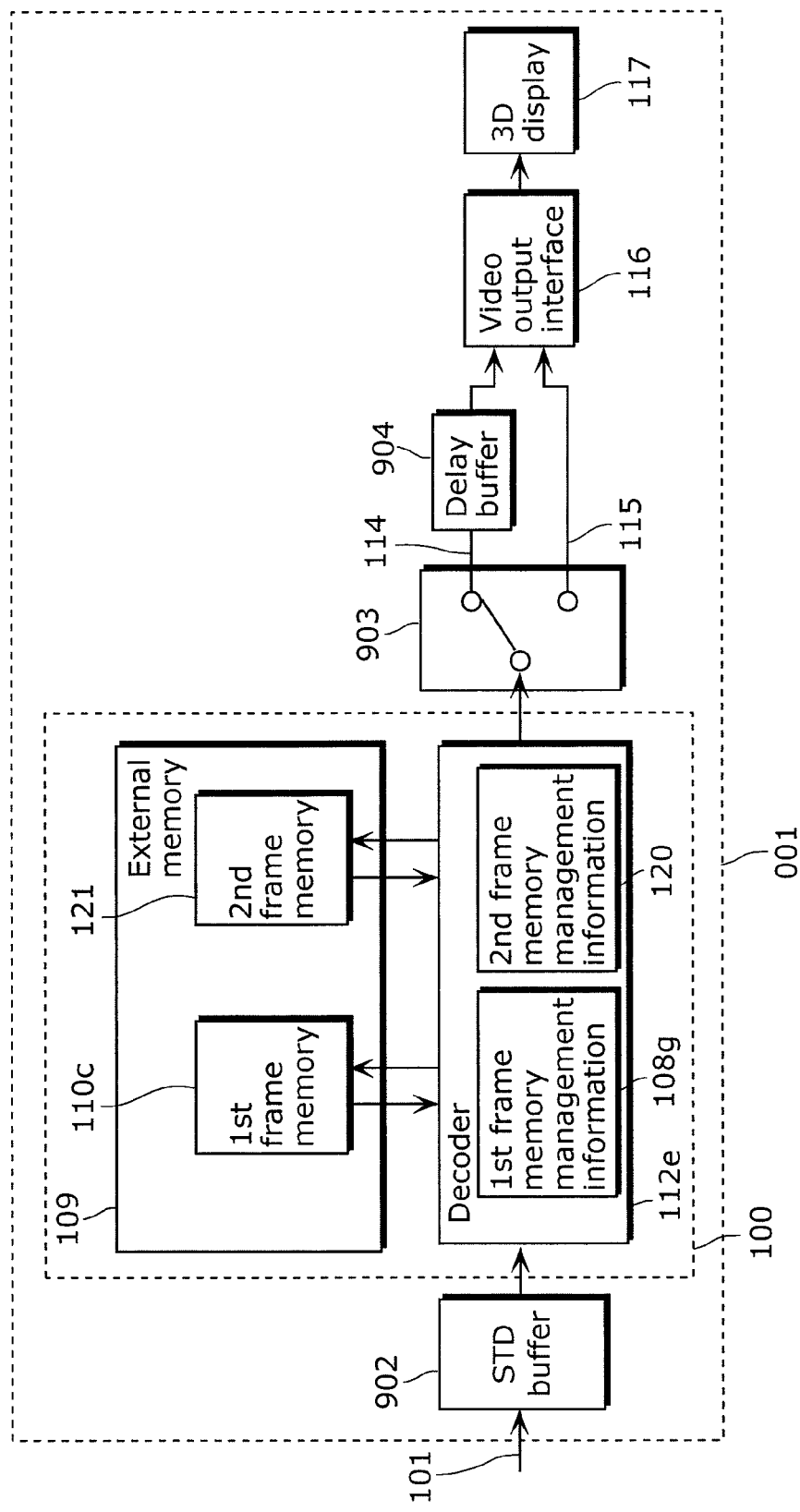
FIG. 12 is a block diagram in a variation of the 3D image decoding device according to the first embodiment of the present invention.

FIG. 12 is a block diagram of a 3D image decoding device according to the first embodiment of the present invention and is a view showing a variation of the 3D image decoding device 001 shown in FIG. 1.

In addition to the 3D image decoding device 001 shown in FIG. 1, a delay buffer 904 is provided in an image decoding path for the first view. This makes it possible to adjust display timing for the first view.

Figure 13:
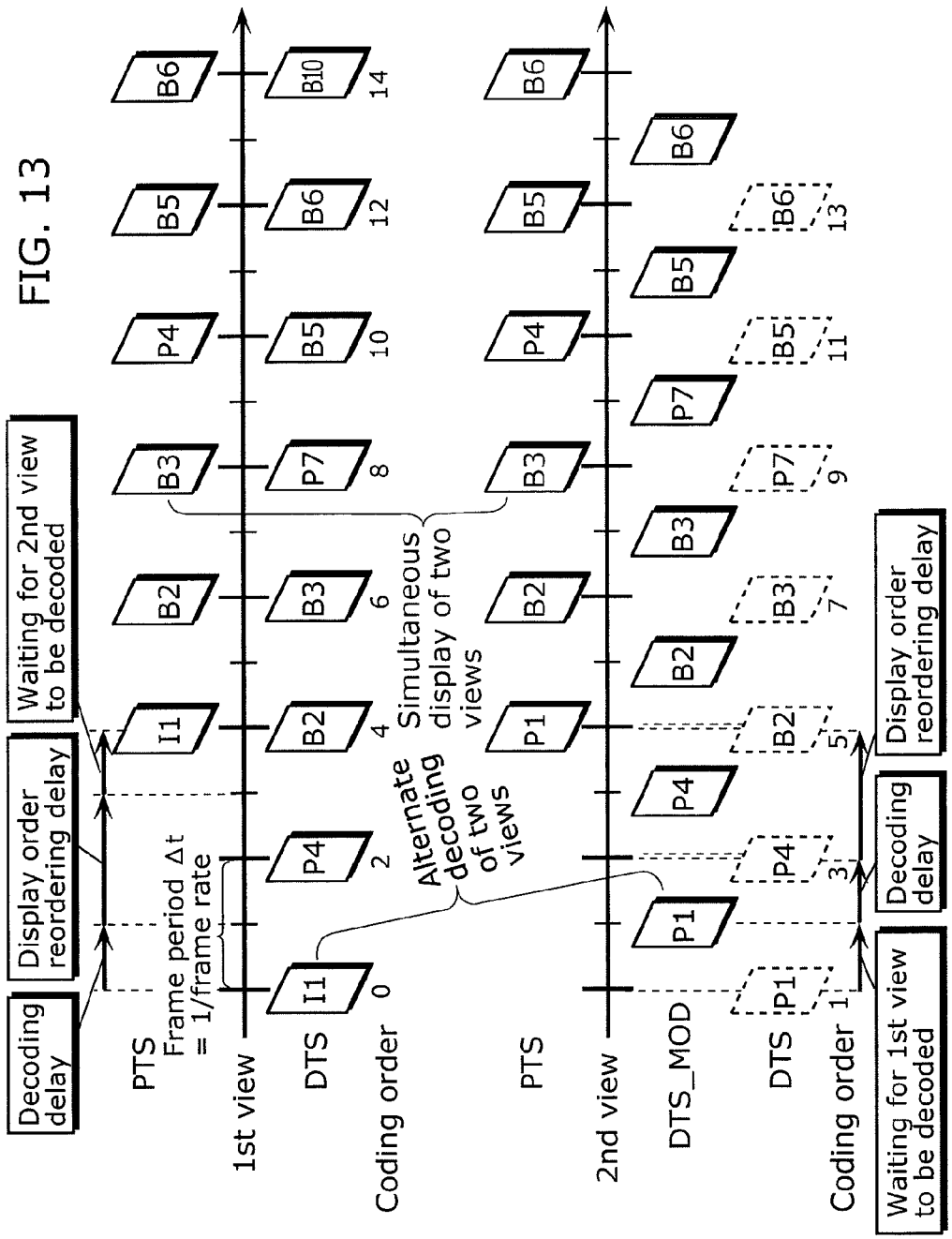
FIG. 13 is a view showing an example of actual decoding points in time and displaying points in time for respective views in the variation of the first embodiment of the present invention.

FIG. 13 is a view showing an example of actual decoding points in time and displaying points in time for respective views in the 3D image decoding device 001 shown in FIG. 12. As compared to the decoding points in time and the display points in time shown in FIG. 2, an adjustment is made so that the first view and the second view are displayed at the same point in time. The 3D image decoding device 001 shown in FIG. 12 can display the first view and the second view at the same point in time owing to the delay buffer 904.

As above, the 3D image decoding device 001 in the first embodiment is capable of decoding plural views coded using inter-view prediction, even when decoding is not instantly completed. In addition, the plural views coded using inter-view prediction are decoded more reliably with an appropriate buffer memory size or by high-speed loading.

Second Embodiment

Next, the second embodiment will be explained. A 3D image decoding device in the second embodiment has two decoders. Each of the decoders performs decoding at a rate equal to a display frame rate.

Figure 14:
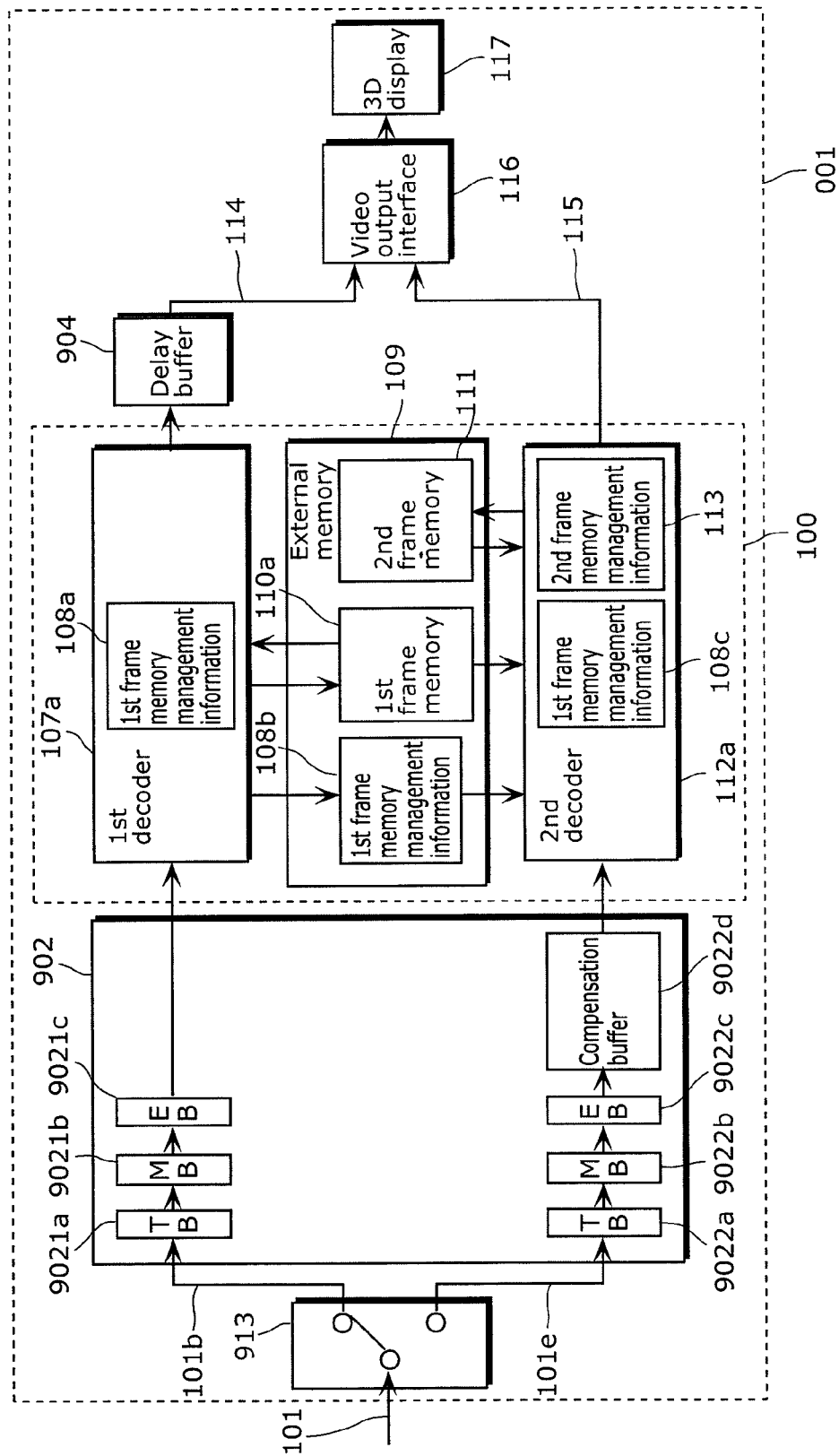
FIG. 14 is a block diagram of a 3D image decoding device according to the second embodiment of the present invention.

FIG. 14 is a block diagram of the 3D image decoding device according to the second embodiment of the present invention. The 3D image decoding device 001 shown in FIG. 14 includes a STD buffer 902 which is equivalent to the STD buffer 902 shown in FIG. 7. The STD buffer 902 is connected to the two decoders, not via the switch 914 which is shown in FIG. 7. A first decoder 107a decodes the first view, and a second decoder 112a decodes the second view.

The first decoder 107a copies decoded frames onto a first frame memory 110a in an external memory 109 and copies first frame memory management information 108a, which indicates positions of the frames, onto first frame memory management information 108b in the external memory 109.

A second decoder 112a copies the first frame memory management information 108b in the external memory 109 onto first frame memory management information 108c in the second decoder 112a. The second decoder 112a refers to the first frame memory management information 108c and thereby decodes the second view with reference to frames of the first view. Furthermore, the second decoder 112a copies decoded frames onto a second frame memory 111 in the external memory 109 and holds second frame memory management information 113, which indicating positions of the frames so that the decoded frames can be used for inter prediction.

The decoded frames, i.e., a decoded image 114 of the first view and a decoded image 115 of the second view, are transmitted through a video output interface 16 and thus displayed on a 3D display 117. In the path for the first view, the delay buffer 904 is provided. This allows for adjustment of the display timing for the first view.

Figure 15:
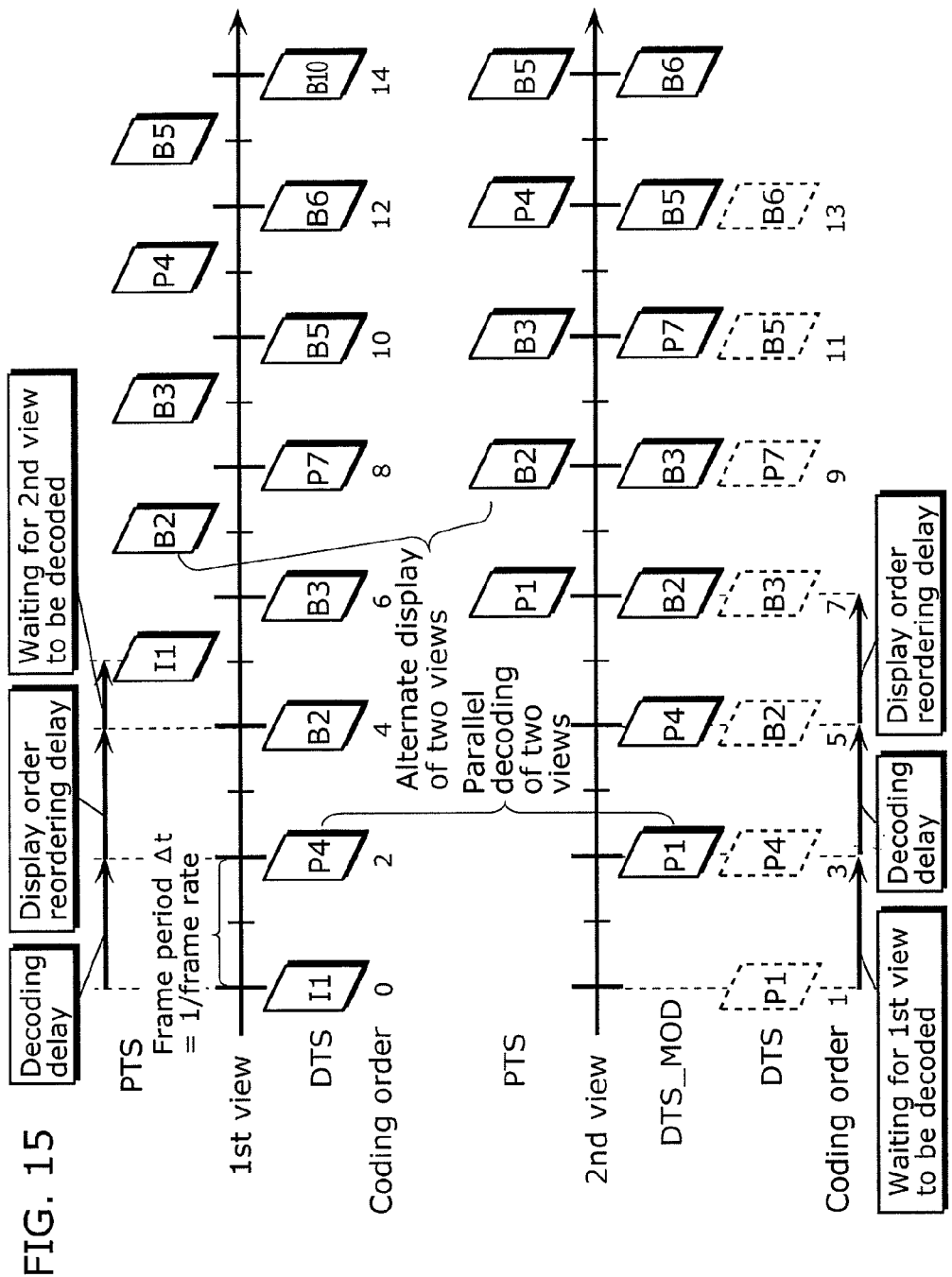
FIG. 15 is a view showing an example of actual decoding points in time and displaying points in time for respective views in the second embodiment of the present invention.

FIG. 15 is a view showing an example of actual decoding points in time and displaying points in time for respective views in the 3D image decoding device 001 shown in FIG. 14.

The 3D image decoding device 001 shown in FIG. 14, which has the two decoders, is capable of decoding the two views in parallel. It is therefore not necessary to perform decoding alternately. However, in the 3D image decoding device 001 shown in FIG. 14, there is a decoding delay for a time equal to the frame period Δt. A frame of the second view is decoded after a frame of the first view is decoded because the frame of the second view is decoded with reference to the frame of the first view. Consequently, decoding of the frame of the second view is delayed by the same length of time as the frame period Δt and therefore at the same time as a frame of the first view is decoded.

Figure 16:
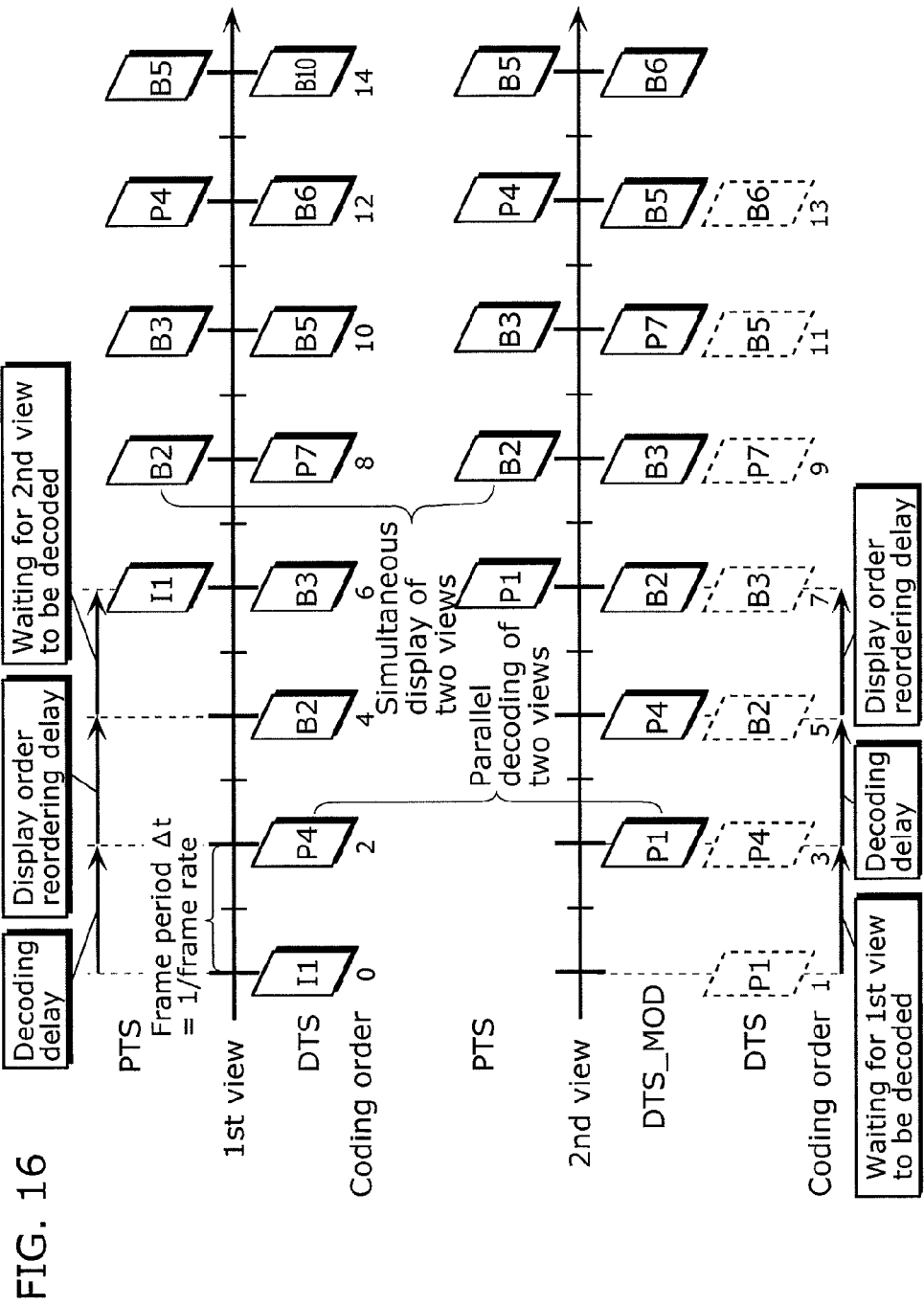
FIG. 16 is a view showing a variation of actual decoding points and display points for respective views shown in FIG. 15.

FIG. 16 is a view showing an example of actual decoding points in time and displaying points in time for respective views in the 3D image decoding device 001 shown in FIG. 14, which example is different from the example shown in FIG. 15.

As compared to the decoding points in time and the display points in time shown in FIG. 15, the decoding points in time and the display points in time shown in FIG. 16 are adjusted so that the first view and the second view are displayed at the same point in time. The 3D image decoding device 001 shown in FIG. 14 can thus display the first view and the second view at the same point in time owing to the delay buffer 904.

It is to be noted that although the 3D image decoding device 001 in the second embodiment has two decoders, it may have three or more decoders. In such a case, when the 3D image decoding device 001 decodes the plural views coded using inter-view prediction, there is a delay for the number of layers of the view which is referred to.

Figure 17:
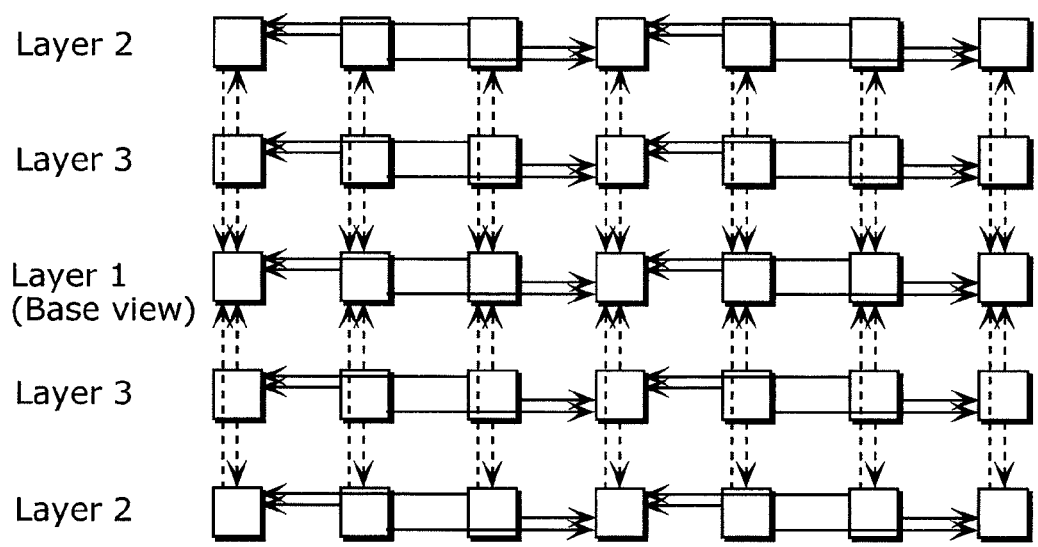
FIG. 17 is a view showing an example of a relation among plural views as to how they refer to each other.

FIG. 17 is a view showing an example of a relation among five views as to how they refer to each other. A view in Level 2 refers to a view in Level 1, and a view in Level 3 refers to a view in Level 2. In this case, even if frames have an identical DTS assigned, there is a decoding delay for two frames. That is, a delay period depends on the number of layers of the views which are referred to, which number is smaller than the number of views included in the plural views.

Therefore, an amount of data loaded for the delay period, which is denoted by DATA_IN, is determined by the following equation 3 where Rin represents the maximum influx rate, Tmax represents the maximum length of time necessary for decoding each frame, and m represents the maximum number of layers of the views which are referred to in inter-view prediction.

$$DATA\_IN = Rin \times Tmax \times (m-1) \qquad \text{(Equation 3)}$$

A compensation buffer thus set may be added to the STD buffer.

As above, even with plural decoders, the 3D image decoding device 001 in the second embodiment is capable of decoding plural views coded using inter-view prediction, because the plural decoders share reference pictures that are used in inter-view prediction.

Third Embodiment

Next, the third embodiment will be explained. A 3D image coding device in the third embodiment codes images so that the images can be decoded even when there is a decoding delay in a 3D image decoding device.

Figure 18:
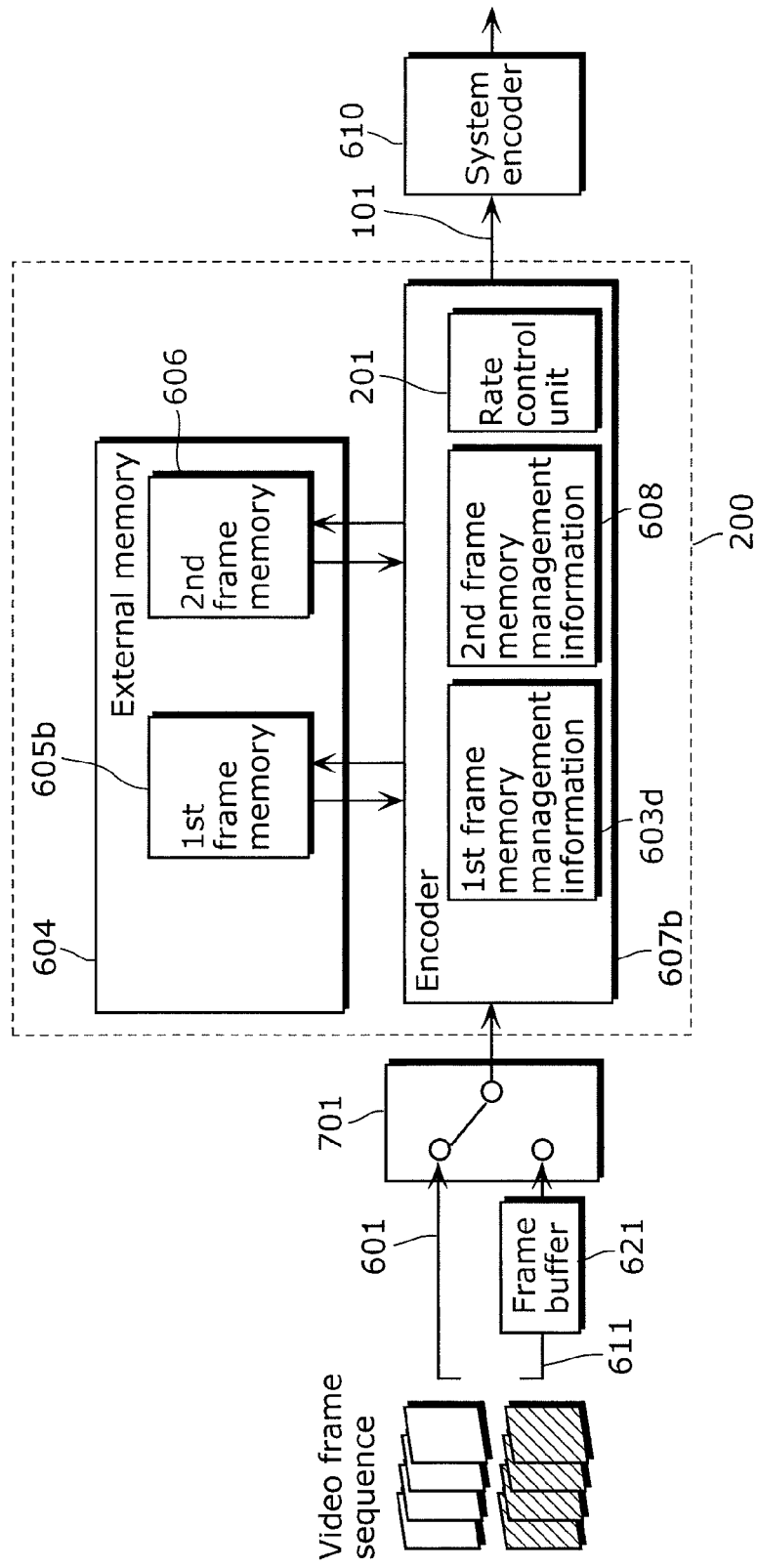
FIG. 18 is a block diagram of a 3D image coding device according to the third embodiment of the present invention.

FIG. 18 is a block diagram of the 3D image coding device according to the third embodiment of the present invention. An image 601 of the first view and an image 611 of the second view are provided to an encoder 607b in a coding processing unit 200 via a switch 701. The image 611 of the second view may be provided alternatively by way of a frame buffer 621. This makes it possible to delay a start of coding of the image 611 of the second view until coding of the image 601 of the first view is completed.

The encoder 607b codes the first view and the second view. Furthermore, the encoder 607b locally decodes frames of each of the first view and the second view, which frames are used for inter prediction, and copies the decoded frames of each of the views into a corresponding one of a first frame memory 605b and a second frame memory 606 in an external memory 604. Moreover, the encoder 607b holds first frame memory management information 603d and second frame memory management information 608 which indicate positions of the frames. The encoder 607b then uses the first frame memory management information 603d to refer to the first frame memory 605b, thereby coding the second view.

A rate control unit 201 causes the encoder 607b to perform coding such that a bitstream coded will be loaded into the 3D image decoding device at a predetermined rate. For example, a compression ratio, a frame rate, the number of pixels, and so on are adjusted. This reduces the occurrence of overflows in the 3D image decoding device.

The first view and the second view thus coded are outputted in form of a multiplexed bitstream 101 via a system encoder 610.

Figure 19:
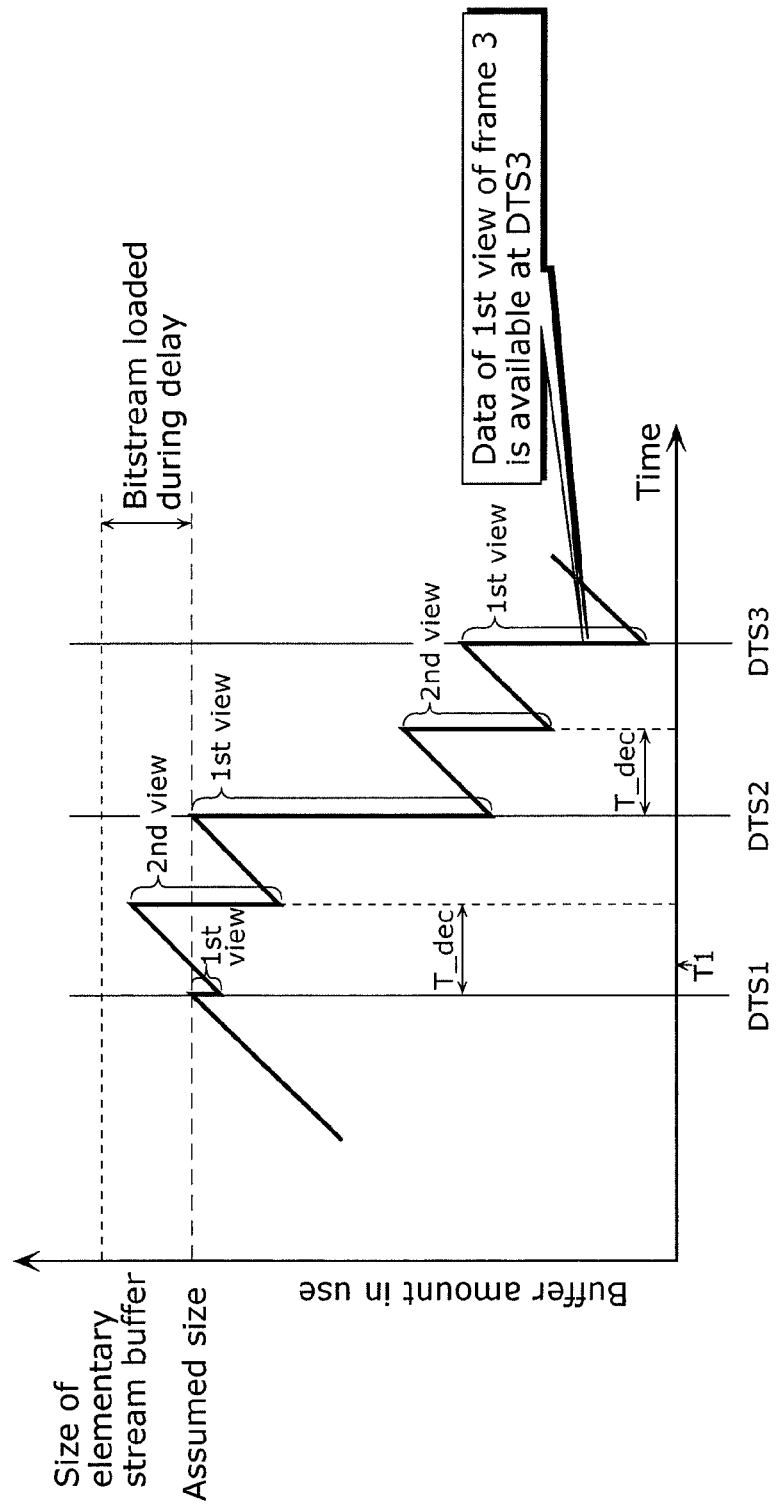
FIG. 19 is a view showing an effect of the 3D image coding device according to the third embodiment of the present invention.

FIG. 19 is view showing an effect of the 3D image coding device according to the third embodiment of the present invention.

The 3D image coding device shown in FIG. 18 performs coding assuming that the 3D image decoding device is provided with the elementary stream buffer of an assumed size shown in FIG. 19. To be specific, the 3D image coding device performs coding up to a limit which results from subtracting the size of the bitstream loaded for a period in which decoding is delayed, from the actual size of the elementary stream buffer provided in the 3D image decoding device. This enables reliable loading of bitstreams even while decoding is delayed.

The size of the bitstream loaded for a period in which decoding is delayed corresponds to DATA_IN mentioned in the first embodiment and is thus determined by, for example, the equation 2 in the first embodiment. The limit in coding can be a value that is determined by subtracting the size of the bitstream loaded for a period in which decoding is delayed, from a predetermined size which is set assuming that decoding is instantly completed.

Figure 20:
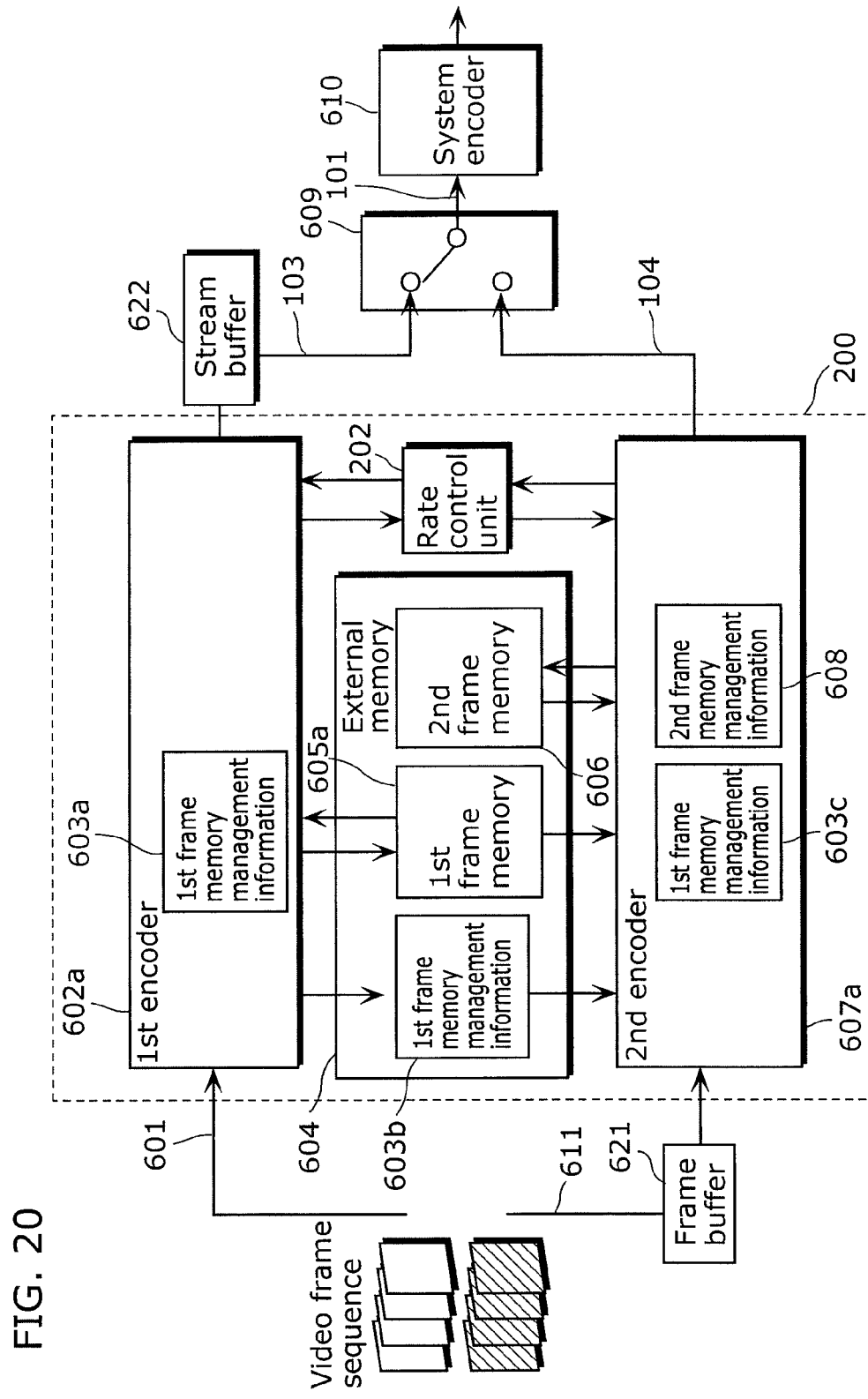
FIG. 20 is a block diagram of a variation of the 3D image coding device according to the third embodiment of the present invention.

FIG. 20 is a block diagram of the 3D image coding device according to a variation of the third embodiment of the present invention. The 3D image coding device shown in FIG. 20 has two encoders of a first encoder 602a and a second encoder 607a. Furthermore, the 3D image coding device includes a rate control unit 202 connected to the first encoder 602a and the second encoder 607a.

The two encoders share frames just as the two decoders shown in FIG. 14. That is, the first encoder 602a codes a frame of the first view and then locally decodes the coded frame so that the frame of the first view is stored in the first frame memory 605a. In addition, the first encoder 602a copies first frame memory management information 603a, which indicates a position of the frame, onto first frame memory management information 603b. The second encoder 607a copies the first frame memory management information 603b onto first frame memory management information 603c. The second encoder 607a then refers to the first frame memory management information 603c to refer to the frame of the first view and thereby uses inter-view prediction to code the second view.

A rate control unit 202 controls coding just as the rate control unit 201 shown in FIG. 18. To be specific, the rate control unit 202 causes the first encoder 602a and the second encoder 607a to perform coding such that bitstreams coded will be loaded into the 3D image decoding device at a predetermined rate. The bitstreams coded by the two encoders are then outputted via a switch 609.

With this configuration, even the 3D image coding device having two encoders can limit the size of the bitstreams which are to be loaded into the 3D image decoding device. Moreover, sharing a picture which is to be used for inter-view prediction enables effective coding.

It is to be noted that an image 611 of the second view may be provided by way of a frame buffer 621 as in the case of the 3D image coding device shown in FIG. 18. This makes it possible to delay a start of coding of the image 611 of the second view until coding of an image 601 of the first view is completed.

In addition, a bitstream 103 of the first view coded by the first encoder 602a may be outputted via a stream buffer 622. This allows the bitstream 103 of the first view to be superimposed onto a frame of the second view which belongs to the same point in time, upon completion of coding of the frame of the second view. Thus, frames belonging to the same point in time are superimposed with the same timing.

As above, the 3D image coding device in the third embodiment codes plural views using inter-view prediction so that no underflows occur in the image decoding device. Moreover, even with plural encoders, the 3D image coding device in the third embodiment is capable of coding plural views using inter-view prediction, because the plural encoders share reference pictures that are used in inter-view prediction.

Fourth Embodiment

Next, the fourth embodiment using the image coding method and image decoding method according to the present invention will be explained with reference to the drawings. The fourth embodiment is based on the assumption that different values may be set as DTS and PTS for each view. It is to be noted that even in the case where DTS and PTS are set at an identical value in accordance with a standard, DTS and PTS indicated in the fourth embodiment may be used as points in time at which images are actually decoded and displayed.

Figure 21:
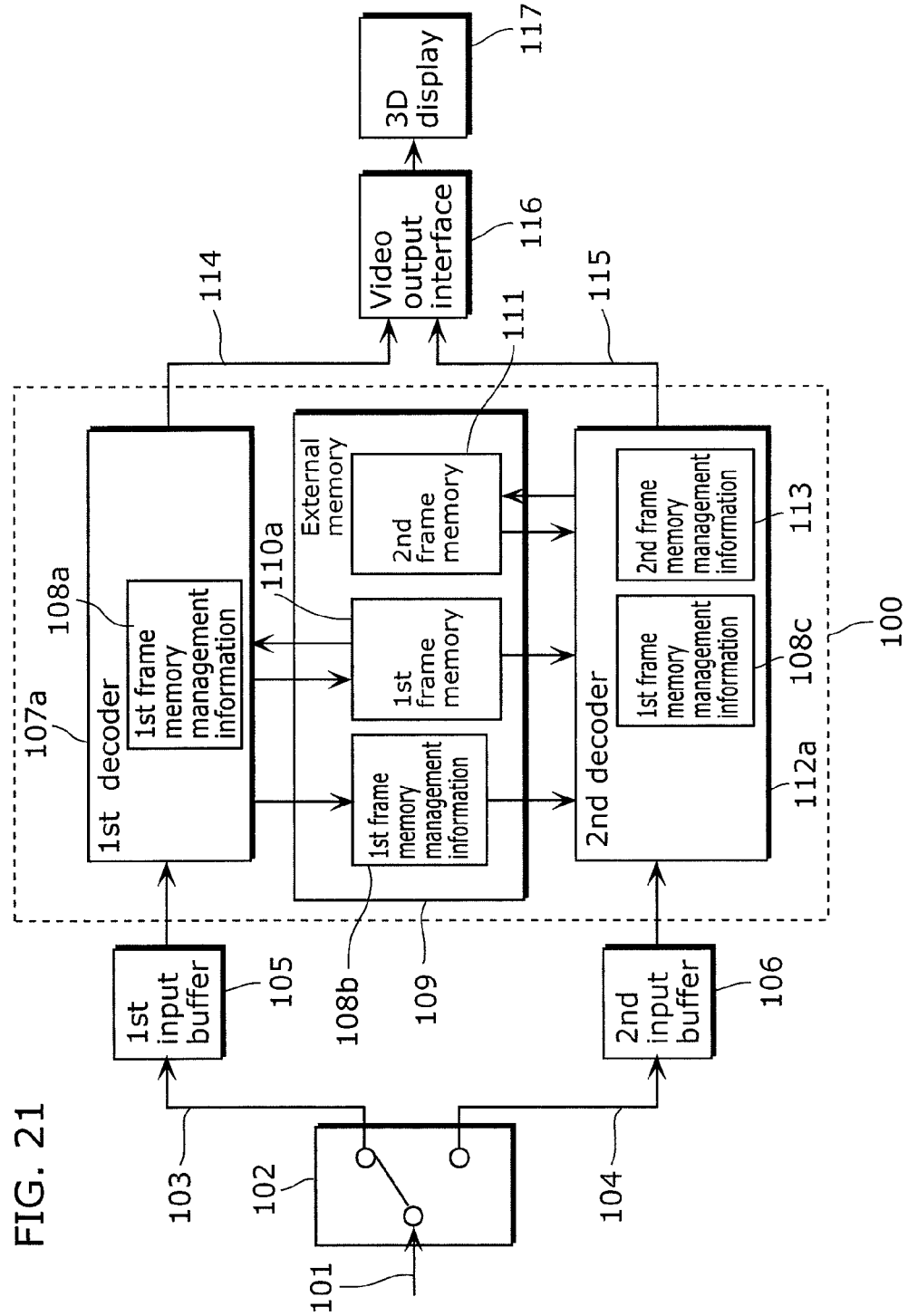
FIG. 21 is a block diagram of a 3D image decoding device according to the fourth embodiment of the present invention.

FIG. 21 is a block diagram of a 3D image decoding device 004 according to the fourth embodiment. The 3D image decoding device in FIG. 21 has two decoders; namely a first decoder 107a and a second decoder 112a, each of which is capable of decoding a video of one of the views of a 3D video at the same speed as a frame rate of the 3D video. The first decoder 107a decodes the first view, and the second decoder 112a decodes the second view. Because the second view has been coded with reference to the first view, the second decoder 112a is configured so as to be able to refer to a decoded image of the first view.

The operation of the 3D image decoding device shown in FIG. 21 will be explained. A multiplexed bitstream 101 provided is separated by a switch 102 into a bitstream 103 of the first view and a bitstream 104 of the second view. Each of the bitstreams resulting from the separation is provided into a corresponding one of a first input buffer 105 and a second input buffer 106. The provided bitstreams are then provided to a first decoder 107a and a second decoder 112a at DTS.

The first decoder 107a decodes the provided bitstream 103 of the first view, and the second decoder 112a decodes and the provided bitstream 104 of the second view. The decoders output a decoded image 114 of the first view and a decoded image 115 of the second view at PTS. The decoded images are transmitted through a video output interface 116 and thus displayed in 3D on a 3D display 117.

In a decoding process, the first decoder 107a and the second decoder 112a copy decoded frames which are referred to in coding using inter prediction, into a first frame memory 110a and a second frame memory 111 in an external memory 109. The copied frames will be held in the first frame memory 110a and the second frame memory 111 until no longer referred to.

Because each of the frame memories holds plural frames, the first decoder 107a and the second decoder 112a hold first frame memory management information 108a and second frame memory management information 113, respectively, to manage where a frame for each point in time is held in the first frame memory 110a or the second frame memory 111.

To code the second view, inter-view prediction coding is used in which a frame of the first view is referred to. The decoder 112e therefore needs to refer to a decoded image of the first view to perform decoding on the second view. Accordingly, every time decoding of a frame is completed, the first decoder 107a copies the first frame memory management information 108a into the eternal memory 109 where the first frame memory management information 108a is stored with the name of first frame memory management information 108b. Before starting to decode a frame, the second decoder 112a copies the first frame memory management information 108b thereinto and holds it as first frame memory management information 108c.

On the basis of the first frame memory management information 108c, the second decoder 112a refers to a decoded image of a desired frame of the first view held in the first frame memory 110a. The second decoder 112a then decodes the bitstream 104 of the second view coded in a coding method including the inter-view prediction coding.

It is to be noted that the bitstream 103 of the first view, which has been coded without referring to another view, can be decoded independently. Thus, the 3D image decoding device in the fourth embodiment can be used also as a 2D image decoding device by operating only the first decoder 107a without operating the second decoder 112a.

Furthermore, in the case where any anomaly such as a syntax error of a bitstream is detected in a decoding process of the second view in the second decoder 112a, the 3D image decoding device may notify an upper system of the anomaly of the second decoder 112a. The 3D image decoding device may then display only decoded images of the first view until normal decoding can resume, for example, from a random access point (that is a point at which independent reproduction can be started) of the bitstream. Alternatively, a decoded image of the first view may be displayed as a decoded image of the second view. With such a display, etc., it is possible to reduce viewer's discomfort.

Furthermore, in the case where any anomaly such as a syntax error of a bitstream is detected in a decoding process of the first view in the first decoder 107a, the second view, which refers to the first view, will not be normally decoded either. The 3D image decoding device may therefore notify an upper system of the anomaly of the first decoder 107a. The 3D image decoding device may then continue to output the last normally-decoded frame of each of the first view and the second view until normal decoding can resume, for example, from a random access point (that is a point at which independent reproduction can be started) of the bitstream. With such a display, etc., it is possible to reduce viewer's discomfort.

Figure 22:
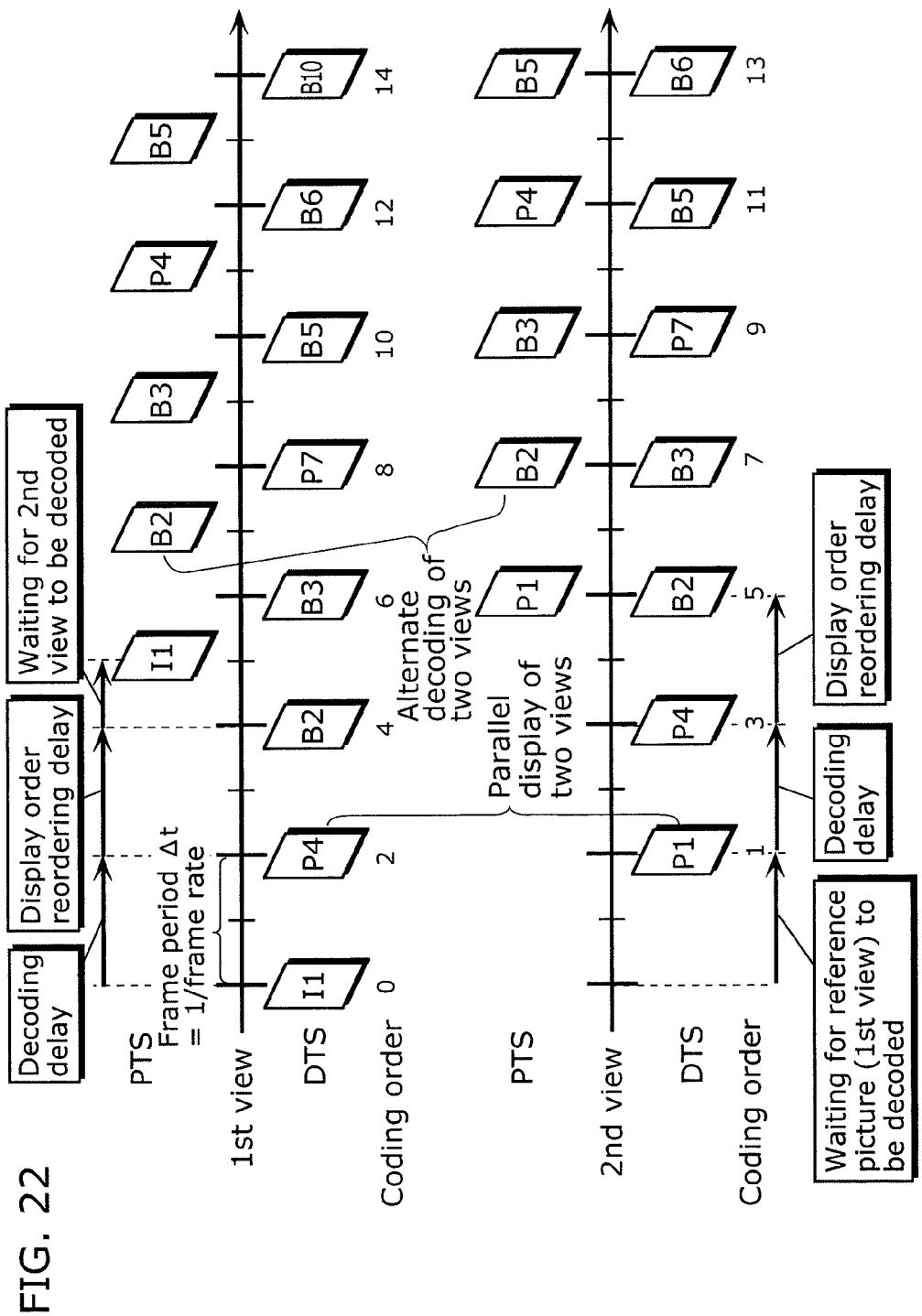
FIG. 22 is a view showing one example of PTS and DTS with which playback can be performed by a 3D image decoding device having two decoders.

FIG. 22 is a view showing one example of a relation between PTS and DTS for each view, in the decoding process by the 3D image decoding device shown in FIG. 21. In the example of FIG. 22, frames of each view have been coded so that the display order of frame types is I, B, B, and P and that the coding order of frame types is I, P, B, and B, where P frame is uni-predictive only while B frame may be bi-predictive.

Upon referring to the first view for the second view in the inter-view prediction, only a frame of the first view displayed immediately before is referred to. The first view and the second view are displayed alternately.

In the present example, first, a starting frame I1 of the first view is decoded. A starting frame P1 of the second view will then be decoded with reference to the starting frame I1 of the first view. Decoding of the starting frame P1 of the second view therefore cannot start until decoding of the starting frame I1 of the first view is completed.

The 3D image decoding device shown in FIG. 21 uses the first decoder 107a that operates at the same speed as a display frame rate. It therefore takes a frame period $\Delta t$ (=1/frame rate) to decode the starting frame I1 of the first view. Accordingly, DTS for the starting frame P1 of the second view is $\Delta t$ behind DTS for the starting frame I1 of the first view. The frame I1 of the first view is used to predict a frame P4 of the first view. It is therefore not until decoding of the frame I1 of the first view is completed that decoding of the frame P4 of the first view can start.

In the 3D image coding device shown in FIG. 21, the first view and the second view are decoded by separate decoders. It is therefore possible to decode the frame P4 of the first view at the same time as the frame P1 of the second view is decoded. Consequently, DTS for the frame P4 of the first view is identical with DTS for the frame P1 of the second view. Subsequently, frames B2, B3, P7, and B5 of the first view start to be decoded in this order at $\Delta t$ intervals and respectively at the same time as frames P4, B2, B3, and P7 of the second view start to be decoded.

Next, the PTS will be explained. In contrast to the display order, the last frame in decoding order is a B frame of the second view. Accordingly, the PTS for each frame of the first view and the second view is determined according to a point in time when the B frame of the second view can be displayed. To be specific, for the frame B2 of the second view, PTS is $\Delta t$ behind DTS because it takes $\Delta t$ to decode one frame. With this point in time as a reference, PTS is $5\Delta t/2$ behind DTS for the starting frame I1 of the first view, and PTS is $2\Delta t$ behind DTS for the starting frame P1 of the second view.

Figure 23:
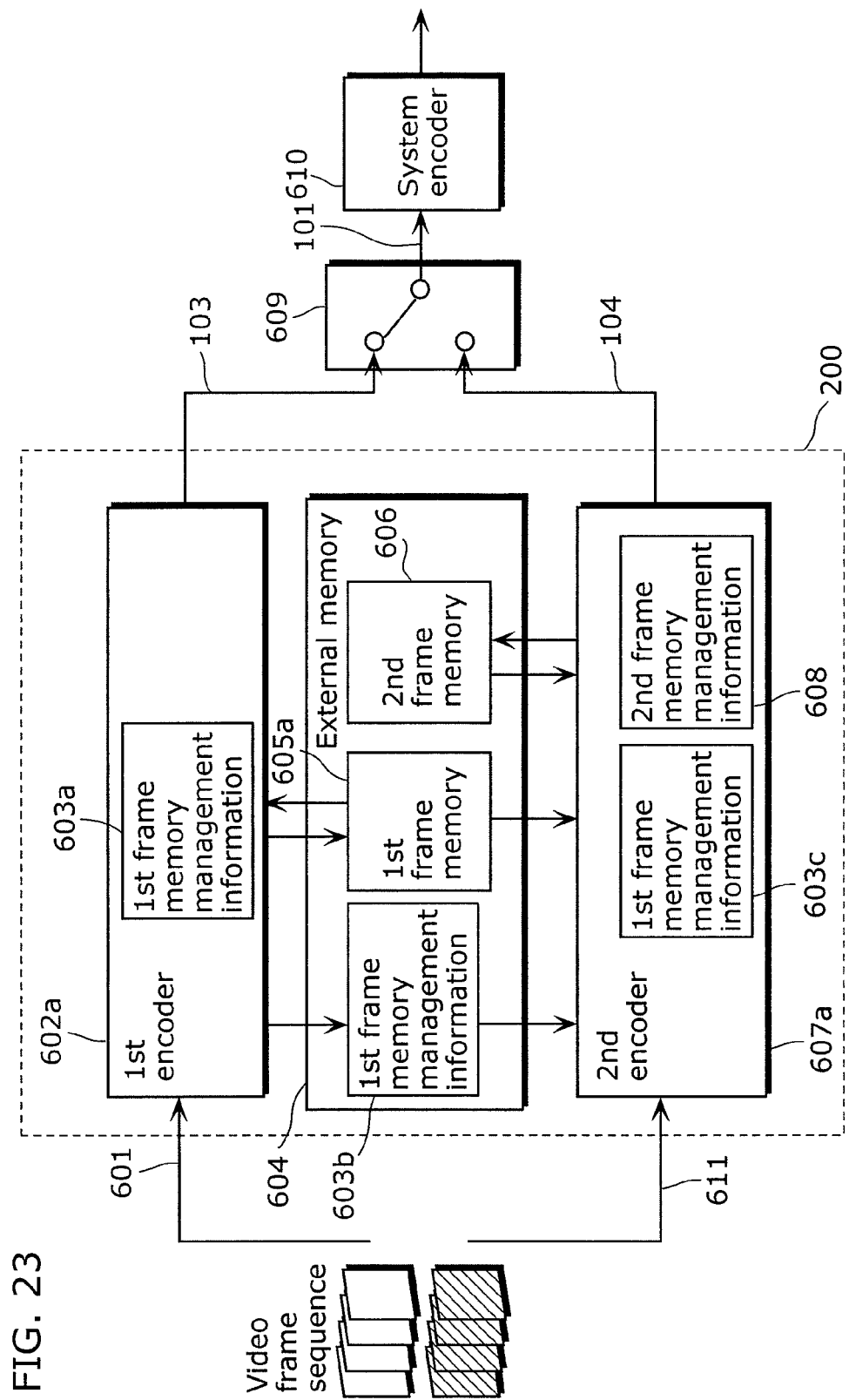
FIG. 23 is a block diagram of the 3D image coding device according to the fourth embodiment of the present invention.

FIG. 23 shows one example of a 3D image coding device which generates a bitstream decodable by the 3D image decoding device shown in FIG. 21. The 3D image coding device shown in FIG. 23 has two decoders; namely a first encoder 602a and a second encoder 607a, each of which is capable of coding a video of one of the views of a 3D video at the same speed as a frame rate of the 3D video. The first encoder 602a codes the first view, and the second encoder 607a codes the second view. Because the second view is coded with reference to the first view, the second encoder 607a is configured so as to be able to refer to a locally decoded image of the first view.

The configuration for referring to a locally decoded image is the same as the 3D image decoding device in FIG. 21. To be specific, on the basis of first frame memory management information 603c, the second encoder 607a refers to a locally decoded image of a desired frame of the first view held in a first frame memory 605a. The second encoder 607a then codes an image 611 of the second view in a coding method including the inter-view prediction coding.

Figure 24:
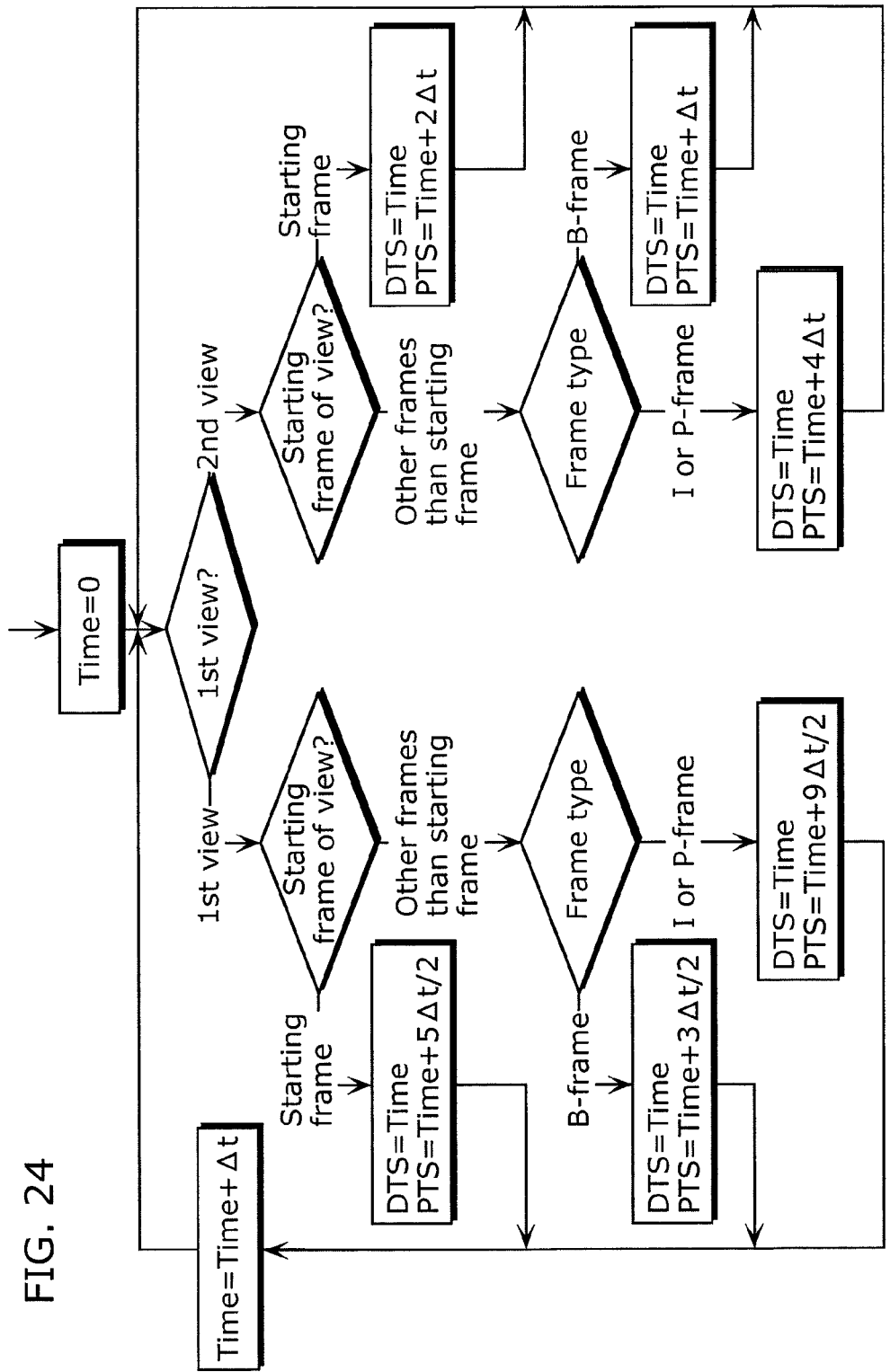
FIG. 24 is a flowchart showing one example of a method of determining PTS and DTS shown in FIG. 22.

FIG. 24 is a flowchart showing a procedure for assigning DTS and PTS to a frame of the first view and a frame of the second view alternately according to the coding order shown in FIG. 22, in a system encoder 610 of the 3D image coding device shown in FIG. 23. In the 3D image coding device shown in FIG. 23, assigning DTS and PTS based on the flowchart of FIG. 24 can result in DTS and PTS shown in FIG.

22. This enables the 3D image decoding device shown in FIG. 21 to generate a bitstream which can be played back in 3D without interruption. The generated bitstream is portable when recorded on an optical disk, a hard disk, or the like. Furthermore, it is possible to transmit the generated bitstream to a distant location via a communication link such as a wireless LAN and an optical fiber.

Figure 25:
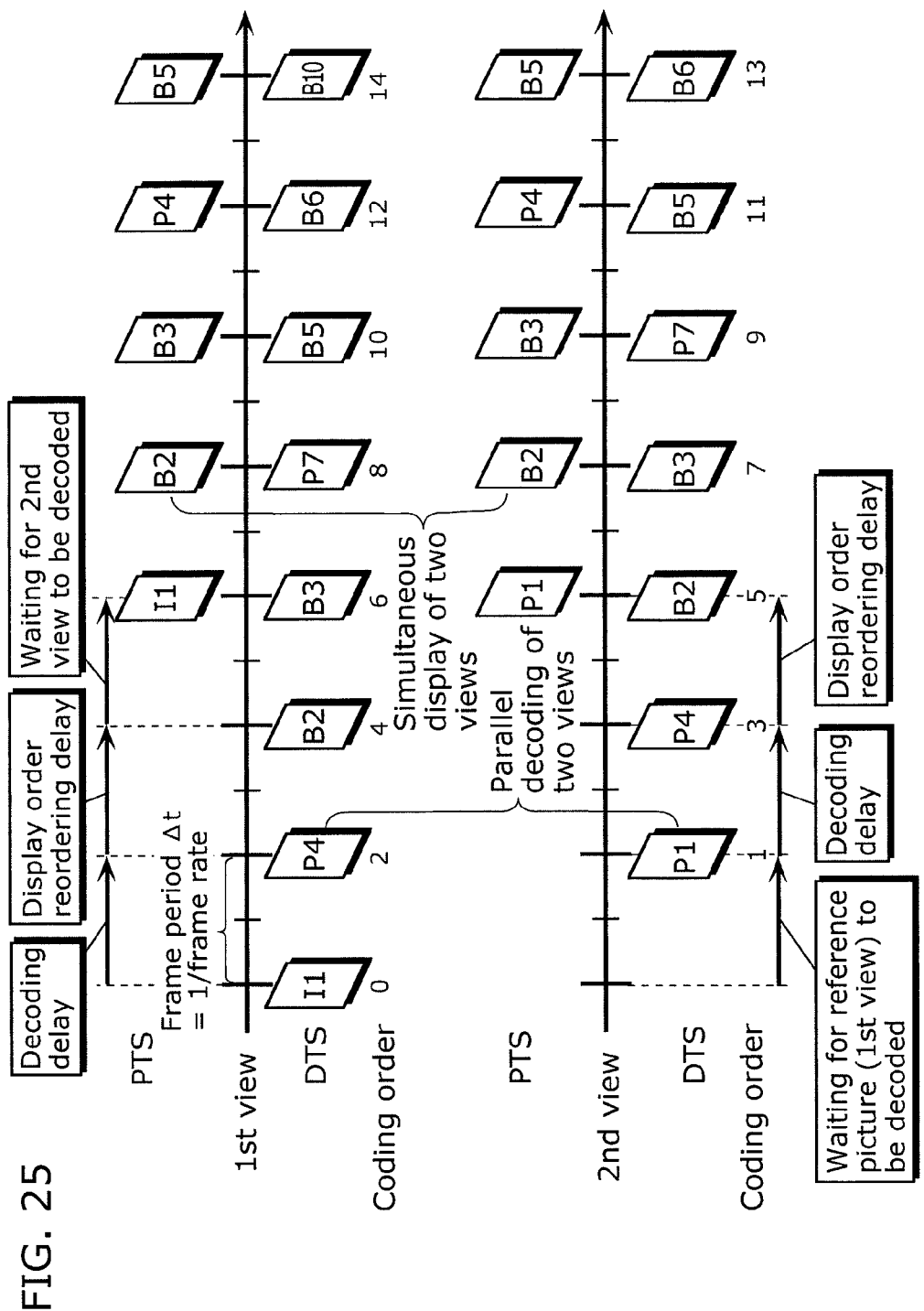
FIG. 25 is a view showing one example of PTS and DTS with which playback can be performed by a 3D image decoding device having two decoders.

FIG. 25 is a view showing one example of a relation between PTS and DTS for each view, in the decoding process by the 3D image decoding device shown in FIG. 21. FIG. 25 is the same as FIG. 22 except that the first view and the second view are displayed at the same time.

Figure 26:
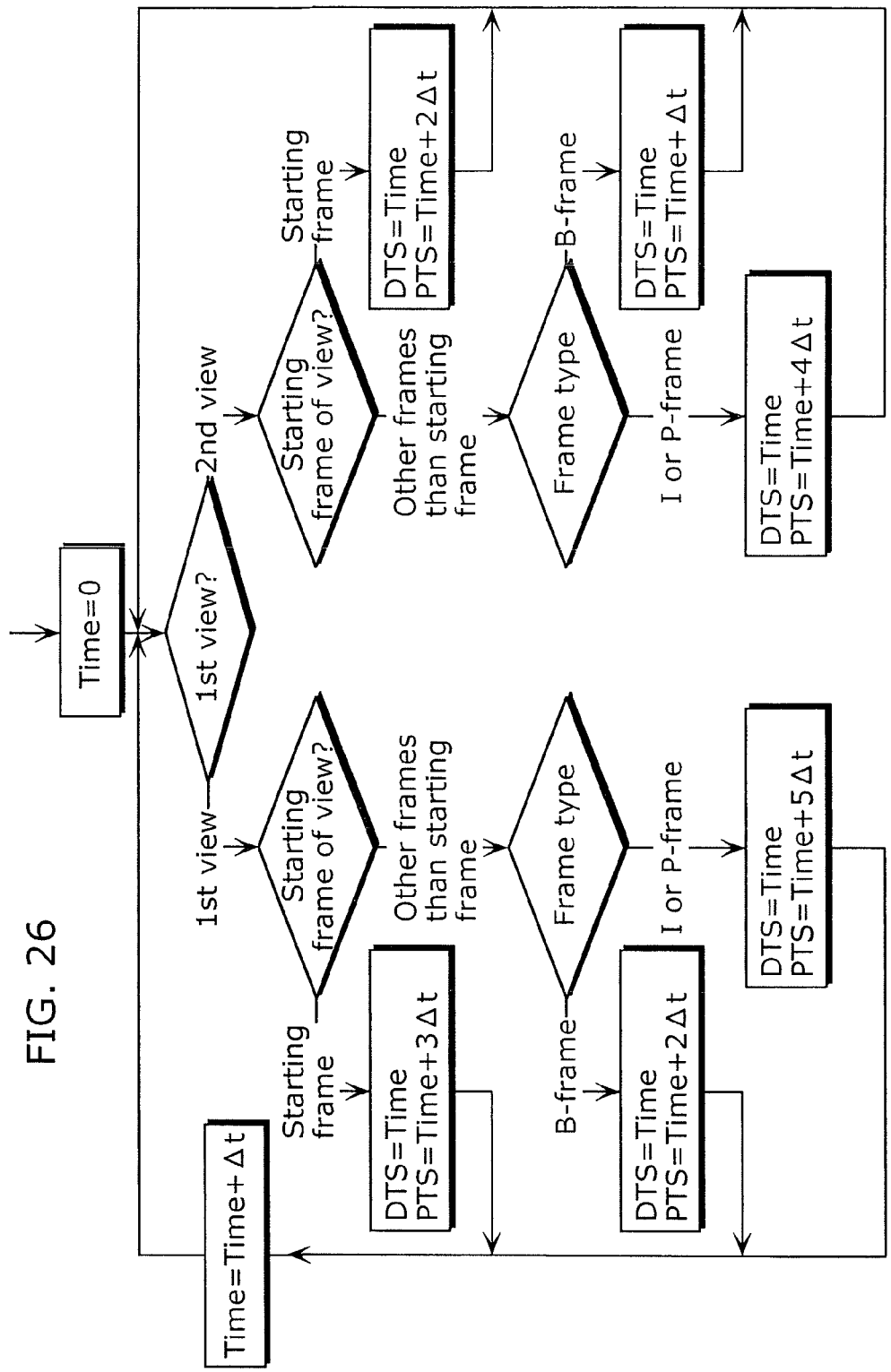
FIG. 26 is a flowchart showing one example of a method of determining PTS and DTS shown in FIG. 25.

FIG. 26 is a flowchart showing a procedure for assigning DTS and PTS to a frame of the first view and a frame of the second view alternately according to the coding order shown in FIG. 25, in the system encoder 610 of the 3D image coding device shown in FIG. 23. In the 3D image coding device shown in FIG. 23, assigning DTS and PTS based on the flowchart of FIG. 26 can result in DTS and PTS shown in FIG. 25. This enables the 3D image decoding device shown in FIG. 21 to generate a bitstream which can be played back in 3D without interruption.

Figure 27:
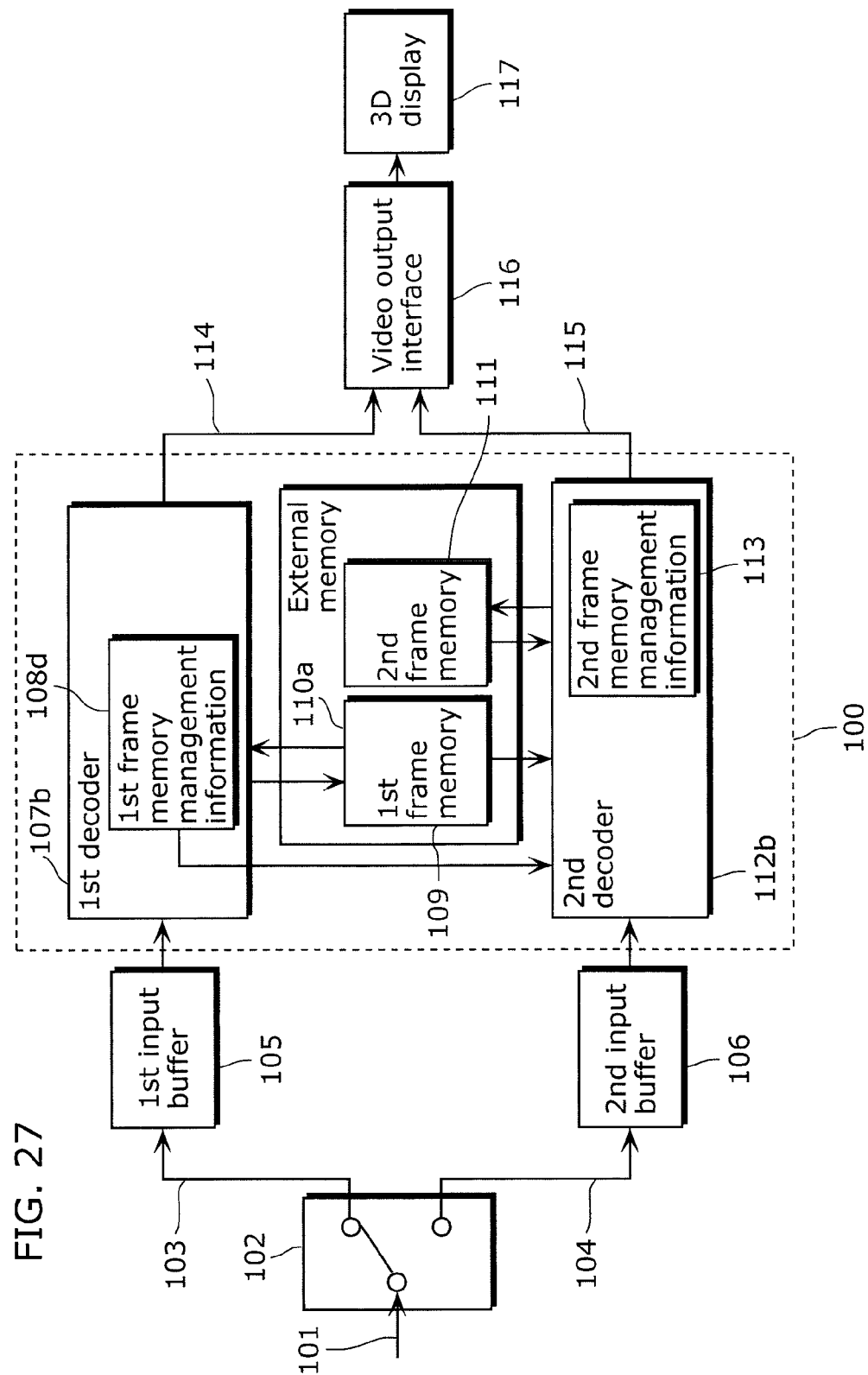
FIG. 27 is a block diagram of a variation of the 3D image decoding device according to the fourth embodiment of the present invention.

FIG. 27 is a view showing a first variation of the 3D image decoding device shown in FIG. 21. A second decoder 112b for decoding the second view is configured so as to be able to directly refer to first frame memory management information 108d in a first decoder 107b for decoding the first view. With this configuration, it is no longer necessary to secure, within an external memory 109 and the second decoder 112b, a region in which frame memory management information for the first view is held, allowing for a reduction in circuit area.

Figure 28:
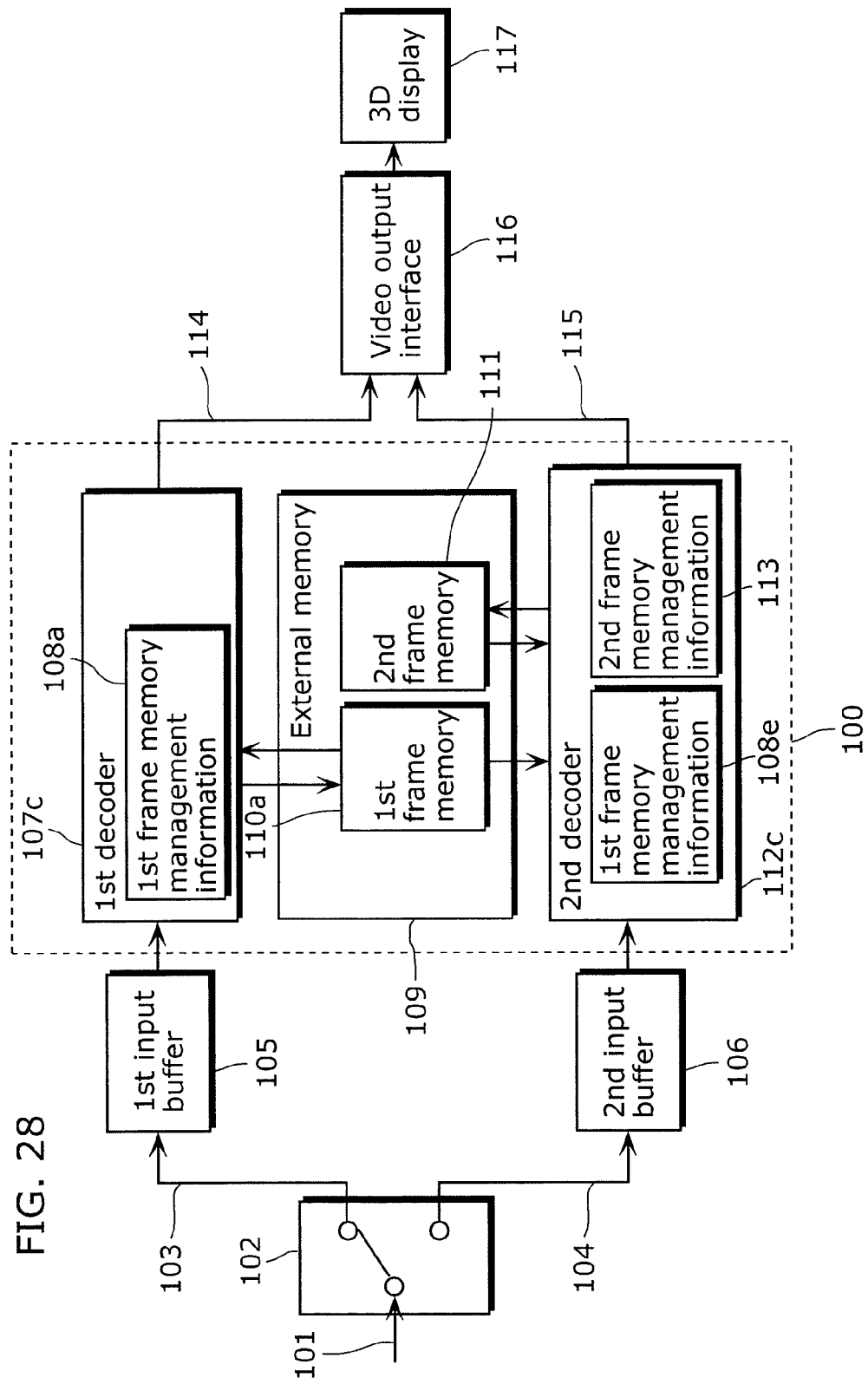
FIG. 28 is a block diagram of a variation of the 3D image decoding device according to the fourth embodiment of the present invention.

FIG. 28 is a view showing a second variation of the 3D image decoding device shown in FIG. 21. A second decoder 112c for decoding the second view is configured so as to emulate a management procedure for first frame memory management information 108a held in a first decoder 107c for decoding the first view and thereby hold first frame memory management information 108e corresponding to the first frame memory management information 108a. In the second decoder 112c, header information for the first view such as a coding type and time information of a frame, which is to be needed for the management procedure emulation, may be embedded in a bitstream for the second view upon generating a multiplexed bitstream 101. Alternately, it may be configured such that an upper system of the 3D image decoding device shown in FIG. 28 notifies the second decoder 112c of the header information.

As above, even with plural encoders, the 3D image coding device in the fourth embodiment is capable of coding plural views using inter-view prediction, because the plural coders share reference pictures that are used in inter-view prediction. Moreover, even with plural decoders, the 3D image decoding device in the fourth embodiment is capable of decoding plural views coded using inter-view prediction, because the plural decoders share reference pictures that are used in inter-view prediction.

Fifth Embodiment

Next, the fifth embodiment using the image coding method and image decoding method according to the present invention will be explained with reference to the drawings. The fifth embodiment is based on the assumption that different values may be set as DTS and PTS for each view. It is to be noted that even in the case where DTS and PTS are set at an identical value in accordance with a standard, DTS and PTS indicated in the fifth embodiment may be used as points in time at which images are actually decoded and displayed.

Figure 29:
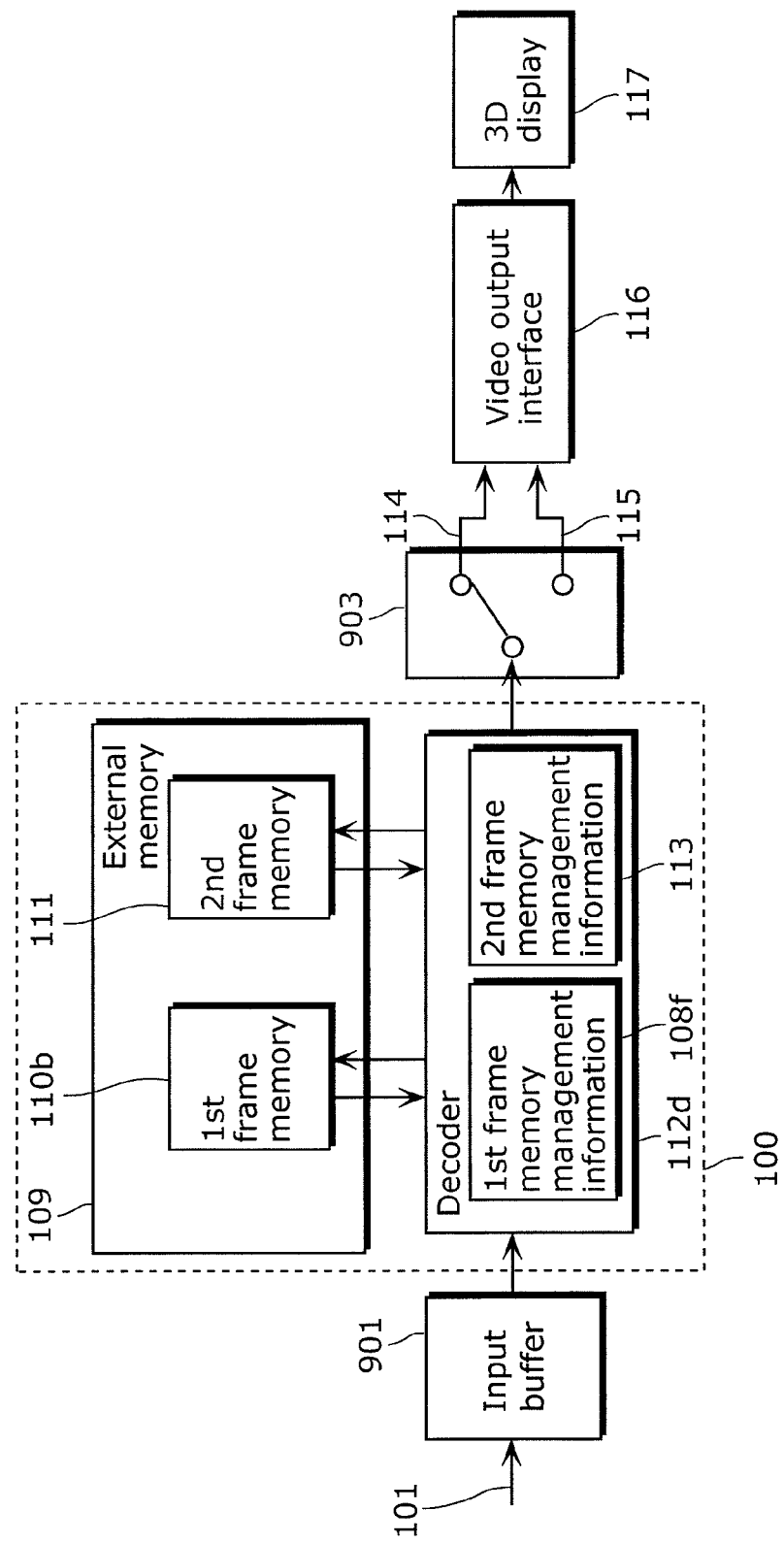
FIG. 29 is a block diagram of a 3D image decoding device according to the fifth embodiment of the present invention.

FIG. 29 is a block diagram of a 3D image decoding device according to the fifth embodiment. The 3D image decoding device in FIG. 29 includes a decoder 112d capable of decoding a video of one of the views of a 3D video at a speed that is double the frame rate for the 3D video. The decoder 112d decodes both of the first view and the second view. Because the second view has been coded with reference to the first view, the 3D image decoding device shown in FIG. 29 is configured so that a decoded image of the first view can be referred to during decoding of the second view.

The operation of the 3D image decoding device shown in FIG. 29 will be explained. A multiplexed bitstream 101 received is provided to an input buffer 901 and then provided to a decoder 112d at DTS. The decoder 112d decodes the multiplexed bitstream 101 provided thereto, and outputs a decoded image at PTS. The outputted bitstream is then separated through a switch 903 into a decoded image 114 of the first view and a decoded image 115 of the second view. The decoded images are transmitted through a video output interface 116 and thus displayed in 3D on a 3D display 117.

In a decoding process, the decoder 112d copies decoded frames which are referred to in coding using inter prediction, onto a first frame memory 110b and a second frame memory 111 in an external memory 109. The copied frames will be held in the first frame memory 110b and the second frame memory 111 until no longer referred to. Because each of the frame memories holds plural frames, the decoder 112d holds first frame memory management information 108f and second frame memory management information 113 to manage where a frame for each point in time is held in the first frame memory 110b or the second frame memory 111.

To code the second view, inter-view prediction coding is used in which a frame of the first view is referred to. The decoder 112d therefore needs to refer to a decoded image of the first view to perform decoding on the second view. Thus, the decoder 112d updates the first frame memory management information 108f every time decoding of a frame of the first view is completed. Moreover, the decoder 112d holds the first frame memory management information 108f even during decoding of the second view. On the basis of the first frame memory management information 108f, the decoder 112d refers to a decoded mage of a desired frame of the first view held by the first frame memory 110b. The decoder 112d then decodes the bitstream of the second view coded in a coding method including the inter-view prediction coding.

It is to be noted that a bitstream of the first view, which has been coded without referring to another view, can be decoded independently. This means that the 3D image decoding device can be used as a 2D image decoding device when the decoder 112d skips bitstream of the second view.

Furthermore, in the case where any anomaly such as a syntax error of a bitstream is detected in a decoding process of the second view in the decoder 112d, the 3D image decoding device may display only decoded images of the first view until normal decoding can resume, for example, from a random access point (that is a point at which independent reproduction can be started) of the bitstream. Alternatively, a decoded image of the first view may be displayed as a decoded image of the second view. With such a display, it is possible to reduce viewer's discomfort.

Furthermore, in the case where any anomaly such as a syntax error of a bitstream is detected in a decoding process of the first view in the decoder 112d, the second view, which refers to the first view, will not be normally decoded either.

The 3D image decoding device therefore notifies an upper system of the anomaly in the decoder 112d and may continue to output the last normally-decoded frame of each of the first view and the second view until normal decoding can resume, for example, from a random access point (that is a point at which independent reproduction can be started) of the bitstream. With such an output, etc., it is possible to reduce viewer's discomfort.

Figure 30:
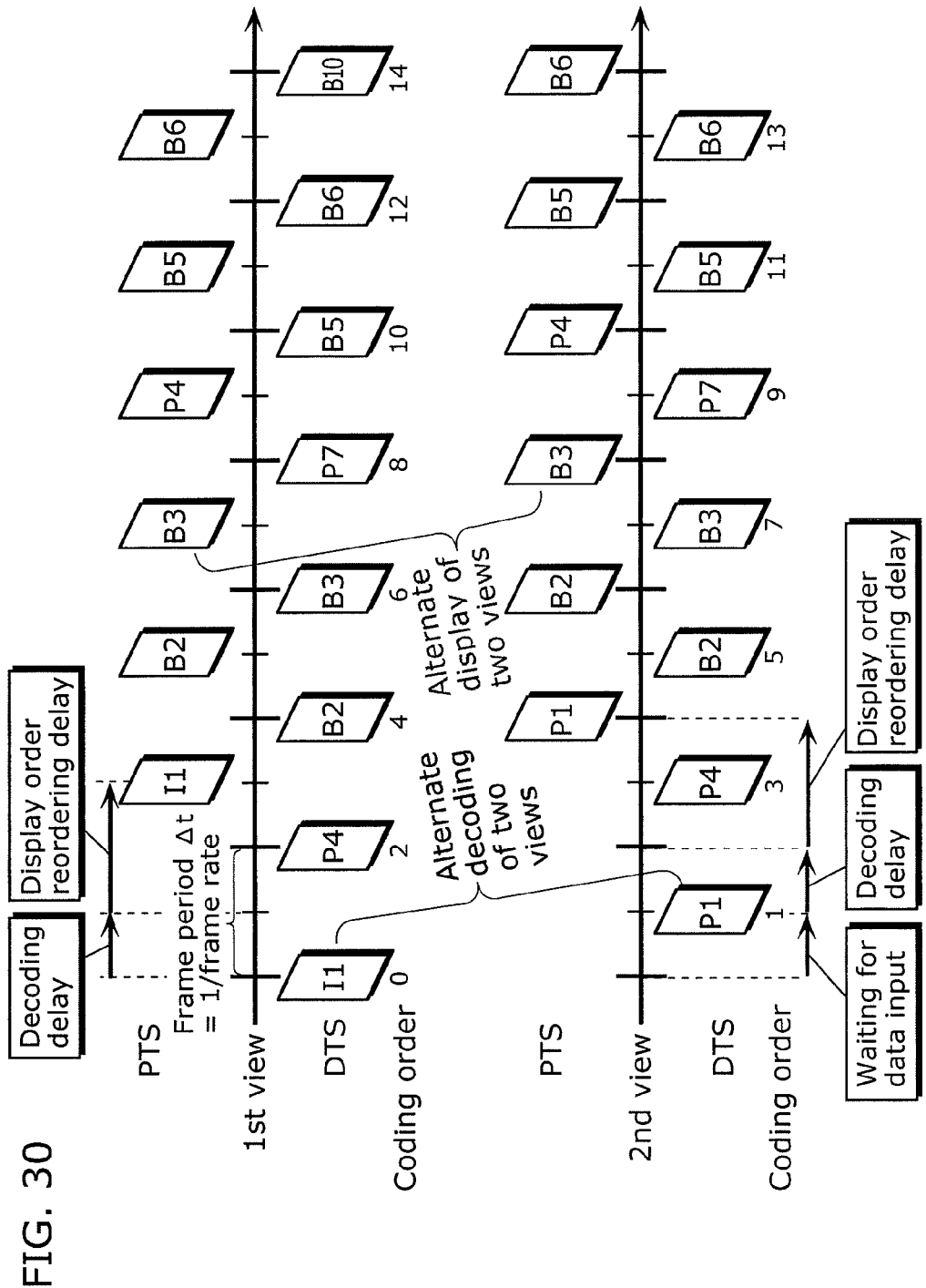
FIG. 30 is a view showing one example of PTS and DTS with which playback can be performed by a 3D image decoding device having a double-speed decoder.

FIG. 30 is a view showing one example of a relation between PTS and DTS for each view, in the decoding process by the 3D image decoding device shown in FIG. 29. In the example of FIG. 30, frames of each view have been coded so that the display order of frame types is I, B, B, and P and that the coding order of frame types is I, P, B, and B, where P frame is uni-predictive only while B frame may be bi-predictive. Upon referring to the first view for the second view in the inter-view prediction, only a frame of the first view displayed immediately before is referred to. The first view and the second view are displayed alternately.

In the present example, first, a starting frame I1 of the first view is decoded. A starting frame P1 of the second view will then be decoded with reference to the starting frame I1 of the first view. Decoding of the starting frame P1 of the second view therefore cannot start until decoding of the starting frame I1 of the first view is completed. In the 3D image decoding device shown in FIG. 29 using the decoder 112d which operates at a speed that is double a display frame rate, it takes a frame period Δt/2 (Δt=1/frame rate) to decode the starting frame I1 of the first view.

Accordingly, DTS for the starting frame P1 of the second view is Δt/2 behind DTS for the starting frame I1 of the first view. The frame I1 of the first view is used to predict a frame P4 of the first view, which should mean that after completion of decoding the frame I1 of the first view, the frame P4 of the first view can start to be decoded. However, the 3D image decoding device shown in FIG. 29, which decodes the first view and the second view with the single decoder, is not capable of decoding the frame P4 of the first view and the frame P1 of the second view at the same time. The DTS for the frame P4 of the first view is therefore Δt/2 behind the DTS for the frame P1 of the second view. Afterwards, decoding of the frames of the first view and decoding of the frames of the second view alternately start at Δt/2 intervals.

Next, the PTS will be explained. In contrast to the display order, the last frame in decoding order is a B frame of the second view. Accordingly, the PTS for each frame of the first view and the second view is determined according to a point in time when the B frame of the second view can be displayed. To be specific, for the frame B2 of the second view, PTS is Δt/2 behind DTS because it takes Δt/2 to decode one frame. With this point in time as a reference, PTS is 3Δt/2 behind DTS for the starting frame I1 of the first view, and PTS is 2Δt behind DTS for the starting frame P1 of the second view.

Figure 31:
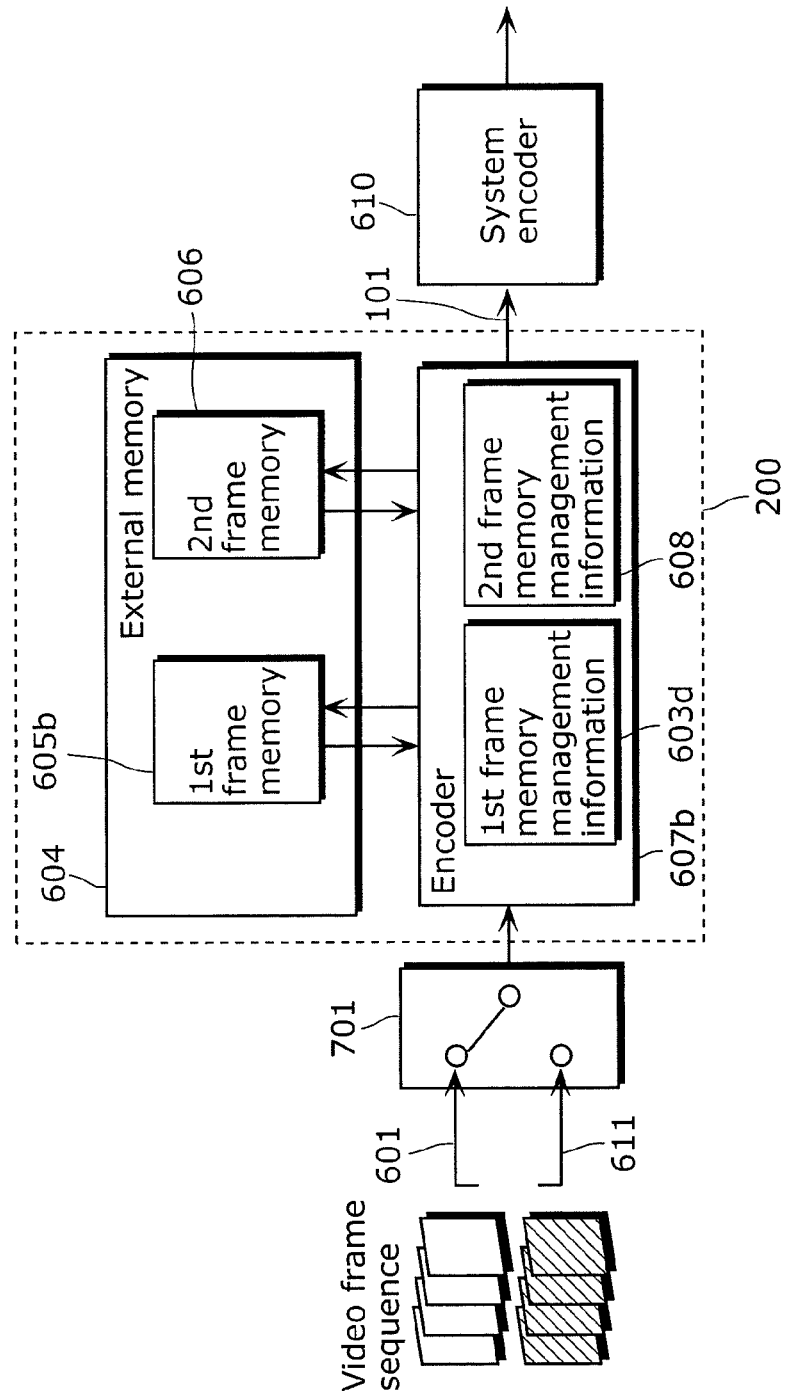
FIG. 31 is a block diagram of the 3D image decoding device according to the fifth embodiment of the present invention.

FIG. 31 shows one example of a 3D image coding device which generates a bitstream decodable by the 3D image decoding device shown in FIG. 29. The 3D image coding device shown in FIG. 31 includes an encoder 607b capable of coding a video of one of the views of a 3D video at a speed that is double the frame rate for the 3D video. The encoder 607b codes the first view and the second view. Because the second view is coded with reference to the first view, it is configured so that a locally decoded image of the first view can be referred to even during the coding of the second view.

Figure 32:
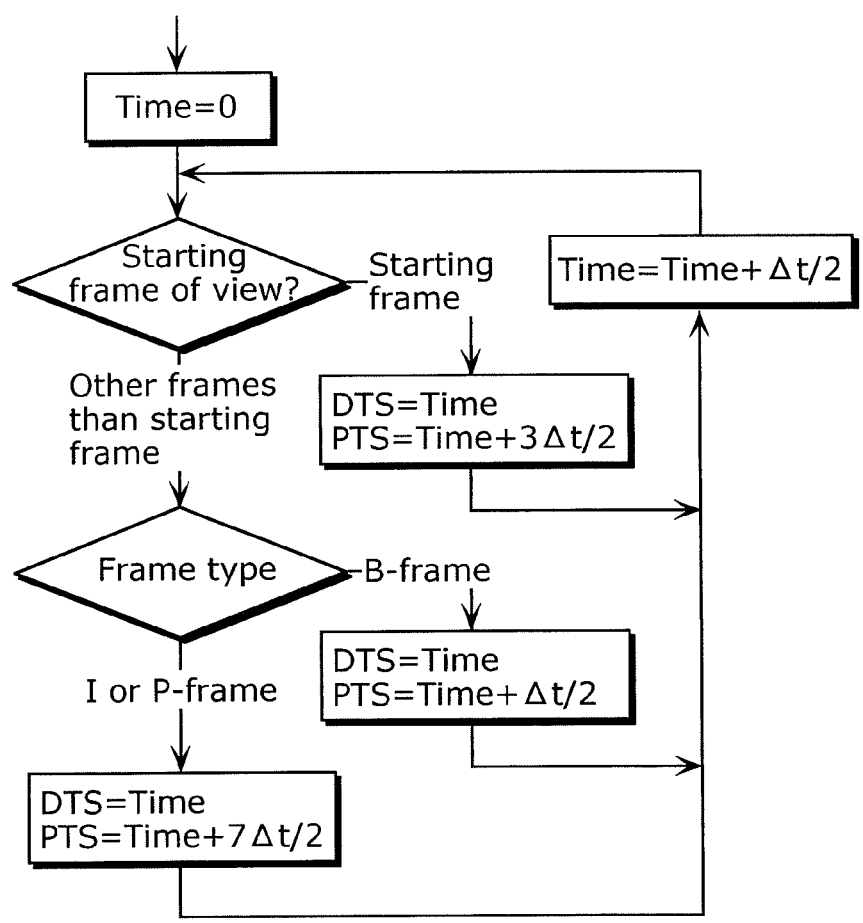
FIG. 32 is a flowchart showing one example of a method of determining PTS and DTS shown in FIG. 30.

FIG. 32 is a flowchart showing a procedure for assigning DTS and PTS to a frame of the first view and a frame of the second view alternately according to the coding order shown in FIG. 30, in a system encoder 610 of the 3D image coding device shown in FIG. 31. In the 3D image coding device shown in FIG. 31, assigning DTS and PTS based on the flowchart of FIG. 32 can result in DTS and PTS shown in FIG. 30. This enables the 3D image decoding device shown in FIG. 29 to generate a bitstream which can be played back in 3D without interruption. The generated bitstream is portable when recorded on an optical disk, a hard disk, or the like. Furthermore, it is possible to transmit the generated bitstream to a distant location via a communication link such as a wireless LAN and an optical fiber.

Figure 33:
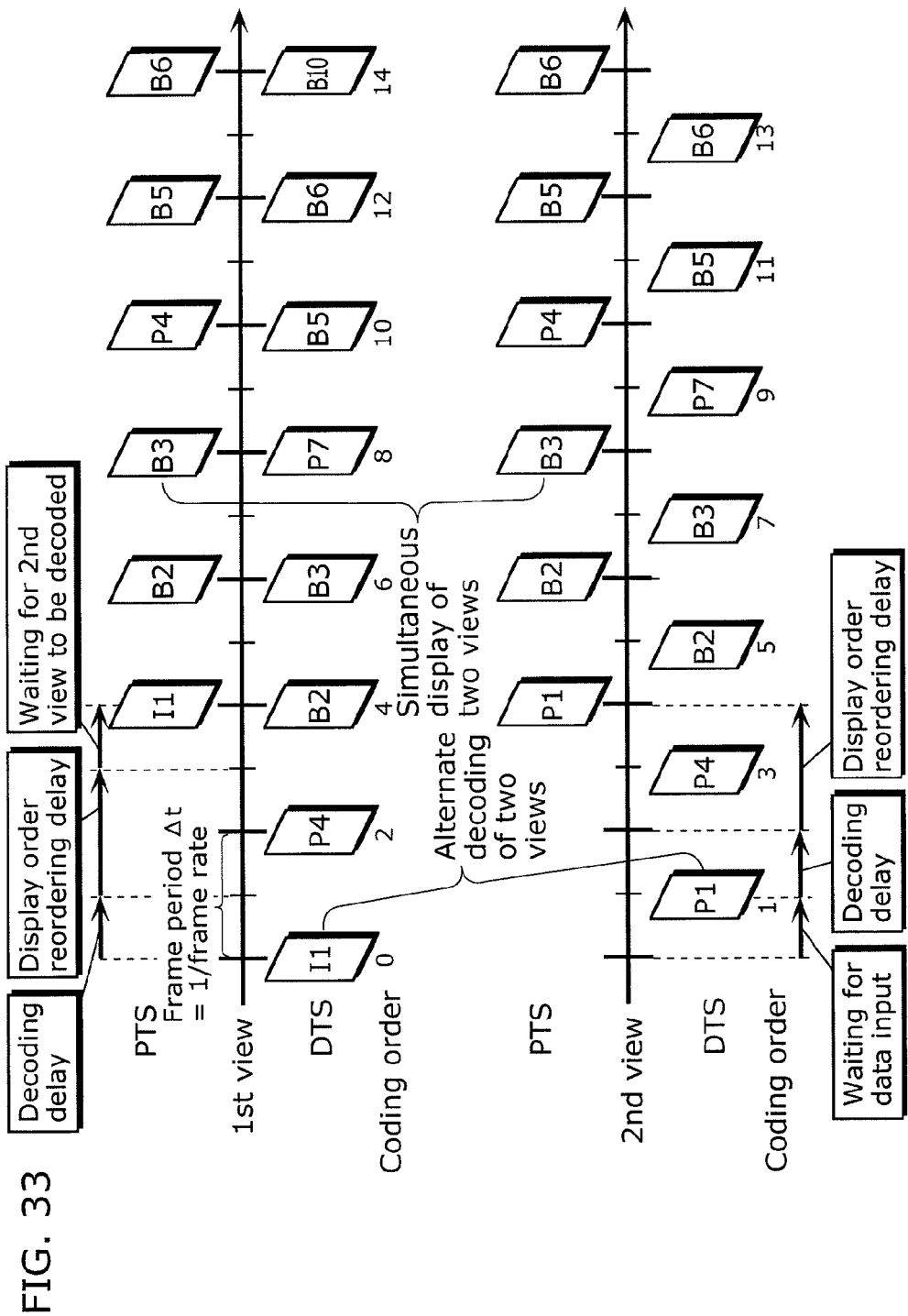
FIG. 33 is a view showing one example of PTS and DTS with which playback can by performed by the 3D image decoding device having the double-speed decoder.

FIG. 33 is a view showing one example of a relation between PTS and DTS for each view, in the decoding process by the 3D image decoding device shown in FIG. 29. FIG. 33 is the same as FIG. 30 except that the first view and the second view are displayed at the same time.

Figure 34:
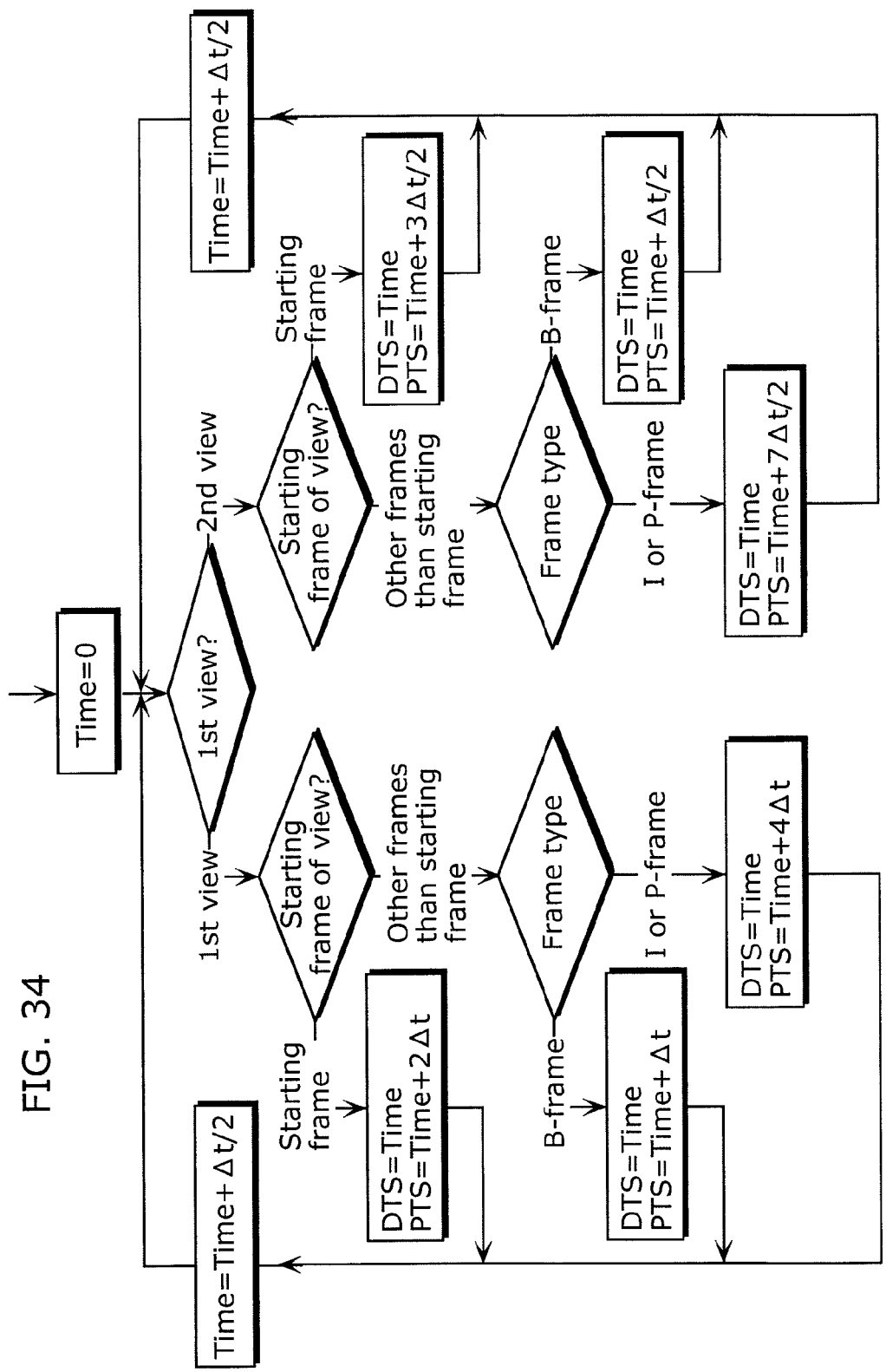
FIG. 34 is a flowchart showing one example of a method of determining PTS and DTS shown in FIG. 33.

FIG. 34 is a flowchart showing a procedure for assigning DTS and PTS to a frame of the first view and a frame of the second view alternately according to the coding order shown in FIG. 33, in the system encoder 610 of the 3D image coding device shown in FIG. 31. In the 3D image coding device shown in FIG. 31, assigning DTS and PTS based on the flowchart of FIG. 34 can result in DTS and PTS shown in FIG. 33. This enables the 3D image decoding device shown in FIG. 29 to generate a bitstream which can be played back in 3D without interruption.

As above, the 3D image coding device in the fifth embodiment is capable of coding plural views using inter-view prediction. Furthermore, the 3D image decoding device in the fifth embodiment is capable of decoding plural views coded using inter-view prediction.

Sixth Embodiment

As can be seen from FIG. 22 and FIG. 33, DTS and PTS are assigned differently depending on a configuration of the 3D image decoding device (depending on whether it includes two decoders which operate at the same speed as a display frame rate, or one decoder which operates at a speed that is double a display frame rate). Thus, the sixth embodiment describes how to select a decoding process according to a combination of the configuration of the 3D image decoding device assumed in generating a bitstream with the actual configuration of the 3D image decoding device.

Figure 35:
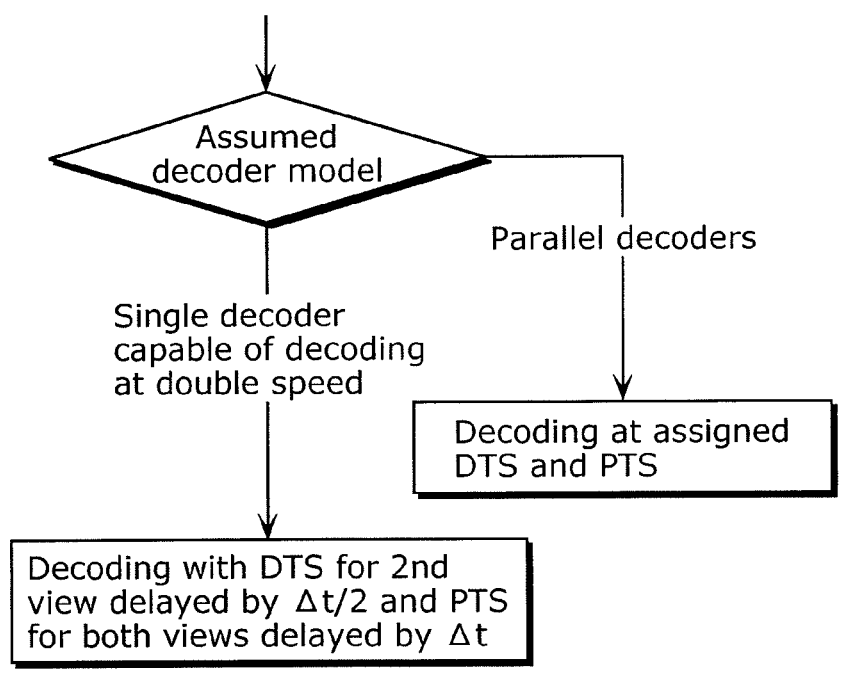
FIG. 35 is a flowchart for determining switching of decoding processes in a 3D image decoding device according to the sixth embodiment of the present invention.
Figure 36:
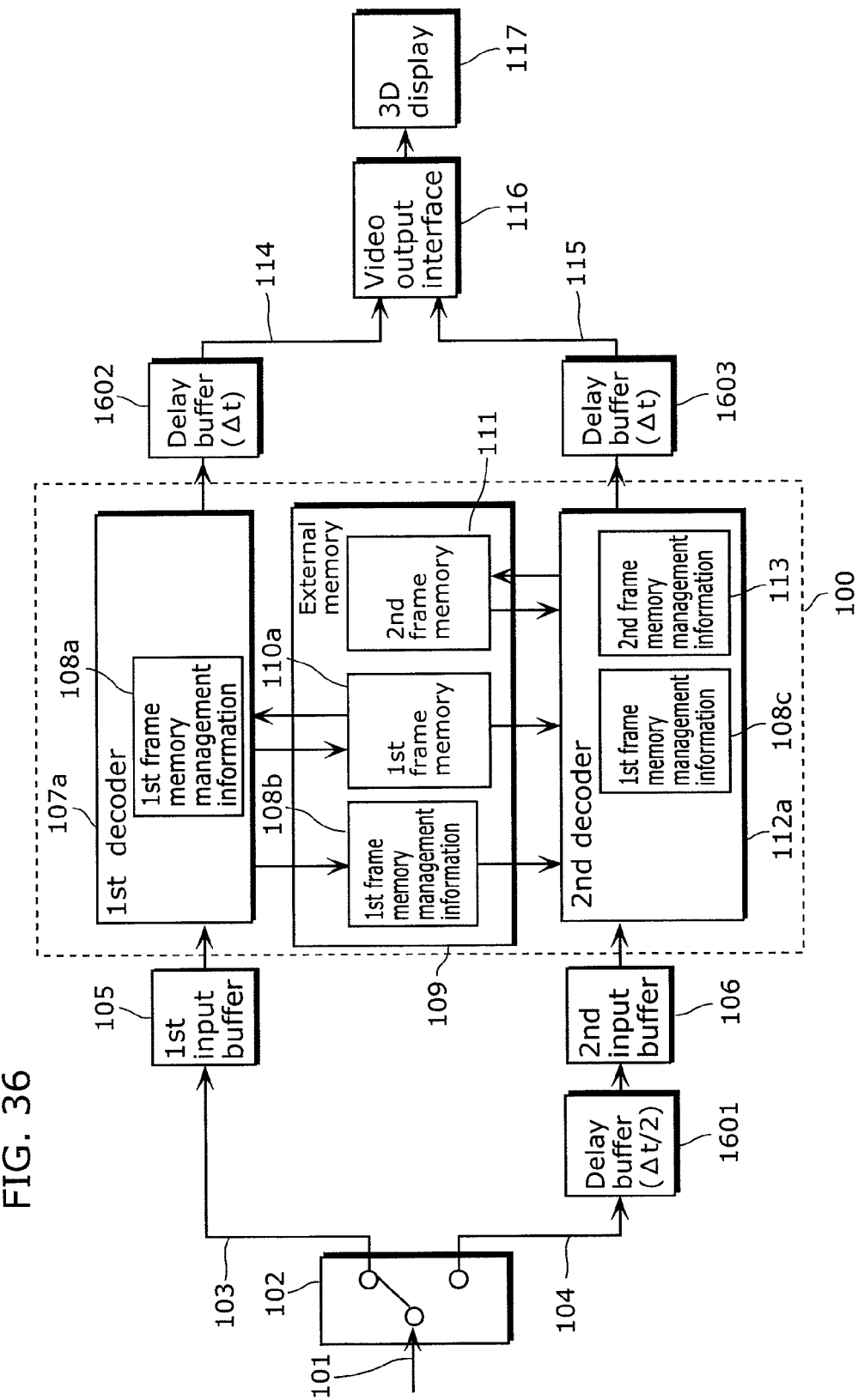
FIG. 36 is a block diagram of a 3D image decoding device according to the sixth embodiment of the present invention.

FIG. 35 is a flowchart showing a procedure of switching between processes by the 3D image decoding device according to the configuration of the 3D image decoding device assumed by the 3D image coding device in generating a bitstream, in the case where the actual configuration of the 3D image decoding device includes two decoders which operate at the same speed as a display frame rate. FIG. 36 is a view showing an example of the 3D image decoding device which switches between processes according to the procedure shown in FIG. 35.

In the case where the actual configuration is different from the assumed configuration, the 3D image decoding device shown in FIG. 36 delays a bit stream of the second view by Δt/2 using a delay buffer 1601, delays display of the first view by Δt using a delay buffer 1602, and delays display of the second view using a delay buffer 1603. This makes it possible to playback 3D video without interruption.

Figure 37:
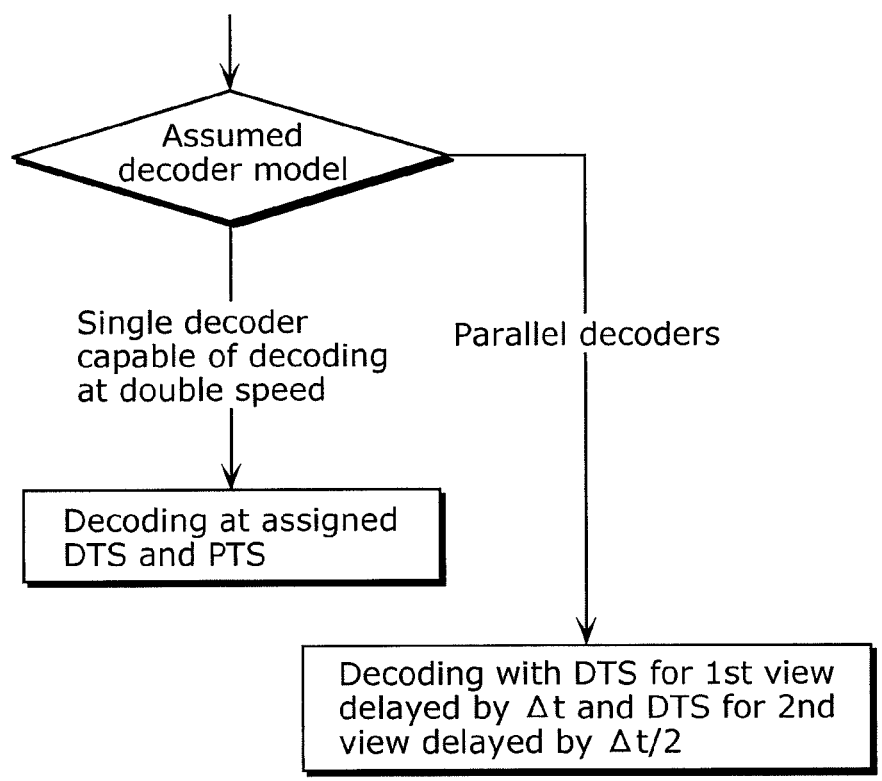
FIG. 37 is a flowchart for determining switching of a decoding process in the 3D image decoding device according to the sixth embodiment of the present invention.
Figure 38:
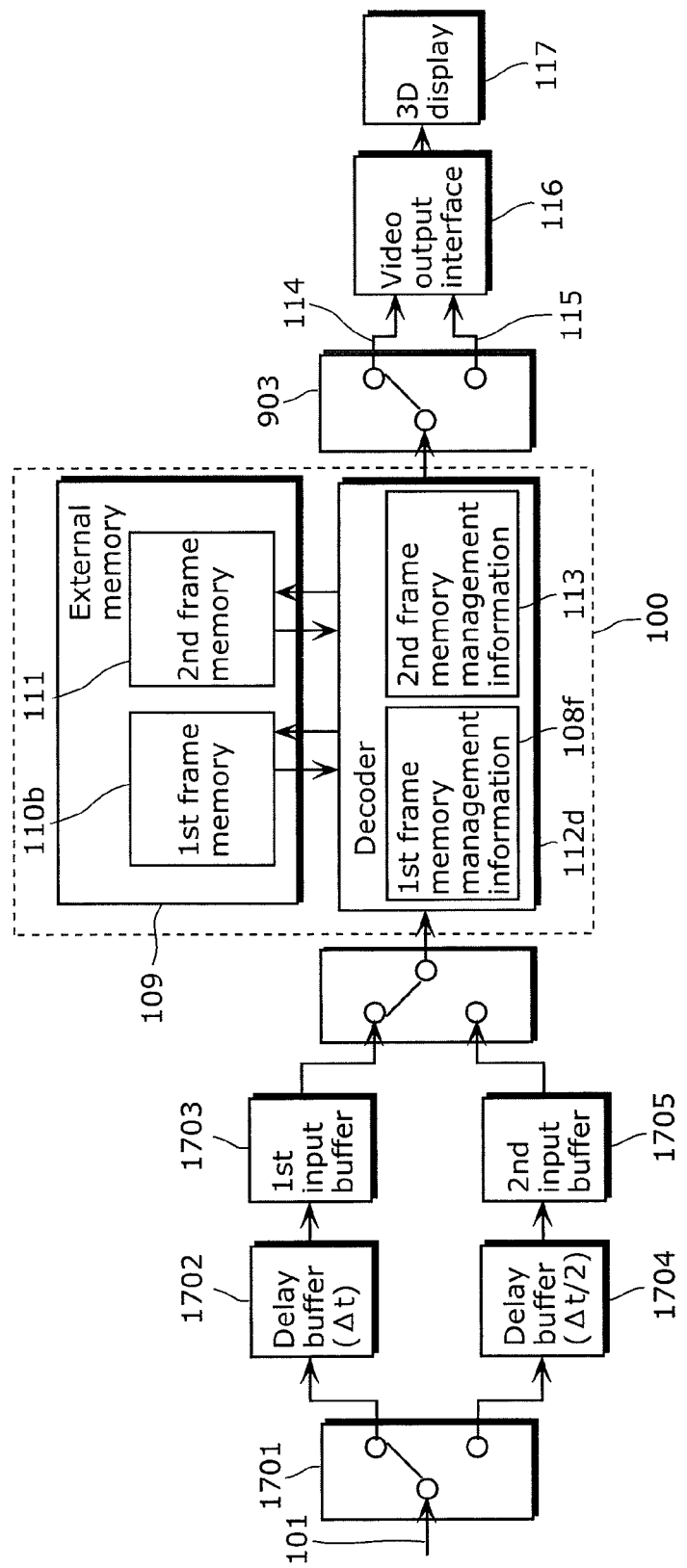
FIG. 38 is a block diagram of a 3D image decoding device according to the sixth embodiment of the present invention.
Figure 39:
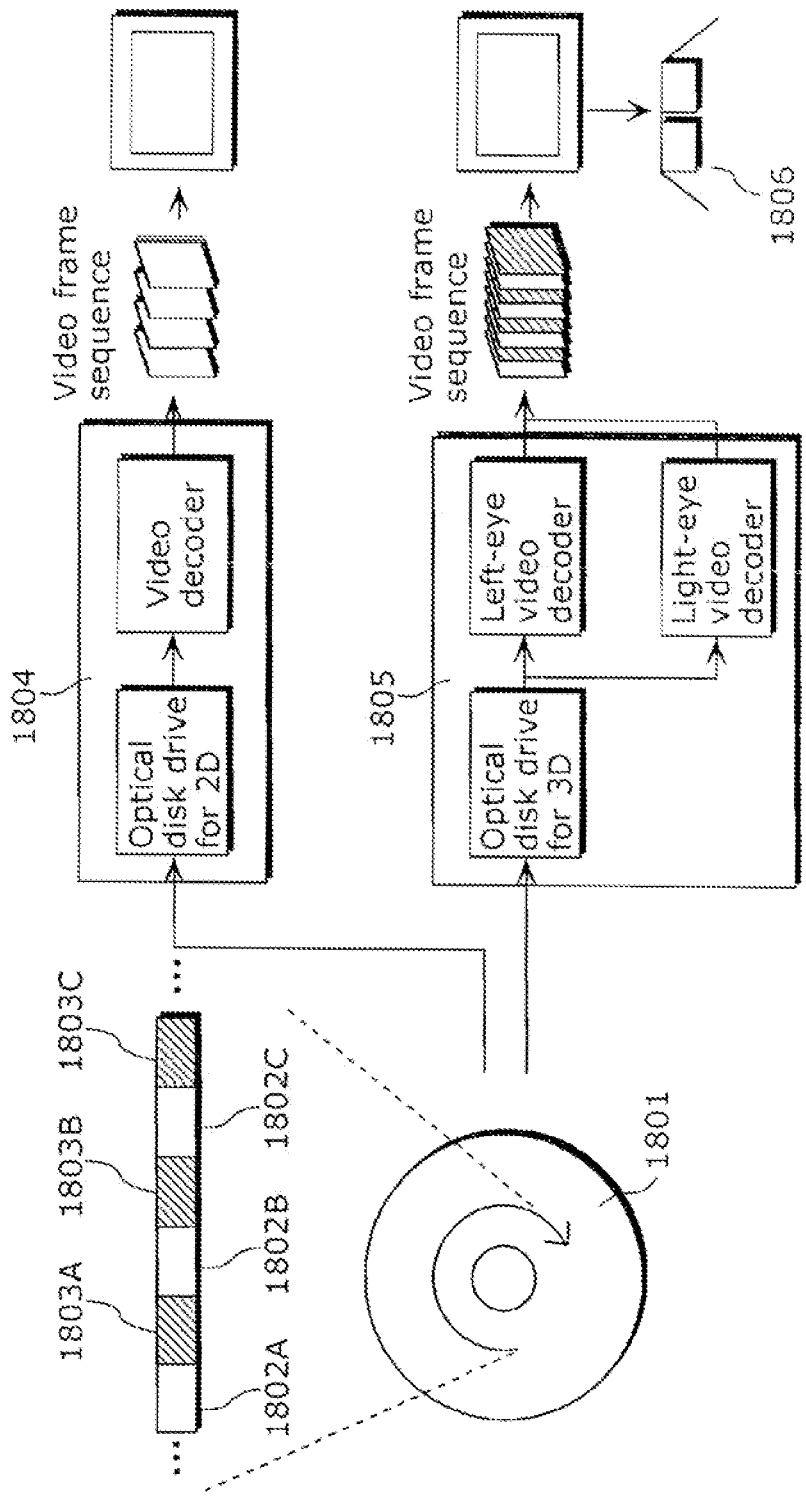
FIG. 39 is an illustration of a conventional 3D video playback device.
Figure 40:
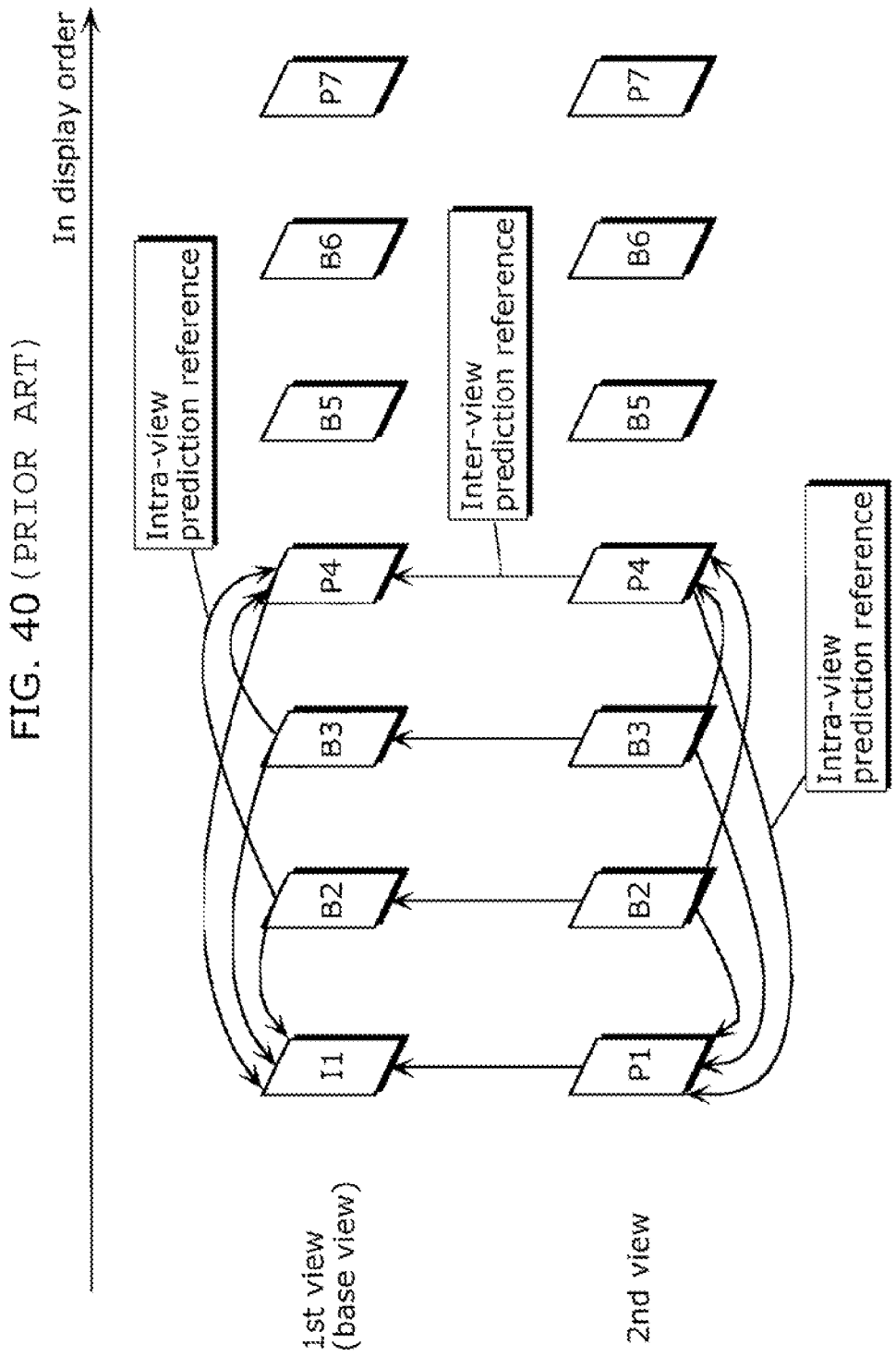
FIG. 40 is a view showing an example of prediction reference in coding images with two views according to MVC.
Figure 41:
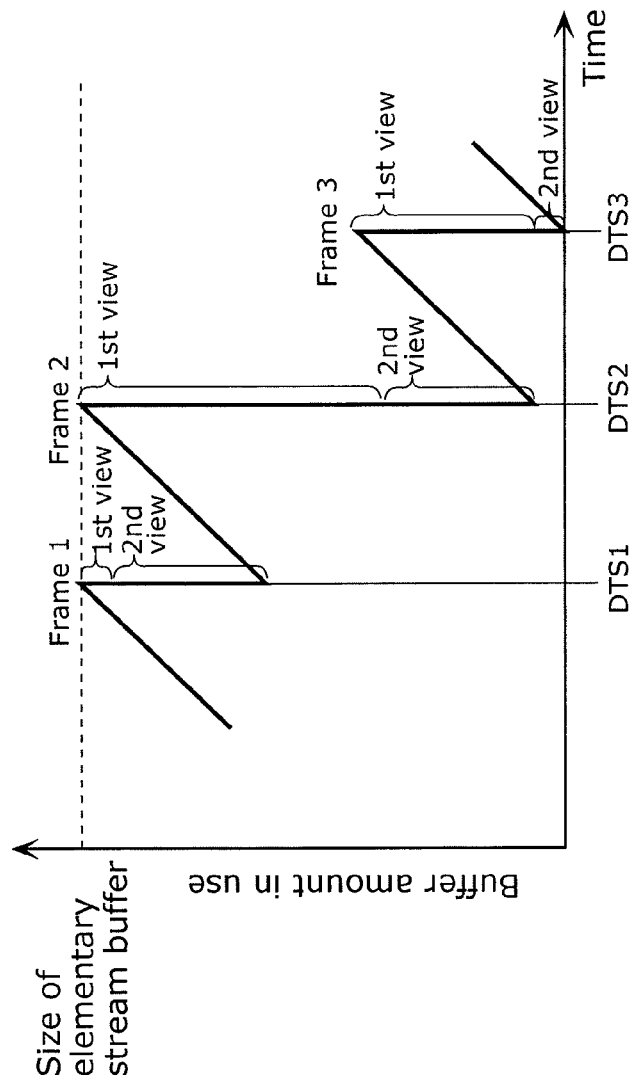
FIG. 41 is a view showing buffer management for reproducing 3D images.

FIG. 37 is a flowchart showing a procedure of switching between processes by the 3D image decoding device according to the configuration of the 3D image decoding device assumed by the 3D image coding device in generating a bitstream, in the case where the actual configuration of the 3D image decoding device has one decoder which operates at a speed that is double a display frame rate. FIG. 38 is a view showing an example of the 3D image decoding device which switches between processes according to the procedure shown in FIG. 37.

In the case where the actual configuration is different from the assumed configuration, the 3D image decoding device shown in FIG. 38 separates a multiplexed bitstream 101 by a switch 1701 into a bitstream of the first view and a bitstream of the second view. The bitstream of the first view is delayed by Δt in a delay buffer 1702, and the bitstream of the second view is delayed by Δt/2 in a delay buffer 1704. Afterwards, the bitstream of the first view and the bitstream of the second view are then provided to a first input buffer 1703 and a second input buffer 1705, respectively, and then provided to a decoding processing unit 100 via a switch. Subsequent processes are the same as in the case of the 3D image decoding device shown in FIG. 29.

This makes it possible to playback 3D video without interruption.

As above, the 3D image decoding device in the sixth embodiment is provided with buffers to adjust decoding points in time and displaying points in time when decoding plural views coded using inter-view prediction.

Other Variations

In addition, although the present invention has been explained based on the above embodiments, it is a matter of course that the present invention is not limited to the above embodiments. The present invention also includes the following.

(1) The above devices are specifically computer systems each including a microprocessor, a read only memory (ROM), a random access memory (RAM), a hard disk unit, a display unit, a key board, a mouse, and so on. The RAM or hard disk unit stores a computer program. The microprocessor operates according to the computer program, thereby allowing each of the devices to accomplish its functions. The computer program herein is made of a combination of multiple command codes which indicate instructions to a computer in order to accomplish predetermined functions.

(2) It may also be possible that part or all of the components included in each of the above devices are provided in one system LSI (large scale integration). The system LSI is a super multifunctional LSI manufactured by integrating multiple components into one chip and is specifically a computer system which includes a microprocessor, a ROM, a RAM and so on. The RAM stores a computer program. The microprocessor operates according to the computer program, thereby allowing the system LSI to accomplish its functions.

(3) Part or all of the components included in each of the above devices may be in form of an integrated circuit (IC) card detachable from each of the devices or in form of a single module. The IC card or module is a computer system including a microprocessor, a ROM, a RAM, and so on. The IC card or module may include the above super multifunctional LSI. The microprocessor operates according to the computer program, thereby allowing the IC card or module to accomplish its functions. This IC card or module may have tamper resistance.

(4) The present invention may be a method described above. Furthermore, the present invention may be a computer program which causes a computer to execute the method or may be a digital signal of the computer program.

Furthermore, the present invention may be a computer-readable recording medium including, for example, a flexible disk, a hard disk, a CD-ROM, an MO, a DVD, a DVD-ROM, a DVD-RAM, a BD (Blu-ray Disc), and a semiconductor memory, on which the computer program or the digital signal are recorded. The present invention may also be a digital signal recorded on the recording medium.

Furthermore, the present invention may be transmission of the computer program or the digital signal via a network represented by a telecommunication line, a wired or wireless communication line, and the Internet, or data broadcasting, etc.

Furthermore, the present invention may be a computer system including a memory which stores the above computer program and a microprocessor which operates according to the computer program.

Furthermore, the program or digital signal may be recorded on the recording medium and thus transmitted, or the program or the digital signal may be transmitted via the network or the like, so that the present invention can be implemented by another independent computer system.

(5) The above embodiments, the above variations, and the components shown in the embodiments and variations may be combined.

In addition, the first view, which is selected from plural view, does not have to be the base view. The present invention provides the same effects even when the first view is not the base view.

Furthermore, although the above mainly describes examples of the 3D image decoding device and the 3D image coding device, the present invention is not limited to the 3D image decoding device and the 3D image coding device and is thus applicable to an image decoding device and an image coding device in which the inter-view prediction is involved.

The image decoding device and the image coding device according to the present invention apply a sophisticated image coding scheme such as MVC, which uses the inter-view prediction, and thereby enables decoding and coding of 3D videos with the minimum increase in the required performance. It is therefore possible to supply the market with motion picture content such as 3D movies having enhanced definition and thereby possible to vitalize the movie market and the consumer electronics market. Hence, the image decoding device and the image coding device according to the present invention are highly usable in the movie industry and the consumer electronics industry.

REFERENCE SIGNS LIST 001 3D image decoding device
100 Decoding processing unit
101 Multiplexed bitstream
101b, 101e Packet
102, 609, 701, 903, 913, 914, 1701 Switch
103, 104 Bitstream
105, 1703 First input buffer
106, 1705 Second input buffer
107a, 107b, 107c First decoder
108a, 108b, 108c, 108d, 108e, 108f, 108g, 603a, 603b, 603c, 603d First frame memory management information
109, 604 External memory
110a, 110b, 110c, 605a, 605b First frame memory
111, 121, 606 Second frame memory
112a, 112b, 112c Second decoder
112d, 112e Decoder
113, 120, 608 Second frame memory management information
114, 115 Decoded image
116 Video output interface
117 3D display 200 Coding processing unit
201, 202 Rate control unit
601, 611 Image
602a First encoder
607a Second encoder
607b Encoder
610 System encoder
621 Frame buffer
622 Stream buffer
900 Buffer memory
901 Input buffer
902 STS buffer
902a, 9021a, 9022a Transport buffer (TB)
902b, 9021b, 9022b Multiplexing buffer (MB)
902c, 9021c, 9022c Elementary stream buffer (EB)
902d, 9022d Compensation buffer
904, 1601, 1602, 1603, 1702, 1704 Delay buffer
1801 Optical disk
1802A, 1802B, 1802C, 1803A, 1803B, 1803C Stream
1804 2D playback device
1805 3D playback device
1806 3D glasses

The invention claimed is:

1. An image decoding device for decoding a bitstream having views each of which includes a picture and coded in a method including inter-view prediction, the image decoding device comprising:
a decoder that decodes a bitstream of a first view coded and a bitstream of a second view coded with reference to the first view; and
a buffer memory located upstream of the decoder that stores the bitstreams which are to be provided to the decoder,
wherein, in the case where the first view and the second view are assigned an identical decoding point in time, the identical decoding point in time being information included in each of the bitstream of the first view coded and the bitstream of the second view coded or in header information of multiplexed data of the bitstream of the first view coded and the bitstream of the second view coded, the decoder decodes a picture of the second view at a point in time determined by adding a delay time to the decoding point in time of the picture of the second view, the delay time having a length required to complete decoding of the picture of the first view, and
the buffer memory is of a size that is equal to or larger than $D+R \times T \times (n-1)$ where D represents a specified size determined assuming that the bitstream of each of the views is extracted from the buffer memory at a corresponding decoding point in time assigned to each of the views, n represents a number of views included in the bitstreams of the views, T represents a maximum length of time necessary for decoding each picture included in the views, and R represents a predetermined data loading rate at which the bitstream of each of the views is loaded into the buffer memory.

2. The image decoding device according to claim 1,
wherein the bitstream is loaded into the buffer memory at the predetermined data loading rate assigned to the bitstream,
in decoding the bitstream of each view included in the views, the decoder extracts from the buffer memory the bitstream of the each view to be decoded, and
the buffer memory is of a size that is equal to or larger than a smallest size that does not cause the buffer memory to underflow when the decoder extracts the bitstream of the each view in the case where the decoder extracts the bitstream of the second view at the point in time determined by adding the delay time.

3. The image decoding device according to claim 1,
wherein the decoder decodes the bitstreams of the views sequentially.

4. An image decoding device for decoding a bitstream having views each of which includes a picture and coded in a method including inter-view prediction, the image decoding device comprising:
a decoder that decodes a bitstream of a first view coded and a bitstream of a second view coded with reference to the first view; and
a buffer memory located upstream of the decoder that stores the bitstreams which are to be provided to the decoder,
wherein the decoder decodes the bitstreams of the views in parallel,
in the case where the first view and the second view are assigned an identical decoding point in time, the identical decoding point in time being information included in each of the bitstream of the first view coded and the bitstream of the second view coded or in header information of multiplexed data of the bitstream of the first view coded and the bitstream of the second view coded, the decoder decodes a picture of the second view at a point in time determined by adding a delay time to the decoding point in time of the picture of the second view, the delay time having a length required to complete decoding of the picture of the first view, and
the buffer memory is of a size that is equal to or larger than $D+R \times T \times (m-1)$ where D represents a specified size determined assuming that the bitstream of each of the views is extracted from the buffer memory at a corresponding decoding point in time assigned to each of the views, m represents a maximum number of layers of the views which are referred to in the inter-view prediction, T represents a maximum length of time necessary for decoding each picture included in the views, and R represents a predetermined data loading rate at which the bitstream of each of the views is loaded into the buffer memory.

5. The image decoding device according to claim 2,
wherein the decoder further includes:
an external memory in which the pictures included in the views are stored;
a first decoder which decodes the bitstream of the first view and stores in the external memory the picture to be used in the inter-view prediction; and
a second decoder that decodes the bitstream of the second view by retrieving from the external memory the picture to be used in the inter-view prediction, with reference to management information indicating a position of the picture in the external memory.

6. The image decoding device according to claim 1,
wherein the bitstream which has not been loaded because of the delay time is loaded into the buffer memory faster than a data loading rate assigned to the bitstream.

7. The image decoding device according to claim 6,
wherein the decoder further includes:
an external memory in which the pictures included in the views are stored;
a first decoder which decodes the bitstream of the first view and stores in the external memory the picture to be used in the inter-view prediction; and
a second decoder that decodes the bitstream of the second view by retrieving from the external memory the picture to be used in the inter-view prediction, with reference to management information indicating a position of the picture in the external memory.

8. An image coding device for coding views each of which includes a picture, in a method including inter-view prediction, the image coding device comprising:
- a coder that codes the views, assigns the views with an identical decoding point in time, and outputs bitstreams of the coded views, the identical decoding point in time being included in each of the bitstreams or in header information of multiplexed data of the bitstreams; and
- a rate controller that controls the coder to perform coding according to an assumed size of a buffer memory of an image decoding device, the buffer memory being a memory into which the coded views are loaded,
- wherein the rate controller controls the coder to perform coding according to the assumed size of the buffer memory that is equal to or smaller than $D-R\times T\times(n-1)$ where D represents a specified size determined assuming that decoding is instantly completed at the decoding point in time, n represents a number of the coded views, T represents a maximum length of time necessary for decoding each picture included in the views, and R represents a predetermined data loading rate at which the coded views are loaded.

9. The image coding device according to claim 8, wherein the coder further includes:
- an external memory in which the pictures included in the views are stored;
- a first encoder which codes a first view included in the views and stores in the externally memory the picture to be used in the inter-view prediction; and
- a second encoder which codes a second view by retrieving from the external memory the picture of the first view to be used in the inter-view prediction, with reference to management information indicating a position of the picture in the external memory.

10. An image decoding method of decoding a bitstream having views each of which includes a picture and has been coded in a method including inter-view prediction, the image decoding method comprising:
- decoding a coded bitstream of a first view and a bitstream of a second view coded with reference to the first view; and
- holding, before the decoding step, the bitstreams which are to be decoded in the decoding step,
- wherein, in the decoding step, in the case where the first view and the second view are assigned an identical decoding point in time, the identical decoding point in time being included in each of the bitstream of the first view coded and the bitstream of the second view coded or in header information of multiplexed data of the bitstream of the first view coded and the bitstream of the second view coded, a picture of the second view is decoded at a point in time determined by adding a delay time to the decoding point in time assigned to the picture of the second view, the delay time having a length required to complete decoding of a picture of the first view, and
- in the holding step, the bitstream is held in a buffer memory of a size that is equal to or larger than $D+R\times T\times(n-1)$ where D represents a specified size determined assuming that the bitstream of each of the views is extracted from the buffer memory at a corresponding decoding point in time assigned to each of the views, n represents a number of views included in the bitstreams of the views, T represents a maximum length of time necessary for decoding each picture included in the views, and R represents a predetermined data loading rate at which the bitstream of each of the views is loaded into the buffer memory.

11. An image coding method of coding views each of which includes a picture, in a method including inter-view prediction, the image coding method comprising:
- coding the views and assigning the views with an identical decoding point in time, and outputting bitstreams of the coded views, the identical decoding point in time being included in each of the bitstreams or in header information of multiplexed data of the bitstreams; and
- controlling the coding according to an assumed size of a buffer memory of an image decoding device, the buffer memory being a memory into which the coded views are loaded,
- wherein the coding is controlled according to the assumed size of the buffer memory that is equal to or smaller than $D-R\times T\times(n-1)$ where D represents a specified size determined assuming that decoding is instantly completed at the decoding point in time, n represents a number of the coded views, T represents a maximum length of time necessary for decoding each picture included in the views, and R represents a predetermined data loading rate at which the coded views are loaded.

12. A non-transitory computer-readable recording medium storing a program which causes a computer to execute the image decoding method according to claim 10.

13. A non-transitory computer-readable recording medium storing a program which causes a computer to execute the image coding method according to claim 11.

* * * * *